(12) United States Patent
Mackrell et al.

(10) Patent No.: US 8,423,444 B1
(45) Date of Patent: *Apr. 16, 2013

(54) INVESTOR PERSONALITY TOOL

(75) Inventors: Bryan L. Mackrell, Cranberry Township, PA (US); Isabel Ford, Carnegie, PA (US); Erin Koch, Chicago, IL (US); Jonathan Randall, McKees Rocks, PA (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 287 days.

This patent is subject to a terminal disclaimer.

(21) Appl. No.: 12/803,706

(22) Filed: Jul. 2, 2010

(51) Int. Cl.
*G06Q 40/00* (2012.01)

(52) U.S. Cl.
USPC ...................................................... 705/36 R

(58) Field of Classification Search ................ 705/36 R
See application file for complete search history.

(56) References Cited

U.S. PATENT DOCUMENTS

| | | |
|---|---|---|
| 4,367,402 A | 1/1983 | Giraud et al. |
| 4,443,027 A | 4/1984 | McNeely et al. |
| 4,648,037 A | 3/1987 | Valentino |
| 4,837,422 A | 6/1989 | Dethloff et al. |
| 5,101,200 A | 3/1992 | Swett |
| 5,500,513 A | 3/1996 | Langhans et al. |
| 5,621,640 A | 4/1997 | Burke |
| 5,649,118 A | 7/1997 | Carlisle et al. |
| 5,845,260 A | 12/1998 | Nakano et al. |
| 5,918,217 A | 6/1999 | Maggioncalda et al. |
| 5,953,710 A | 9/1999 | Fleming |

(Continued)

FOREIGN PATENT DOCUMENTS

| | | |
|---|---|---|
| WO | WO 96/34358 A1 | 10/1996 |
| WO | WO 03/030054 A1 | 4/2003 |

OTHER PUBLICATIONS

"Adobe's 14th Street Billboard: Interactive, But Recessed," Gothamist, downloaded from http://gothamist.com/2007/07/13/adobes_new_14th.php on Aug. 28, 2009.

(Continued)

*Primary Examiner* — Eric T Wong
(74) *Attorney, Agent, or Firm* — Buchanan Ingersoll & Rooney PC; Robert J. Pugh

(57) ABSTRACT

Various embodiments are directed to a computer system comprising at least one computer programmed to provide a user interface to a user via a first computer device. The user interface may comprise a first axis describing a desired level of involvement of the user in investment decisions and a second axis describing a risk tolerance of the user. The user interface may also comprise a first icon representing a first position on the first and second axes and a second icon representing a second position on the first and second axes. When the first or second icons are activated, the interface may display a description of respective example investors having investment characteristics corresponding to the respective first and second positions on the axes. The user interface may also comprise first and second slider bars corresponding to the respective axes. The slider bars may be movable in response to a signal from a first input device in communication with the computer system. The computer system may be further programmed to receive from the user, via the user interface, an indication of a user position on the first and second axes; and store first data describing the user position on the first and second axis in association with an identifier of the user.

22 Claims, 48 Drawing Sheets

U.S. PATENT DOCUMENTS

| | | | |
|---|---|---|---|
| 5,963,925 | A | 10/1999 | Kolling et al. |
| 5,991,749 | A | 11/1999 | Morrill, Jr. |
| 6,012,044 | A | 1/2000 | Maggioncalda et al. |
| 6,032,134 | A | 2/2000 | Weissman |
| 6,044,360 | A | 3/2000 | Picciallo et al. |
| 6,049,776 | A | 4/2000 | Donnelly et al. |
| 6,052,675 | A | 4/2000 | Checchio |
| 6,064,984 | A | 5/2000 | Ferguson et al. |
| 6,064,986 | A | 5/2000 | Edelman |
| 6,085,174 | A | 7/2000 | Edelman |
| 6,088,682 | A | 7/2000 | Burke |
| 6,112,191 | A | 8/2000 | Burke |
| 6,128,603 | A | 10/2000 | Dent et al. |
| 6,173,269 | B1 | 1/2001 | Solokl et al. |
| 6,332,154 | B2 | 12/2001 | Beck et al. |
| 6,353,811 | B1 | 3/2002 | Weissman |
| 6,401,079 | B1 | 6/2002 | Kahn et al. |
| 6,411,938 | B1 | 6/2002 | Gates et al. |
| 6,473,794 | B1 | 10/2002 | Guheen et al. |
| 6,493,685 | B1 | 12/2002 | Ensel et al. |
| 6,519,571 | B1 | 2/2003 | Guheen et al. |
| 6,601,233 | B1 | 7/2003 | Underwood |
| 6,609,110 | B1 | 8/2003 | Dowd et al. |
| 6,633,878 | B1 | 10/2003 | Underwood |
| 6,636,242 | B2 | 10/2003 | Bowman-Amuah |
| 6,636,833 | B1 | 10/2003 | Flitcroft et al. |
| 6,684,190 | B1 | 1/2004 | Powers et al. |
| 6,718,314 | B2 | 4/2004 | Chaum et al. |
| 6,718,535 | B1 | 4/2004 | Underwood |
| 6,742,002 | B2 | 5/2004 | Arrowood |
| 6,742,704 | B2 | 6/2004 | Fitzmaurice et al. |
| 6,839,687 | B1 | 1/2005 | Dent et al. |
| 6,839,692 | B2 | 1/2005 | Carrott et al. |
| 6,876,971 | B1 | 4/2005 | Burke |
| 6,921,268 | B2 | 7/2005 | Bruno et al. |
| 6,993,510 | B2 | 1/2006 | Guy et al. |
| 7,024,390 | B1 | 4/2006 | Mori et al. |
| 7,031,939 | B1 | 4/2006 | Gallagher et al. |
| 7,039,440 | B2 | 5/2006 | Rodriguez et al. |
| 7,062,458 | B2 | 6/2006 | Maggioncalda et al. |
| 7,076,465 | B1 | 7/2006 | Blagg et al. |
| 7,100,195 | B1 | 8/2006 | Underwood |
| 7,110,979 | B2 | 9/2006 | Tree |
| 7,143,064 | B2 | 11/2006 | Picciallo et al. |
| 7,146,338 | B2 | 12/2006 | Kight et al. |
| 7,147,149 | B2 | 12/2006 | Giraldin et al. |
| 7,165,041 | B1 | 1/2007 | Guheen et al. |
| 7,171,370 | B2 | 1/2007 | Burke |
| 7,175,073 | B2 | 2/2007 | Kelley et al. |
| 7,184,979 | B1 | 2/2007 | Carson |
| 7,248,855 | B2 | 7/2007 | Joyce et al. |
| 7,249,092 | B2 | 7/2007 | Dunn et al. |
| 7,249,097 | B2 | 7/2007 | Hutchison et al. |
| 7,263,507 | B1 | 8/2007 | Brake, Jr. et al. |
| 7,264,153 | B1 | 9/2007 | Burke |
| 7,319,986 | B2 | 1/2008 | Praisner et al. |
| 7,328,839 | B2 | 2/2008 | Keohane et al. |
| 7,346,528 | B2 | 3/2008 | Thengvall et al. |
| 7,376,569 | B2 | 5/2008 | Plunkett et al. |
| 7,379,887 | B2 | 5/2008 | Pachon et al. |
| 7,382,773 | B2 | 6/2008 | Schoeneberger et al. |
| 7,401,731 | B1 | 7/2008 | Pietz et al. |
| 7,502,758 | B2 | 3/2009 | Burke |
| 7,536,351 | B2 | 5/2009 | Leblang et al. |
| 7,571,849 | B2 | 8/2009 | Burke |
| 7,577,665 | B2 | 8/2009 | Ramer et al. |
| 7,580,881 | B2 | 8/2009 | Singer et al. |
| 7,620,573 | B2 | 11/2009 | Jameson |
| 7,627,512 | B2 | 12/2009 | Harris et al. |
| 7,647,322 | B2 | 1/2010 | Thomsen |
| 7,660,581 | B2 | 2/2010 | Ramer et al. |
| 7,668,768 | B2 | 2/2010 | Oikonomidis |
| 7,672,861 | B2 | 3/2010 | Al-Otaibi et al. |
| 7,685,083 | B2 | 3/2010 | Fairweather |
| 7,707,052 | B2 | 4/2010 | Kuhn et al. |
| 7,711,619 | B2 | 5/2010 | Merton et al. |
| 7,716,217 | B2 | 5/2010 | Marston et al. |
| 7,729,959 | B1 | 6/2010 | Wells et al. |
| 7,752,123 | B2 | 7/2010 | Brookfield et al. |
| 7,765,138 | B2 * | 7/2010 | Loeper ........................ 705/36 R |
| 7,774,257 | B2 | 8/2010 | Maggioncalda et al. |
| 7,783,564 | B2 | 8/2010 | Mullen et al. |
| 7,788,146 | B2 | 8/2010 | McCarthy, Jr. |
| 7,792,748 | B1 | 9/2010 | Ebersole et al. |
| 7,797,181 | B2 | 9/2010 | Vianello |
| 7,797,218 | B2 | 9/2010 | Rosen et al. |
| 7,797,226 | B2 | 9/2010 | Ram et al. |
| 7,801,814 | B2 | 9/2010 | Cataline et al. |
| 7,809,641 | B2 | 10/2010 | Sanders et al. |
| 7,818,233 | B1 | 10/2010 | Sloan et al. |
| 7,827,102 | B2 | 11/2010 | Saliba et al. |
| 7,831,494 | B2 | 11/2010 | Sloan et al. |
| 7,835,972 | B2 | 11/2010 | Almeida et al. |
| 7,844,492 | B2 | 11/2010 | Perkowski et al. |
| 7,844,546 | B2 | 11/2010 | Fleishman |
| 7,848,948 | B2 | 12/2010 | Perkowski et al. |
| 7,860,871 | B2 | 12/2010 | Ramer et al. |
| 7,865,187 | B2 | 1/2011 | Ramer et al. |
| 7,870,066 | B2 | 1/2011 | Lin et al. |
| 7,912,790 | B2 | 3/2011 | Albertsson |
| 7,937,292 | B2 | 5/2011 | Baig et al. |
| 7,962,419 | B2 | 6/2011 | Gupta et al. |
| 8,015,090 | B1 | 9/2011 | Borzych et al. |
| 8,065,230 | B1 | 11/2011 | Little |
| 8,086,558 | B2 | 12/2011 | Dewar |
| 8,099,350 | B2 | 1/2012 | Ryder |
| 2001/0047310 | A1 | 11/2001 | Russell |
| 2002/0002479 | A1 | 1/2002 | Almog et al. |
| 2002/0007330 | A1 | 1/2002 | Kumar et al. |
| 2002/0026412 | A1 | 2/2002 | Kabin |
| 2002/0046074 | A1 | 4/2002 | Barton |
| 2002/0052773 | A1 | 5/2002 | Kraemer et al. |
| 2002/0055870 | A1 | 5/2002 | Thomas |
| 2002/0077955 | A1 | 6/2002 | Ramm |
| 2002/0091607 | A1 * | 7/2002 | Sloan et al. ........................ 705/36 |
| 2002/0095363 | A1 | 7/2002 | Sloan et al. |
| 2002/0099635 | A1 | 7/2002 | Guiragosian |
| 2002/0103805 | A1 | 8/2002 | Canner et al. |
| 2002/0120568 | A1 | 8/2002 | Leblang et al. |
| 2002/0123949 | A1 | 9/2002 | VanLeeuwen |
| 2002/0133368 | A1 | 9/2002 | Strutt et al. |
| 2002/0147672 | A1 | 10/2002 | Gaini |
| 2002/0152158 | A1 | 10/2002 | Paleiov et al. |
| 2002/0188536 | A1 | 12/2002 | Molosavljevic et al. |
| 2002/0198799 | A1 * | 12/2002 | Burden ........................ 705/35 |
| 2003/0009411 | A1 | 1/2003 | Ram et al. |
| 2003/0033226 | A1 | 2/2003 | Anderson |
| 2003/0050889 | A1 | 3/2003 | Burke |
| 2003/0055758 | A1 | 3/2003 | Sidhu et al. |
| 2003/0083930 | A1 | 5/2003 | Burke |
| 2003/0135634 | A1 | 7/2003 | Moeller et al. |
| 2003/0177027 | A1 | 9/2003 | DiMarco |
| 2003/0216957 | A1 | 11/2003 | Florence et al. |
| 2003/0221118 | A1 | 11/2003 | Walker |
| 2004/0012588 | A1 | 1/2004 | Lulis |
| 2004/0019543 | A1 | 1/2004 | Blagg et al. |
| 2004/0044632 | A1 | 3/2004 | Onn et al. |
| 2004/0054610 | A1 | 3/2004 | Amstutz et al. |
| 2004/0068432 | A1 | 4/2004 | Meyerkopf et al. |
| 2004/0088177 | A1 | 5/2004 | Travis et al. |
| 2004/0107112 | A1 | 6/2004 | Cotter |
| 2004/0117202 | A1 | 6/2004 | Winklevoss et al. |
| 2004/0148234 | A1 | 7/2004 | Gonen-Friedman et al. |
| 2004/0158513 | A1 | 8/2004 | Musacchio |
| 2004/0186852 | A1 | 9/2004 | Rosen |
| 2004/0192351 | A1 | 9/2004 | Duncan |
| 2004/0215560 | A1 | 10/2004 | Amalraj et al. |
| 2004/0254805 | A1 | 12/2004 | Schwerin-Wenzel et al. |
| 2004/0267559 | A1 | 12/2004 | Hinderer et al. |
| 2005/0026119 | A1 | 2/2005 | Ellis et al. |
| 2005/0027632 | A1 | 2/2005 | Zeitoun et al. |
| 2005/0060228 | A1 | 3/2005 | Woo |
| 2005/0060318 | A1 | 3/2005 | Brickman, Jr. |
| 2005/0080691 | A1 | 4/2005 | Holm-Blagg |
| 2005/0086075 | A1 | 4/2005 | Kaehler et al. |
| 2005/0154662 | A1 | 7/2005 | Langenwalter |
| 2005/0164151 | A1 | 7/2005 | Klein |

| | | |
|---|---|---|
| 2005/0187804 A1 | 8/2005 | Clancy et al. |
| 2005/0240431 A1 | 10/2005 | Cotter |
| 2005/0282126 A1 | 12/2005 | Pesso |
| 2006/0064378 A1 | 3/2006 | Clementz et al. |
| 2006/0069635 A1 | 3/2006 | Ram et al. |
| 2006/0095331 A1 | 5/2006 | O'Malley et al. |
| 2006/0100919 A1 | 5/2006 | Levine |
| 2006/0122922 A1 | 6/2006 | Lowenthal |
| 2006/0122923 A1 | 6/2006 | Burke |
| 2006/0149609 A1 | 7/2006 | Stenerson et al. |
| 2006/0163341 A1 | 7/2006 | Tulluri et al. |
| 2006/0178971 A1 | 8/2006 | Owen et al. |
| 2006/0180672 A1* | 8/2006 | Chu ......................... 235/487 |
| 2006/0224478 A1 | 10/2006 | Harbison et al. |
| 2006/0235777 A1 | 10/2006 | Takata |
| 2006/0242084 A1 | 10/2006 | Moses |
| 2006/0277091 A1 | 12/2006 | Kochikar et al. |
| 2006/0277128 A1 | 12/2006 | Anandarao et al. |
| 2006/0282353 A1 | 12/2006 | Gikandi |
| 2006/0282369 A1 | 12/2006 | White |
| 2007/0005477 A1 | 1/2007 | McAtamney |
| 2007/0005524 A1 | 1/2007 | Iwachin |
| 2007/0034688 A1 | 2/2007 | Burke |
| 2007/0038545 A1 | 2/2007 | Smith et al. |
| 2007/0038610 A1 | 2/2007 | Omoigui |
| 2007/0055549 A1 | 3/2007 | Moore et al. |
| 2007/0055602 A1 | 3/2007 | Mohn |
| 2007/0060109 A1 | 3/2007 | Ramer et al. |
| 2007/0060173 A1 | 3/2007 | Ramer et al. |
| 2007/0061252 A1 | 3/2007 | Burke |
| 2007/0061257 A1 | 3/2007 | Neofytides et al. |
| 2007/0061333 A1 | 3/2007 | Ramer et al. |
| 2007/0073802 A1* | 3/2007 | Terrill et al. ............... 709/203 |
| 2007/0083465 A1 | 4/2007 | Ciurea et al. |
| 2007/0094130 A1 | 4/2007 | Burke |
| 2007/0100749 A1 | 5/2007 | Bachu et al. |
| 2007/0112662 A1 | 5/2007 | Kumar |
| 2007/0156519 A1 | 7/2007 | Agassi et al. |
| 2007/0162301 A1 | 7/2007 | Sussman et al. |
| 2007/0162387 A1 | 7/2007 | Cataline et al. |
| 2007/0179841 A1 | 8/2007 | Agassi et al. |
| 2007/0185721 A1 | 8/2007 | Agassi et al. |
| 2007/0192318 A1 | 8/2007 | Ramer et al. |
| 2007/0208588 A1 | 9/2007 | Rhoades et al. |
| 2007/0208624 A1 | 9/2007 | Gallagher |
| 2007/0214162 A1 | 9/2007 | Rice |
| 2007/0231777 A1 | 10/2007 | Dimarco |
| 2007/0241120 A1 | 10/2007 | Henry |
| 2007/0255965 A1 | 11/2007 | McGucken |
| 2007/0298392 A1 | 12/2007 | Mitchell |
| 2008/0015970 A1 | 1/2008 | Brookfield et al. |
| 2008/0015988 A1 | 1/2008 | Brown et al. |
| 2008/0040845 A1 | 2/2008 | Shoshan |
| 2008/0060241 A1 | 3/2008 | Molinaro |
| 2008/0120129 A1 | 5/2008 | Seubert et al. |
| 2008/0133393 A1 | 6/2008 | Arnold et al. |
| 2008/0140559 A1 | 6/2008 | Ram et al. |
| 2008/0183545 A1 | 7/2008 | Deitrich et al. |
| 2008/0195512 A1 | 8/2008 | Klebanoff et al. |
| 2008/0195556 A1 | 8/2008 | Vioni |
| 2008/0201208 A1 | 8/2008 | Tie et al. |
| 2008/0208638 A1 | 8/2008 | Davidson et al. |
| 2008/0243716 A1 | 10/2008 | Ouimet et al. |
| 2008/0249936 A1 | 10/2008 | Miller et al. |
| 2008/0319781 A1 | 12/2008 | Stivoric et al. |
| 2009/0006418 A1 | 1/2009 | O'Malley |
| 2009/0063353 A1 | 3/2009 | Viidu et al. |
| 2009/0094170 A1 | 4/2009 | Mohn |
| 2009/0112674 A1 | 4/2009 | Musso et al. |
| 2009/0119013 A1 | 5/2009 | O'Malley |
| 2009/0132313 A1 | 5/2009 | Chandler et al. |
| 2009/0138341 A1 | 5/2009 | Mohan et al. |
| 2009/0177688 A1 | 7/2009 | Karlsen et al. |
| 2009/0182664 A1 | 7/2009 | Trombley |
| 2009/0192874 A1 | 7/2009 | Powles et al. |
| 2009/0204448 A1 | 8/2009 | Kaehler et al. |
| 2009/0204455 A1 | 8/2009 | Rubin |
| 2009/0204538 A1 | 8/2009 | Ley et al. |
| 2009/0216641 A1 | 8/2009 | Hubbard |
| 2009/0234697 A1 | 9/2009 | Taguchi |
| 2009/0254469 A1 | 10/2009 | Robertson |
| 2009/0276231 A1 | 11/2009 | Bazigos et al. |
| 2009/0276258 A1 | 11/2009 | Dane |
| 2009/0292648 A1 | 11/2009 | Damschroder et al. |
| 2009/0319289 A1 | 12/2009 | Pande |
| 2009/0319344 A1 | 12/2009 | Tepper et al. |
| 2009/0327051 A1 | 12/2009 | Nerby |
| 2009/0327106 A1 | 12/2009 | Bartelt et al. |
| 2010/0023385 A1 | 1/2010 | Galvan |
| 2010/0030671 A1 | 2/2010 | Gelerman |
| 2010/0063981 A1 | 3/2010 | Thomsen |
| 2010/0070323 A1 | 3/2010 | Polcari et al. |
| 2010/0070448 A1 | 3/2010 | Omoigui |
| 2010/0100424 A1 | 4/2010 | Buchanan et al. |
| 2010/0100427 A1 | 4/2010 | McKeown et al. |
| 2010/0100464 A1 | 4/2010 | Ellis et al. |
| 2010/0100469 A1 | 4/2010 | Buchanan et al. |
| 2010/0100470 A1 | 4/2010 | Buchanan et al. |
| 2010/0100561 A1 | 4/2010 | Cooper et al. |
| 2010/0106566 A1 | 4/2010 | Al-Otaibi et al. |
| 2010/0114672 A1 | 5/2010 | Klaus et al. |
| 2010/0125475 A1 | 5/2010 | Twyman |
| 2010/0131306 A1 | 5/2010 | Koo et al. |
| 2010/0145861 A1 | 6/2010 | Law et al. |
| 2010/0145876 A1 | 6/2010 | Pessin |
| 2010/0153211 A1 | 6/2010 | Ramer et al. |
| 2010/0179916 A1 | 7/2010 | Johns et al. |
| 2010/0180029 A1 | 7/2010 | Fourman |
| 2010/0198863 A1 | 8/2010 | Lee et al. |
| 2010/0217652 A1 | 8/2010 | Brooks Rix |
| 2010/0235299 A1 | 9/2010 | Considine |
| 2010/0287086 A1 | 11/2010 | Harris et al. |
| 2010/0299277 A1 | 11/2010 | Emelo et al. |
| 2010/0306017 A1 | 12/2010 | Dreyfuss et al. |
| 2010/0312713 A1 | 12/2010 | Keltner |
| 2010/0312718 A1 | 12/2010 | Rosenthal et al. |
| 2010/0332379 A1 | 12/2010 | Ram et al. |
| 2011/0173118 A1 | 7/2011 | Hu |
| 2011/0276494 A1 | 11/2011 | Hutchison et al. |
| 2011/0282803 A1 | 11/2011 | Woods et al. |

OTHER PUBLICATIONS

"Interactive Wall Technology: Seeing The Big Picture," Accenture, downloaded from http://www.accenture.com/Global/Services/Accenture_Technology_Labs/Services/SeeingTheBigPicture.htm on Sep. 3, 2009.
"Interactive Graffiti Billboard Lets You Be Simultaneously Tough and Geeky," Gizmodo, Aug. 23, 2007, downloaded from http://gizmodo.com/292933/interactive-graffiti-billboard-lets-you-be-simultaneously-tough-and-geeky on Aug. 28, 2009.
"Toshiba Interactive Digital Billboard," ubergizmo, Mar. 27, 2009, downloaded from http://www.ubergizmo.com/15/archives/2009/03/toshiba_interactive_digital_billboard.html on Sep. 28, 2009.
"FD kinesis launches an interactive billboard in Times Square for Coldwell Banker," Jul. 14, 2009, downloaded from http://kinesismomentum.wordpress.com/2009/07/14/fd-kinesis-launches-an-interactive-billboard-in-times-square-for-coldwell-banker/ on Oct. 21, 2010.
"What Investor Personality Do You Have?" Associated Content, May 13, 2009, downloaded from http://www.associatedcontent.com/article/1760724/what_investor_personality_do_you_have on Aug. 24, 2009.
"Interactive Investor Profile Tool," Southside Bank, downloaded from http://www.southsidetrust.com/tool.html on Aug. 27, 2009.
"Mutual Fund Investor Profile Quiz," TheStreet.com, downloaded from http://www.thestreetratings.com/Products/FreeTools/FundsQuiz.asp on Aug. 27, 2009.
"What Type of Investor Are You? How Investor Profiling Is Changing the Way Investment Advice Is Given," downloaded from http://www.psychonomics.com/research/a&s/profiling.htm on Aug. 24, 2009.
"Understanding Risk," MoneyInstructor.com, downloaded from http://www.moneyinstructor.com/art/risktypes.asp on Mar. 11, 2010.
"Mark Tier's Investor Personality Profile," downloaded from http://www.marktier.com/Main/ipp.php on Mar. 11, 2010.

"The Key to Reducing Investing Mistakes? Understand Your Investing Personality," Merrill Lynch, Nov. 10, 2004, downloaded from http://www.ml.com on Mar. 11, 2010.
"Determining Your Investor Personality," Pacific Life, downloaded from http://www.annuities.pacificlife.com on Mar. 11, 2010.
"Anatomy of an Investor," The University of Texas at Austin, downloaded from http://www.utexas.edu/features/2009/01/26/investors/ on Mar. 11, 2010.
"Investor Personality Test," MarketPsych LLC, downloaded from http://www.marketpsych.com/test_question.php?id=8 on Mar. 11, 2010.
"Lifestyle investor profile," John Hancock Funds, LLC, Apr. 2009.
"Investor Profiling: The Foundation for Building a Dominant Wealth Advisory Business," Concord Canada, downloaded from http://highviewfin.com on Mar. 11, 2010.
U.S. Appl. No. 12/152,028, filed May 12, 2008.
U.S. Appl. No. 12/152,074, filed May 12, 2008.
U.S. Appl. No. 12/120,995, filed May 15, 2008.
U.S. Appl. No. 12/479,378, filed Jun. 5, 2009.
U.S. Appl. No. 12/696,959, filed Jan. 29, 2010.
U.S. Appl. No. 12/696,968, filed Jan. 29, 2010.
U.S. Appl. No. 12/696,647, filed Jan. 29, 2010.
U.S. Appl. No. 13/037,063, filed Feb. 28, 2011.
U.S. Appl. No. 13/037,072, filed Feb. 28, 2011.
U.S. Appl. No. 13/037,086, filed Feb. 28, 2011.
U.S. Appl. No. 13/037,096, filed Feb. 28, 2011.
U.S. Appl. No. 12/754,974, filed Apr. 6, 2010.
U.S. Appl. No. 12/803,707, filed Jul. 2, 2010.
U.S. Appl. No. 12/754,967, filed Jul. 2, 2010.
U.S. Appl. No. 12/803,705, filed Jul. 2, 2010.
U.S. Appl. No. 12/803,684, filed Jul. 2, 2010.
U.S. Appl. No. 13/324,575, filed Dec. 13, 2011.
U.S. Appl. No. 13/324,596, filed Dec. 13, 2011.
U.S. Appl. No. 13/355,056, filed Jan. 20, 2012.
Ronald Lipman, "Adding family to credit card not always wise," *Houston Chronicle*, dated Jan. 18, 2008, printed from chron.com, 2 pages.
Lawrence Kutner, "Parent & Child," *The New York Times*, dated Aug. 19, 1993, printed from http://query.nytimes.com/gst/fullpage.html?res=9F0CE1DA153CF93AA2575BC0A965958260&sec=&, Internet site, accessed on Feb. 1, 2008, 3 pages.
Jane J. Kim, "Managing Your Money in Public View," *The Wall Street Journal*, dated Jun. 14, 2007, printed from http://online.wsj.com/article/SB118177906703834565.html, Internet site, accessed on Apr. 11, 2008, 5 pages.
"Obopay—Money Transfer by Cell Phone or Web," printed from https://www.obopay.com/consumer/GetHelp.do?target=HelpHowWorks, Internet site, accessed on Apr. 11, 2008, 4 pages.
"BillMonk.com," printed from https://www.billmonk.com/about/tour, Internet site, accessed on Apr. 11, 2008, 8 pages.
"ING Direct Electric Orange Checking Account," printed from http://banking.about.com/od/checkingaccounts/p/ingchecking.htm, Internet site, accessed on Apr. 11, 2008, 1 page.
"Know your financial health—at a glance!" printed from http://www.buxfer.com/tour.php?id=HomePage, Internet site, accessed on Apr. 11, 2008, 1 page.
"Use Buxfer's analytics to *understand* your finances," printed from http://www.buxfer.com/tour.php?id=Analytics, Internet site, accessed on Apr. 11, 2008, 1 page.
"Use Buxfer Groups to simplify shared finances," printed from http://www.buxfer.com/tour.php?id=Groups, Internet site, accessed on Apr. 11, 2008, 1 page.
"Report transactions easily; let Buxfer deal with the math," printed from http://www.buxfer.com/tour.php?id=Reporting, Internet site, accessed on Apr. 11, 2008, 1 page.
"Import statements from banks or credit card accounts," printed from http://www.buxfer.com/tour.php?id=Import, Internet site, accessed on Apr. 11, 2008, 1 page.
"Slice and dice through your transactions," printed from http://www.buxfer.com/tour.php?=Filters, Internet site, accessed on Apr. 11, 2008, 1 page.
"Transfer money online with Amazon Payments," printed from http://www.buxfer.com/tour.php?id=Send money, Internet site, accessed on Apr. 11, 2008, 1 page.
"Setup budgets to control your expenses," printed from http://www.buxfer.com/tour.php?id=Budgets, Internet site, accessed on Apr. 11, 2008, 1 page.
"Access Buxfer while on the move!" printed from http://www.buxfer.com/tour.php?id=Mobile, Internet site, accessed on Apr. 11, 2008, 1 page.
"Take Buxfer with you on the Internet everywhere!" printed from http://www.buxfer.com/tour.php?id=Gadgets, Internet site, accessed on Apr. 11, 2008, 1 page.
"SPLIT IT by TD Canada Trust Facebook," printed from http://www.facebook.com/apps/application.php?id=4245957541&ref=nf, Internet site, accessed on Apr. 11, 2008, 2 pages.
"Amazon Payments Account Management," printed from https://payments.amazon.com/sdui/sdui/paymentabout?about=true, Internet site, accessed on Apr. 11, 2008, 1 page.
"Living with a Roommate in Memphis," memphis apartments tv.com, dated Feb. 15, 2007, printed from http://www.memphisapartmentstv.com/living-with-a-roommate-in-memphis/, Internet site, accessed on Sep. 18, 2007, 2 pages.
"Billshare—a simple app for people who share bills," printed from http://billshare.org/, Internet site, accessed on Sep. 18, 2007, 2 pages.
"Get More from Your PayPal Account," printed from https://www.paypal.com/us/cgi-bin/webscr?cmd=xpt/cps/general/AccountOverview-outside, Internet site, accessed on Sep. 18, 2007, 2 pages.
"How PayPal Works—PayPal," printed from https://www.paypal.com/us/cgi-bin/webscr?cmd=xpt/cps/general/NewConsumerWorks-outside, Internet site, accessed on Sep. 18, 2007, 3 pages.
"Sending Money Person-to-Person is Easy," printed from https://www.paypal.com/us/cgi-bin/webscr?cmd=xpt/cps/general/PersonPayments-outside, Internet site, accessed on Sep. 18, 2007, 1 page.
"Track Your Online Spending," printed from https://www.paypal.com/us/cgi-bin/webscr?cmd=xpt/cps/general/TrackingMoney-outside, Internet site, accessed on Sep. 18, 2007, 2 pages.
"Enter Details—PayPal," printed from https://www.paypal.com/us/cgi-bin/webscr?cmd=_flow&SESSION=6paX9BKc4FK4EJ8, Internet site, accrssed on Sep. 18, 2007, 1 page.
"Review Payment Details—PayPal," printed from https://www.paypal.com/us/cgi-bin/webscr?cmd=_flow&SESSION=RMXX7KRmInYnF, Internet site, accessed on Sep. 18, 2007, 1 page.
"Savings Plan," printed from http://quicken.intuit.com/images/screenshots/ss_savings_plan_lrg.gif, Internet site, accessed on Mar. 19, 2008, 1 page.
"Quicken Deluxe 2008," printed from http://quicken.intuit.com/personal-finance/deluxe-money-management.jhtml, Internet site, accessed on Mar. 19, 2008, 7 pages.
"SMS Banking," brochure by Acette Technologies FZ LLC, dated 2007, 3 pages.
Tim Ferguson, "Mobile banking rolled out by HSBC," dated Oct. 4, 2006, printed from http://www.silicon.com/financialservices/0,3800010322,39162983,00.htm, Internet site, accessed on Oct. 11, 2007, 2 pages.
Julian Goldsmith, "Cashing in on the ATM revolution," dated May 2, 2007, printed from http://www.silicon.com/financialservices/0,3800010322,39166938,00.htm, Internet site, accessed on Oct. 11, 2007, 3 pages.
Shelley Elmblad, "Online Banking is Easy on Budgets," dated May 22, 2007, printed from http://building-personal-savings.suite101.com/article.cfm/online_banking_get_the_facts, Internet site, accessed on Oct. 12, 2007, 2 pages.
John R. Quain, "Cellphone Banking Is Coming of Age," dated May 24, 2007, printed from http://www.nytimes.com/2007/05/24/technology/24basics.html?_r=1&oref=slogin, Internet site, accessed on Oct. 12, 2007, 4 pages.
"Ducont—Mobile Payments," printed from http://www.ducont.com/Products/bnf_mdhm.htm, Internet site, accessed on Oct. 11, 2007, 1 page.

"Ducont—Bank.companion," printed from http://www.ducont.com/Products/bnf_bankcomp.htm, Internet site, accessed on Oct. 11, 2007, 1 page.

"MyCheckFree.com," printed from https://mycheckfree.com/br/wps?sp=10001&rq=bfbl, Internet site, accessed on Sep. 14, 2007, 1 page.

"About CheckFree," printed from https://mycheckfree.com/br/wps?rq=login&slpg=Y&file=authentication/login_baseline_about-checkfree&esc=93096239&sp=, Internet site, accessed on Sep. 14, 2007, 1 page.

"MyCheckFree—Frequently Asked Questions," printed from https://mycheckfree.com/br/wps?rq=login&slpg=Y&file=authentication/login_baseline_faq&esc=93096239&sp=10001, Internet site, accessed on Sep. 14, 2007, 5 pages.

"Paytrust : Paying Bills Has Never Been Easier," printed from http://www.paytrust.com/learnmore.shtml, Internet site, accessed on Sep. 14, 2007, 2 pages.

"Why Use Paytrust® Instead of a Traditional Bill-Pay Service?" printed from http://www.paytrust.com/morethanbillpay.shtml, Internet site, accessed on Sep. 14, 2007, 3 pages.

Richard Irons, "What is Envelope Budgeting—Why the Envelope Budgeting System is so Effective?" printed from http://www.mvelopes.com/articles/envelope-budgeting.php, Internet site, 3 pages.

"Pocket Quicken," printed from http://www.landware.com/pocketquicken, Internet site, accessed on Sep. 14, 2007, 2 pages.

"Mobile Quicken™—Stand Alone or Connect with a Click," printed from http://www.landware.com/pocketquicken/moreinfo.html, Internet site, accessed on Sep. 14, 2007, 4 pages.

"UnitedOne Credit Union," printed from http://www.unitedone.org/ASP/home.asp, Internet site, accessed on Sep. 14, 2007, 3 pages.

"UnitedOne Credit Union—Calendar Help," printed from https://s146.lanxtra.com/servlet/EchoTemplateServlet?template=/2/en/IBHelp.vm&help=10901, Internet site, accessed on Sep. 14, 2007, 5 pages.

"Quicken Starter Edition 2008," printed from http://quicken.intuit.com/personal-finance/starter-edition-personal-budget.jhtml, Internet site, accessed on Sep. 14, 2007, 5 pages.

"Jul. 2007 calendar," printed from http://quicken.intuit.com/images/screenshots/ss_calendar_lrg.gif, Internet site, accessed on Sep. 14, 2007, 1 page.

"Navigator," dated Jul. 2006, printed from www.pscu.org, Internet site accessed on Oct. 17, 2007, 2 pages.

"Bank of America Privacy Assist Premier™—Protect your credit and identity," printed from http://www.bankofamerica.com/pap/index.cfm?template=pap_assist_premier, Internet site, accessed on Oct. 17, 2007, 2 pages.

"Identity Theft Protection—Bank of America Privacy Assist Premier™," printed from http://www.bankofamerica.com/pap/index.cfm?template=pap_assist_premier, Internet site, accessed on Oct. 17, 2007, 2 pages.

"Bank of America—Online Bill Pay and e-Bills Frequently Asked Questions," printed from http://www.bankofamerica.com/onlinebanking/index.cfm?template=faq_billpay, Internet site, accessed on Oct. 17, 2007, 2 pages.

"Technology Credit Union," printed from http://www.techcu.com/resources/about_tech_cu/privacy/online.htm Internet site, accessed on Oct. 17, 2007, 1 page.

"Billshare.org—Make Bill Paying with Roomies Easy—KillerStartups.com," printed from http://www.killerstartups.com/Web20/billshare--Make-Bill-Paying-with-Roomies-Easy/, Internet site, accessed on Sep. 18, 2007, 4 pages.

Every Penny Counts, Inc., Patent Property Due Diligence Chart, prepared Aug. 30, 2007, 8 pages.

David A. Moss, Gibbs A. Johnson, "The rise of consumer bankruptcy: Evolution, revolution, or both?" *American Bankruptcy Law Journal*, v. 73, n. 2, pp. 311-351, Spring 1999, printed from http://dialogquicksearch.dialog.com/USPTO/search/getDocument.action?r=5cb38c39-dcc8, Internet site, accessed on Sep. 26, 2010, 25 pages.

Phillip Robinson, "Mastering Your Money," *San Jose Mercury News*, Oct. 9, 1994, 3 pages.

Tom Rawstorne, "What's your child buying online?; Alcohol, knives, pornography . . . All bought over the internet by a 14-year-old boy using a debit card. So why are the banks giving them to children without telling their parents?" *Daily Mail*, London, Jul. 10, 2008, p. 50, retrieved Jun. 30, 2011, 5 pages.

CNNMoney.com, "What are you worth?" printed from http://web.archive.org/web/20021008185050/http://cgi.money.cnn.com/tools/networth/networth.html, Internet site, accessed on Jul. 13, 2011, 2 pages.

Office Action dated Sep. 28, 2010 for U.S. Appl. No. 12/152,073, filed May 12, 2008.

Notice of Allowance dated May 3, 2011 for U.S. Appl. No. 12/152,073, filed May 12, 2008.

Office Action dated Apr. 2, 2009 for U.S. Appl. No. 12/152,028, filed May 12, 2008.

Office Action dated Sep. 16, 2009 for U.S. Appl. No. 12/152,028, filed May 12, 2008.

Office Action dated Jun. 15, 2010 for U.S. Appl. No. 12/152,028, filed May 12, 2008.

Office Action dated Oct. 1, 2010 for U.S. Appl. No. 12/152,074, filed May 12, 2008.

Office Action dated Apr. 13, 2010 for U.S. Appl. No. 12/120,995, filed May 15, 2008.

Notice of Allowance dated Sep. 23, 2010 for U.S. Appl. No. 12/120,995, filed May 15, 2008.

Notice of Allowance dated Jul. 11, 2011 for U.S. Appl. No. 12/172,541, filed Jul. 14, 2008.

Office Action dated Jul. 8, 2011 for U.S. Appl. No. 12/366,711, filed Feb. 6, 2009.

Office Action dated Aug. 4, 2011 for U.S. Appl. No. 12/479,378, filed Jun. 5, 2009.

Office Action dated Jan. 3, 2012 for U.S. Appl. No. 12/696,968, filed Jan. 29, 2010.

Office Action dated Jan. 3, 2012 for U.S. Appl. No. 12/696,959, filed Jan. 29, 2010.

Office Action dated Mar. 21, 2012 for U.S. Appl. No. 12/366,711, filed Feb. 6, 2009.

Office Action dated Mar. 15, 2012 for U.S. Appl. No. 12/479,378, filed Jun. 5, 2009.

Office Action dated Mar. 12, 2012 for U.S. Appl. No. 13/300,940, filed Nov. 21, 2011.

Office Action dated Feb. 1, 2012 for U.S. Appl. No. 12/696,647, filed Jan. 29, 2010.

Yahoo! UI Library: Slider, accessed via Way Back Machine, Oct. 6, 2006, http://web.archive.org/web/20061006221351/http://developer.yahoo.com/yui/slider/, on Mar. 8, 2012, 3 pages.

U.S. Appl. No. 13/324,534, filed Dec. 13, 2011.

"How can I automatically generate an index in Word?," printed from http://word.mvps.org/faqs/formatting/CreateIndexContent.htm, Internet site, accessed on Feb. 17, 2011, 4 pages.

"PeopleSoft Enterprise Human Capital Management—Employee Benefits and Compensation Modules," printed from http://www.2020software.com/products/PeopleSoft_Enterprise_Human_Capital_Management_Employee_Benefits_and_Compensation_Modules.asp,, Internet site, accessed on Jul. 17, 2011, 7 pages.

"FREE Online Employee Attendance Tracking Software," printed from http://www.tracksmart.com, Internet site, accessed on Jul. 17, 2011, 2 pages.

"Compensation Software Solutions for Small Business I Taleo," printed from http://www.taleo.com/solutions/taleo-business-edition-comp?_kk=HR%, Internet site, accessed on Jul. 17, 2011, 1 page.

"Tracking training has never been so easy." printed from http://www.conductit.com/, Internet site, accessed on Jul. 17, 2011, 2 pages.

"Track Employee Training Easily with Conductor® Employee Education Training Tracking Software," printed from http://www.conductit.com/product.asp, Internet site, accessed on Jul. 17, 2011, 2 pages.

"HSBC Employee Career Track Information," printed from http://www.hsbcusa.com/careers/hsbc_employees/impacted_employee_information.html, Internet site, accessed on Jul. 17, 2011, 2 pages.

"Conductor® at a glance Take the Quick Tour!" printed from http://www.conductit.com/tour.asp#1, Internet site, accessed on Jul. 17, 2011, 11 pages.

"Replicon—Time Tracking made Easy with Web TimeSheet," printed from http://www.replicon.com/lp/lp_ta_vacation_tracking.aspx?, *Internet site*, accessed on Jul. 17, 2011, 2 pages.

Office Action dated Apr. 18, 2012 for U.S. Appl. No. 13/037,063, filed Feb. 28, 2011.

* cited by examiner

My Bank

Your Lifestyle Plan

Location
Geography

Home
Value and Mortgage Plan

Travel
Vacations

Work
Expected income

Activities
Maintaining Interests

Every Day
Food and transportation

Family
Providing Support

Health
Planning ahead

Activities

☐ Current Benefits
My current health benefits will cover me in retirement.
I will owe a supplemental amount for retirement benefits:
[____] /month ☐ Alternate Health Care Plan
I need to create an alternate plan for insurance.

Plan for additional insurance benefits: ☐ Yes ☐ No $0 ———●——— 1000/month

Plan for assisted living or for an at-home caregiver: ☐ Yes ☐ No $2000 ———●——— 3000/month

How spendy or thrifty is your vision of retirement?

Thrifty ——————————— Spendy

1004

1103

PNC
Retirement Liftstyle

1003 — Clear

1008 — Your Goal

1006

| Travel |
| Special Interest |
| Family |
| Health |
| Every Day |
| Home |

1010 — Retirement Income ◁ None

1000

Travel

1110 — Within the United States
[New York City ▼] [10 ▼] trips per year  Where will you stay? ☐ With family or friends ☐ Modest Hotel ☐ Luxury Hotel
[San Francisco ▼] [3 ▼] trips per year  Where will you stay? ☐ With family or friends ☐ Modest Hotel ☐ Luxury Hotel 1112 — Internationally
[Amsterdam ▼] [2 ▼] trips per year  Where will you stay? ☐ With family or friends ☐ Modest Hotel ☐ Luxury Hotel
[London ▼] [2 ▼] trips per year  Where will you stay? ☐ With family or friends ☐ Modest Hotel ☐ Luxury Hotel

Get to know your financial self better.
Are you a risk-taker or cautious? Impulsive or patient? We all have unique personalities that influence our investment decisions. Determining your Investor Personality enables you and your Advisor to pick investments that are good for you.

INVESTOR PERSONALITY

Thank you for answering our questions.

Based on your answers, your Investor Personality is
Slow and Steady + Active management
You'll see this highlighted icon throughout the site, defining products which best fit your Investor Personality. Of course, you can invest in anything--and you can change your Investor Personality at any time.

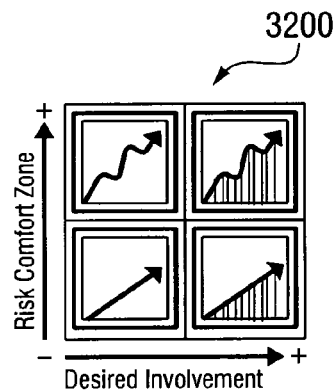
3200

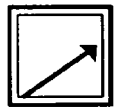 Slow and Steady + Autopilot
You want to be able to count on certain a certain amount of money that grows slowly and consistently, and you would rather have others watch your money for you.

 Slow and Steady + Active Management
You want to be able to count on certain a certain amount of money that grows slowly and consistently, and you want to be actively involved in monitoring your portfolio.

 Aggressive and Variable + Autopilot
You are willing to take some risks with your money for the chance of seeing higher returns, and you would rather have others watch your money for you.

 Aggressive and Variable + Active Management
You are willing to take some risks with your money for the chance of seeing higher returns, and you want to be actively involved in monitoring your portfolio.

[ Back to Profile ]

PNC

| Overview | Investing | Planning | | Welcome User | Sign Off |

3732 — 3734 — 3736 — 3730 3712

| Summary | Profile | Notebook |

3731  3802  3804  3806

Welcome to PNC Investing.
We've worked hard to make investing in your future a little easier. As in, easier for you to see the big financial picture. Easier for you to make the right choices. Easier for you to reach your long-term goals. From the first-time investor to the seasoned professional, we have the tools, tips and technology to help you turn your investment dreams into reality.

3818 — Ask an Investment Guide
To start a chat with an Investment Guide, simply type in your question.
[ Ask ]

3808 / 3816

BANK ACCOUNTS   Total Balance $27,582.82

| Checking | $3,187.14 | Savings | $6,252.75 |
| High-Yield Savings | $8,142.93 | CD 180-364 Days | $10,000.00 |

3810 INVESTING   I have $607,996.75 invested

CURRENT INVESTMENT GROUPS

| Retirement | $458,362 | Uncategorized | $102,456 |
| BlackRock Care Bonds | $20,512 | Vanguard 500 Index | $59,400 |
| 401K | $20,512 | Davis International A | $22,352 |
| IRA | $20,512 | Vanguard ONMA | $38,432 |
|  |  | GlassSmithKline | $22,352 |
| Education | $12,100 |  |  |
| PA 529 | $12,100 |  |  |

[Go to investing]

Learn with Key Questions
Find out all you need to know about
RETIREMENT
• When can I begin to draw on my retirement funds?
• Do I have to make withdrawals? If so, when?
• What if something happens to me? Can I add my spouse or children to my IRA?
• Should I have my 401(K) with the company or roll it into an IRA?
• Is consolidation of several retirement accounts a good idea?
[ See All ]

Notebook
RECENTLY ADDED
What should I do with my 401(K)?
Am I eligible for Capital D?
Target Date Funds

YOUR COLLECTIONS
SMA
Cabin
[ Open Notebook ]

3812 / 3814

PLANNING   I will need $85,996 a year in retirement (chart from 2008 to 2042, with "New Car" and "Phase 1 / 2030 / Good Guess: 1.81M" markers, values $1.0M–$2.0M)

[Go to planning]

About Us | Key Questions | Site Map | Terms and Conditions | Security | Privacy Policy | Copyright Information

*FIG. 38*

◎PNC  3732  3734  3736
| Overview | Investing | Planning |  3730  3714   Welcome Jane Flynn | Sign Off

| Summary | Profile | Notebook |
3731  3802  3804  3806                            3818 — Ask an Investment Guide Your money is truly all about you.
There's no such thing as a One-Size Fits-All Investment. At PNC, we custom-tailor our investment strategies to fit your wants, your needs, and your life—not the other way around—that's why it's important to keep your Profile up to date. So go ahead, tell us a little about yourself...

To start a chat with an Investment Guide, simply type in your question.

[ Ask ]

3902
3816

PERSONAL INFORMATION                                    Edit
Jane Flynn    Address  1234 Ravenswood Avenue    Home Phone (773) 123-4567
                       Chicago, Illinois 60640          Mobile (773) 789-1234
                                                        E-Mail janeflynn@gmail.com
3904                                                                3912

Learn with Key Questions
Find out all you need to know about
RETIREMENT
• When can I begin to draw on my retirement funds?
• Do I have to make withdrawals? If so, when?
• What if something happens to me? Can I add my spouse or children to my IRA?
• Should I have my 401(K) with the company or roll it into an IRA?
• Is consolidation of several retirement accounts a good idea?
[ See All ]

FINANCIAL INFORMATION                                   Edit
    Annual Personal Income   $120,000     Current Mortgage  $245,432
    Annual Household Income  $347,000      Current Loans   Home Equity
    PNC Account Holder since 1989                          Auto           3914
3906

INVESTOR PERSONALITY                                    Edit

Slow and Steady + Active Management
You want to be able to count on a certain amount of money that grow slowly and consistently, and you want to be actively involved in monitoring your portfolio.     3916

3908                                                                      3814

PRIVACY PREFERENCES                                     Edit
    Contact preferences  janeflynn@gmail.com       Alerts    OFF
                        (773) 123-4567          Reminders    ON
    Advisor access  with notification                              3918
3910

Notebook
RECENTLY ADDED
What should I do wit my 401(K)?
Am I eligible for Capital D?
Target Date Funds YOUR COLLECTIONS
SMA
Cabin

[ Open Notebook ]

ADVISOR INFORMATION                                     Edit
Jane Smith    Address  PNC Investments    Branch 123-456-7890
                                          Direct 234-567-8901
                                          E-Mail jane.smith@pnc.com
                                                                    3920

About Us | Key Questions | Site Map | Terms and Conditions | Security | Privacy Policy | Copyright Information

◎PNC

| Overview | Investing | Planning | | Welcome Jane Flynn | Sign Off |

3732  3734  3736  3730  3718

| Portfolio | Browse | Compare | Invest |
4101   4102   4104   4106   4108

3818 — Ask an Investment Guide
To start a chat with an Investment Guide, simply type in your question.
[ Ask ]

Making decisions is easier when you see the big picture.
Get a birds-eye view of how all your investments are performing, change allocation percentages, or check on current values.

4102

| Performance | Allocation | Value |

3816

0%
-10%
-20%
-30%
-40%
Sept 16  Sept 23  Sept 30  Oct 7  Oct 14  Oct 21  Oct 28  Nov 4  Nov 11  Nov 18  Nov 25  Dec 2

Choose which Investment Groups to include in your Performance Review:

| ☒ ▶ Retirement | ☒ ▶ Education | ☒ ▶ Uncategorized |
| 3 funds, 1 calculated | 1 fund, 1 calculated | 4 funds, 0 calculated |

Choose an Index:
☐ DJIA 0.14%  ☐ NASDAQ 1.16%  ☒ S&P 500 4.76%  ☐ NYSE +0.74%  ☐ AMEX +1.40%

Learn with Key Questions

Find out all you need to know about
ASSET ALLOCATION
• How does diversification relate to asset allocation?
• Is there a general rule for a good asset allocation?
• How do I know if my asset allocation is right?
• How often do I need to rebalance my allocation?
• How does risk relate to asset allocation?

[ See All ]

4103
CURRENT INVESTMENT GROUPS   ( Create a new group )  ( Add link to outside holding )
4114   4112   3814

We think you should be able to organize you investments the way you think about them. We've started by creating groups for retirement and education. To add a new group, click the link above and pull in your desired investments.

4104

| Retirement | Total Value: $458,362 |

‖ BlackRock Core Bonds | PNC
‖ $20,512  +3.11% cost basis   View details ▶

‖ 401(k) | PNC
‖ $223,946  +5.85% cost basis   View details ▶
   ● American Funds Growth
   ● Columbia Acorn 2
   ● American Funds Euro
   [ 30% / $25,669  +5.30% cost basis ]

‖ IRA | Fidelity
‖ $215,904  +6.21% cost basis   View details ▶
Fees | Restrictions

| Education | Total Value: $12,100 |

‖ PA 529 | PNC
‖ $12,100  +6.43% cost basis   View details ▶
Fees | Restrictions

| Uncategorized | Total Value: $102,456 |

‖ Vanguard 500 Index | PNC
‖ $59,400  +8.23% cost basis   View details ▶

‖ Davis International A | PNC
‖ $12,312  +11.23% cost basis   View details ▶

‖ Vanguard GNMA | PNC
‖ $18,432  +4.23% cost basis   View details ▶

‖ GlazoSmithKline | Fidelity   View details ▶

Notebook
RECENTLY ADDED
What should I do with my 401(K)?
Am I eligible for Capital D?
Target Date Funds

YOUR COLLECTIONS
SMA
Cabin

[ Open Notebook ]

PNC

| Overview ~3732 | Investing ~3734 | Planning ~3736 | ~3730 3720 | Welcome Jane Flynn | Sign Off |

~3708

| Portfolio | Browse | Compare | Invest |
| 4101 | 4102 | 4104 | 4106 | 4108 |

3818 — Ask an Investment Guide
To start a chat with an Investment Guide, simply type in your question.

[ Ask ]

It's all about helping you make the right choices.
That's why at PNC we take the time to get to know your Investor Personality and only offer you investment options we've personally studied and believe in. —4304

3816

Investment Types

Capital Directions
Diversified based on your Investor Personality and minimized risk based on your Profile. More

Multi-Strategy Accounts
Short description here about Multi-Strategy Accounts. More

Separately Managed Accounts
Short description here about Managed Accounts. More

Approved Mutual Funds by Asset Class
Short description here about Mutual Funds. More

Target Date Funds
Short description here about Target Date Funds. More

529 College Savings Plan
Short description here about 529 College Savings Plan. More

4302

WHAT'S GOOD FOR YOU?
Navigating the world of investments doesn't have to be overwhelming. Here are some suggestions for investments we think are good for you. Why are these recommended?

4310
John Hancock Lifecycle 2020    ~4306

| ← Learn More | What is it?
| Save to Notebook | This product is a fund of funds. The asset allocation will automatically change over time to become more conservative. When the Lifecycle Portfolio reaches its target date, it simply moves into the Lifecycle Retirement Portfolio, which is designed to provide income throughout retirement.
| Invest |

4312
4314

| Description and service fees | 0.30% |
| Expense Ratio | 1.38% |
| Return 1 year | -16.58% |
| Return Since Inception [10/30/06] | -4.08% |
| Morningstar Rating | ★★★ |

4310    ~4308
Clearview Multi-Strategy Domestic Large Cap

| ← Learn More | What is it?
| Save to Notebook | This product is a fund of funds. The asset allocation will automatically change over time to become more conservative. When the Lifecycle Portfolio reaches its target date, it simply moves into the Lifecycle Retirement Portfolio, which is designed to provide income throughout retirement.
| Invest |

4312
4314

| Description and service fees | 0.20% |
| Expense Ratio | 2.05% |
| Return 1 year | 6.15% |
| Return Since Inception [10/30/06] | 4.25% |
| Morningstar Rating | ★★★ |

[ See All ]

Learn with Key Questions
Find out all you need to know about
INVESTING
• Is consolidation of several investment accounts a good idea?
• How does diversification affect my account?
• What if something happens to me? Can I add my spouse or children to my accounts?
• Should I have my 401(K) with the company or roll it into an IRA?
• How do charitable donations work?

[ See All ]

3814

Notebook
RECENTLY ADDED
What should I do wit my 401(K)?
Am I eligible for Capital D?
Target Date Funds

YOUR COLLECTIONS
SMA
Cabin

[ Open Notebook ]

About Us | Key Questions | Site Map | Terms and Conditions | Security | Privacy Policy | Copyright Information

*FIG. 43*

PNC

| Overview /-3732 | Investing /-3734 | Planning /-3736 | /-3730 3722 | Welcome Jane Flynn | Sign Off |

| Portfolio | Browse | Compare | Invest |
| 4101 | 4102 | 4104 | 4106 | 4108 |

Compare choices side by side to see differences that matter.
See how certain investments compare to others before making any decisions.

Search — 4402
Focus your results
With a few choices you can narrow down the packages that are the best for your investment situation.
- ⊙ Only include investments that match my Investment personality.
- ○ Only include investments that match my investment personality.

Investment Category [ Retirement ▼ ]
Initial Investment $ [25,000]
Keywords [          ]
[ Search ]

4404 Future Projection | 4406 Past Performance

Chart: $50K, $45K, $40K, $35K, $30K, $25K — 2008, 2013, 2018, 2023, 2028
Demas Multi-Strategy Global All Cap
Project until: [ 2028 ▼ ]
[ Save to Notebook ]

Ask an Investment Guide — 3818
To start a chat with an Investment Guide, simply type in your question.
[          ]
[ Ask ]

Learn with Key Questions — 3816
Find out all you need to know about
ASSET ALLOCATION
- How does diversification relate to asset allocation?
- Is there a general rule for a good asset allocation?
- How do I know if my asset allocation is right?
- How often do I need to rebalance my allocation?
- How does risk relate to asset allocation?

[ See All ]

Notebook — 3814
RECENTLY ADDED
What should I do with my 401(K)?
Am I eligible for Capital D?
Target Date Funds YOUR COLLECTIONS
SMA
Cabin

[ Open Notebook ]

PRODUCTS — 4408

| COMPARE | NAME | MINIMUM | TYPE ☐ |
|---|---|---|---|
| ▼ | John Hancock Lifecycle 2020 | $250,000 | ▣ ☐ |

This product is a fund of funds. The asset allocation will automatically change over time to become more conservative. When the Lifecycle Portfolio reaches its target date, it simply moves into the Lifecycle Retirement Portfolio, which is designed to provide income throughout retirement.

Description and service fees 0.30%
Expense Ratio 1.38%
Return 1 year -16.58%
Return Since Inception [10/30/06] -4.08%
Morningstar Rating ★★★

| ▶ | Clearview Multi-Strategy Domestic Large Cap | $200,000 | ▣ ☐ |
| ▶ | Demas Multi-Strategy Global All Cap | $150,000 | ▣ ☐ |
| ▶ | Hilltop Capital Directions Balanced Portfolio | $50,000 | ▣ ☐ |
| ▶ | Pegasus &Mark Premium Portfolio Strategies A | $100,000 | ▣ ☐ |

[ Save to Notebook ] [ Buy ]

About Us | Key Questions | Site Map | Terms and Conditions | Security | Privacy Policy | Copyright Information

PNC

Overview | Investing | Planning — 3730 3726 — Welcome Jane Flynn | Sign Off

3732 / 3734 / 3736

Future Financial View | Retirement Lifestyle
4601 / 4602 / 4604

Make your future bright - starting today.
Find out when you'll be able to retire comfortably by setting realistic goals and figuring in different expenses such as travel, housing and daily activities.

3818 — Ask an Investment Guide
To start a chat with an Investment Guide, simply type in your question.
[ Ask ]

PLANNED LIFE EVENTS (Edit) | RETIREMENT PHASES (Edit)

| College -$20K/yr 2010 | Inheritance -$100K 2015 | New Car -$33K 2017 | Phase 1 -$95K/yr 2030 (Age 68) |

Chart (Goal Line) — 2008 to 2042, $1.0M to $2.0M
- New Car 4612
- Phase 1 4614
- 4618
- 4610

| 2030 | Need some help reaching your Phase 1 goal? We.can.help. |
| Range: $1.78-$1.87M Good Guess: $1.81M Ideal Value: $1.85M | |

Learn with Key Questions
Find out all you need to know about
RETIREMENT
- When can I begin to draw on my retirement funds?
- Do I have to make withdrawals? If so, when?
- What if something happens to me? Can I add my spouse or children to my IRA?
- Should I have my 401(K) with the company or roll it into an IRA?
- Is consolidation of several retirement accounts a good idea?

[ See All ]

3814

Notebook
RECENTLY ADDED
What should I do wit my 401(K)?
Am I eligible for Capital D?
Target Date Funds YOUR COLLECTIONS
SMA
Cabin

[ Open Notebook ]

4620
Which investments make up my Base Wealth? Make a change below.

GROUPS [ Go to Groups ]

| [X] ▶ Retirement 3 funds, 1 calculated | [X] ▶ Education 1 fund, 1 calculated | [X] ▶ Uncategorized 4 funds, 0 calculated |

4622
RECOMMENDATIONS
Retirement planning is an ongoing process. See how different choices you make today, tomorrow-- even in retirement-- affect your Future Plan.

| Today | Tomorrow | Retirement |
|---|---|---|
| Change your contribution Consider adding a $250 a month to reach your goal. More [Go] | Plan a contribution Consider planning a single or gradual investment change. More [Go] | Add a 2nd retirement phase Consider if your lifestyle will be different at the end of retirement from the beginning. More [Go] |
| Add non-PNC accounts Consider integrating data from accounts outside of PNC to get a more accurate financial view. More [Go] | Change your asset allocation Consider changing how your asset allocation is adjusted over time. Evaluate your risk tolerance. More [Go] | Change your lifestyle goal Consider adjusting your future home size or other factors. Evaluate your risk tolerance. More [Go] |

⊘ PNC

| Overview (3732) | Investing (3734) | Planning (3736) | 3730 3728 | Welcome Jane Flynn | Sign Off |

| Future Financial View (4601) | Retirement Lifestyle (4602) | (4604) |

Retirement--like life--has many phases.
Your financial needs at the beginning of your retirement will be different from those at the middle and the end. Learn how to plan accordingly with our Retirement LifeStyle tools.

4802

Retirement Lifestyle: Phase 1

Phase 1 Lifestyle Goal: $1,937,421
Good Guess® Projection: $1,587,362
Difference: -$350,059

Please review the lifestyle categories below, and refine the options based on you plans for retirement. More detailed information can be entered by clicking the Advanced option. Collectively, these choices make up your required annual income.

To achieve this lifestyle, your required annual income is: $77,496 Retirement Age: 67 ▼

| Location — Where will you live? | Home — What type of home will you live in? | Every Day — What do you expect to spend each month on food, shopping, auto and transportation? | Income — Do you anticipate a regular annual income? |
| Chicago, IL ▼ | Single Family ▼ | $0 — 2000 | $0 — 200k |
| ☒ Urban ☐ Rural | ☒ Mortgage will be paid | | |
| Advanced » | Advanced » | Advanced » | Advanced » |

| Travel — How often do you plan to travel each year? | Family — Will you provide annual financial support for you family, to aid in education or longterm care? | Health — Will your current health care plan provide necessary benefits after retirement? | Activities — What do you expect to spend each month on entertainment, recreation and hobbies? |
| ☒ Mostly International | $0 — 50k | ☐ Yes ☒ No ☒ Plan for Additional Insurance ☐ Plan for Assisted Living | $0 — 500 |
| Advanced » | Advanced » | Advanced » | Advanced » |

(Add Category) (Go to Future View) (Save to Notebook)        (Save)

Retirement Lifestyle: Phase 2        (Add Phase)

RECOMMENDATIONS
Retirement planning is an ongoing process. See how different choices you make today, tomorrow-- even in retirement-- affect your Future Plan.

| Today | Tomorrow | Retirement |
|---|---|---|
| Change your contribution Consider adding a $250 a month to reach your goal. More (Go) | Plan a contribution Consider planning a single or gradual investment change. More (Go) | Add a 2nd retirement phase Consider if your lifestyle will be different at the end of retirement from the beginning. More (Go) |

3818 — Ask an Investment Guide
To start a chat with an Investment Guide, simply type in your question.
(Ask)

3816 — Learn with Key Questions
Find out all you need to know about
RETIREMENT
• When can I begin to draw on my retirement funds?
• Do I have to make withdrawals? If so, when?
• What if something happens to me? Can I add my spouse or children to my IRA?
• Should I have my 401(K) with the company or roll it into an IRA?
• Is consolidation of several retirement accounts a good idea?
(See All)

3814 — Notebook
RECENTLY ADDED
What should I do wit my 401(K)?
Am I eligible for Capital D?
Target Date Funds YOUR COLLECTIONS
SMA
Cabin
(Open Notebook)

*FIG. 48*

INVESTOR PERSONALITY TOOL

BACKGROUND

Many financial institutions offer investment services including, for example, retirement-related investment services. The predominant model for marketing and providing investment services caters to the needs of high-net-worth individuals, who are often referred to as wealth management clients. The wealth management model is highly dependent on relationships between individual investors and their advisors. Although this business model works well for high-net-worth investors, it has certain problems that become apparent when applied to investors with less money to invest (e.g., mass-affluent investors). For example, it is difficult for financial institutions to reach out to potential new clients who do not have regular contact with financial advisors, either in their personal or professional lives. Also, the individual nature of the financial planning business makes it difficult for financial institutions to build a brand or reputation for sound financial advice that might draw additional clients.

Some investment service providers have attempted to address these problems with mass-media advertising. For example, some providers now advertise their investment management services on radio, television and billboards. These advertisements, however, are typically general in nature, touting abstract concepts about the strength or history of the provider with little information about the investment services to be provided. The Internet is another marketing medium used by providers of investment services. Internet web pages can give providers the ability to show detailed information about their services to a wide group of potential consumers. Even these tools, however, are designed to draw investors to build relationships with one or more advisors, leaving clients' level of business and level of satisfaction with investment services highly dependent on the resulting relationship or relationships.

FIGURES

Various embodiments of the present invention are described here by way of example in conjunction with the following figures, wherein:

FIG. 7 illustrates one embodiment of a screen of the retirement planning tool of FIG. 1 for receiving information about the user's planned health expenses during retirement.

FIGS. 8-9 illustrate another embodiment of a retirement lifestyle planning tool.

FIG. 11 illustrates one embodiment of a basic Travel screen of the retirement lifestyle planning tool of FIG. 10 for receiving basic information about the user's plans for retirement travel.

FIG. 12 illustrates one embodiment of a high detail Travel screen of the retirement lifestyle planning tool of FIG. 10.

FIG. 13 illustrates one embodiment of a basic Special Interest screen of the retirement lifestyle planning tool of FIG. 10 for receiving basic information about the user's plans for retirement special interests.

FIG. 18 illustrates one embodiment of a high detail Family screen of the retirement lifestyle planning tool of FIG. 10.

FIG. 22 illustrates one embodiment of a high detail Home screen of the retirement lifestyle planning tool of FIG. 10.

FIG. 25 illustrates one embodiment of an Auto Fill window for receiving basic classification information.

FIG. 32 illustrates one embodiment of a screen providing an investor personality description to a user who is classified as a "Slow and Steady+Active Management" investor personality type.

FIG. 38 illustrates one embodiment of an Overview section of the user interface of FIG. 37 with a Summary screen selected.

FIG. 39 illustrates one embodiment of the Overview section of the user interface of FIG. 37 with a Profile screen selected.

FIG. 41 illustrates one embodiment of the Investing section of the interface of FIG. 37 with a Portfolio screen selected.

FIG. 43 illustrates one embodiment of the Investing section of the interface of FIG. 37 with a Browse screen displayed.

FIG. 44 illustrates one embodiment of the Investing section of the interface of FIG. 37 with a Compare screen displayed.

FIG. 46 illustrates one embodiment of the Planning section of the interface of FIG. 37 with a Future Financial View screen displayed.

FIG. 47 illustrates one embodiment of the Future Financial View screen showing a Planned Life Events window.

FIG. 48 illustrates one embodiment of the Planning section of the interface of FIG. 37 with a Retirement Lifestyle screen displayed.

DESCRIPTION

Figure 1:
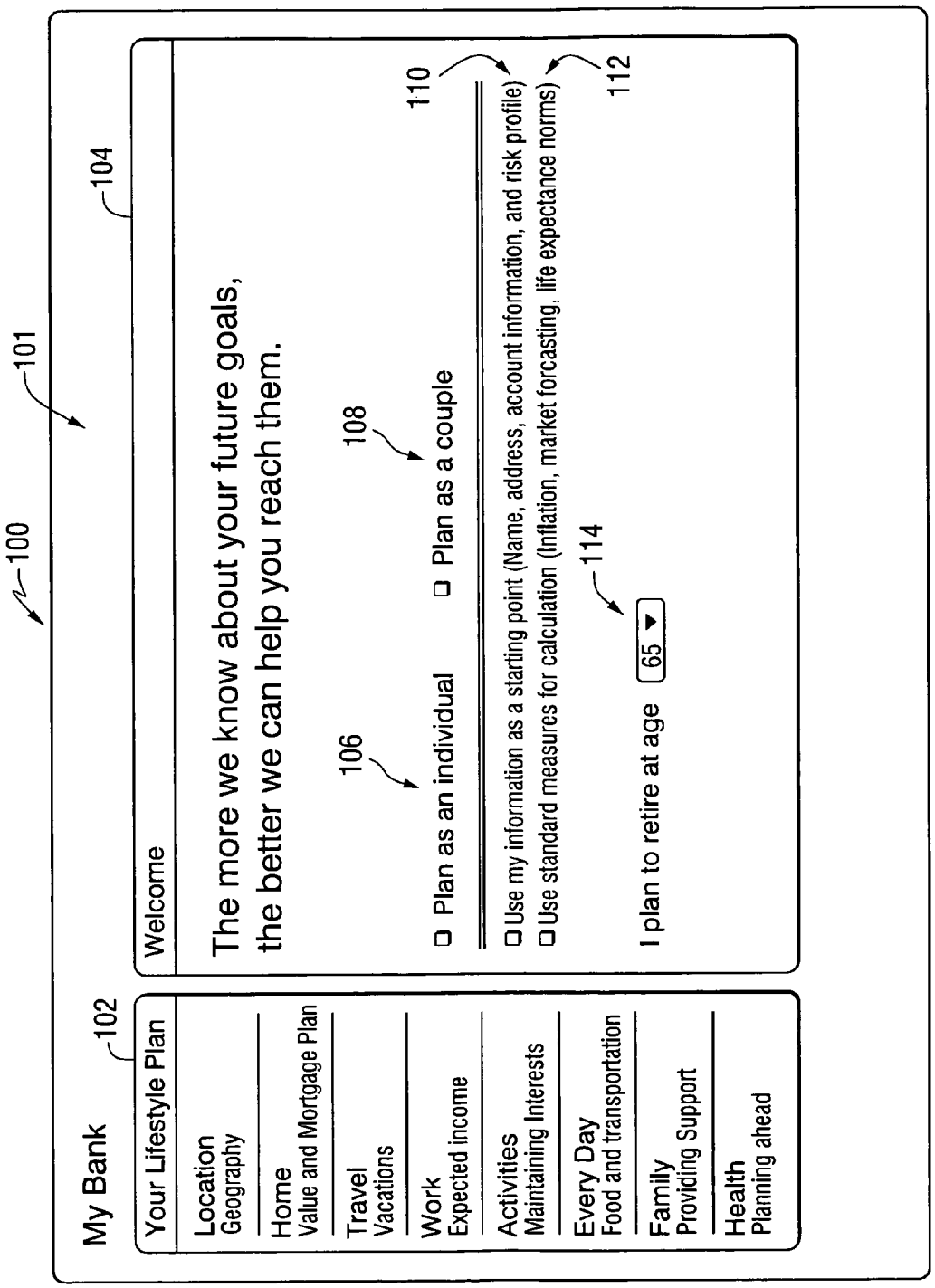
FIG. 1 illustrates one embodiment of an introductory screen of a retirement planning tool.

Various embodiments are directed to systems and methods for providing investment services across multiple media and multiple locations. For example, a financial institution may facilitate investment services via a computer-generated user interface. The interface may be provided to current as well as potential investment clients of the financial institution. The interface may provide the clients with various investment related services. For example, the interface may provide clients and potential clients with investment-related tools such as, a retirement lifestyle planning tool and/or an investor personality tool. A retirement lifestyle planning tool may be used by a client to estimate the client's retirement expenses and income. This information may be utilized by the client to develop a retirement savings and spending plan. An investor personality tool may be utilized to classify a client and determine a type or types of investments that may be of interest to the client.

In addition to the retirement lifestyle planning tool and the investor personality tool, the interface may, in various embodiments, also provide clients and potential clients with access to investment advice in the form of prepared research, prepared written advice, live chats with financial advisors, and/or functionality for scheduling an in-person meeting with a financial advisor. In addition, certain embodiments of the interface may also have functionality allowing a client to execute transactions to buy and sell investment products electronically.

The interface may be served by a host system implemented, for example, by the financial services firm. According to various embodiments, the host system may be designed to provide the user interface at different locations via different access media. According to various embodiments, at least some aspects of the user interface may be made available at public locations, such as branch offices of the financial institutions, kiosks located at shopping centers, automated teller machines (ATM's), etc. Branch devices positioned at the public locations may provide the interface to clients and potential clients. Via the branch devices, potential clients may be able to access some functionality of the interface. For example, potential clients may be able to access investment tools such as the retirement lifestyle tool and/or the investor personality tool referenced above. Also, the interface may be accessible to clients and/or potential clients via their own user devices (e.g., over the Internet) at home or other locations. User devices may include any sort of computing device including, for example, personal computers, laptop computers, personal digital assistants, mobile phones, etc. According to various embodiments, the user interface may be implemented with transition mechanisms that allow a user (e.g., a client or potential client) to access the interface at a branch device and then re-access the interface from a branch device or user device, all while maintaining information that was originally entered and/or derived at the public location.

According to various embodiments, the retirement lifestyle planning tool may provide functionality allowing the user to estimate the user's expenses, income and general financial condition during retirement. The tool may be used, according to various embodiments, to develop an investment plan that will leave the user with sufficient funds to live an envisioned retirement lifestyle and/or leave the user with a realistic expectation of the retirement lifestyle possible with their current and future savings.

According to various embodiments, the retirement lifestyle planning tool may be provided with two or more levels of detail. For example, different levels of detail may require different levels of input information from the user and may generate results at a corresponding level of detail and/or accuracy. According to various embodiments, lower levels of detail may be suitable for access at public locations via branch devices. For example, a user may be hesitant to enter detailed financial information at a branch device or may not have time to do so. By utilizing the lower level of detail, the user may obtain meaningful results at a branch device without investing large quantities of time or giving up potentially personal information. The user may then re-access the tool later at a higher level of detail through another branch device or a user device. It will be appreciated that, in certain embodiments, high levels of detail may be available through branch devices and lower levels of detail may be available through user devices. Also, according to various embodiments, higher levels of detail may be made available to registered users (e.g., users who are already banking or investment clients of the financial institution instituting the interface). Additionally, the level of detail accessible to a registered user may depend on their degree of registration. For example, users who are banking clients of the financial institution may be provided with one level of detail, while users who are banking and investment clients may be provided with a higher level of detail.

FIGS. 1-11 illustrate one embodiment of the retirement lifestyle planning tool 100 that may be provided via the user interface. FIG. 1 illustrates one embodiment of an introductory screen 101 of the lifestyle planning tool 100. The screen 101 may be provided to a user via a branch device and/or a user device. The screen 101 may comprise a field 104 for receiving from the user, baseline information for estimating users' retirement expenses. For example, at boxes 106, 108 the user may select whether they will be planning their retirement as an individual or as a couple. At field 110, the user may elect to utilize information already known to the host system. For example, if the user is already a customer of the financial institution implementing the user interface, then the host system may already include or have access to certain information about the user. This information may be used to pre-populate some or all of the expense categories shown at field 102. Also, for example, the user may authenticate him or herself to the user interface using a drivers license, credit card or other identification medium. In this case, the user interface may utilize publicly available information based on the user's identification. At box 112, the user may elect to use standard measures for inflation, market forecasting, etc., to determine retirement savings. Field 114 may allow the user to indicate a desired retirement age.

The screen 101 may also comprise a field 102 listing retirement expense categories. Example categories listed in FIG. 1 include Location, Home, Travel, Work, Activities, Every Day, Family and Health. Information to estimate or model the expense categories for a given user may be received from the user or pre-populated, for example, based on other characteristics or selections of the user (e.g., the selections made at field 104). According to various embodiments, the user may transition the tool 100 to display different screens associated with different expense categories by selecting a desired category from the field 102.

Figure 2:
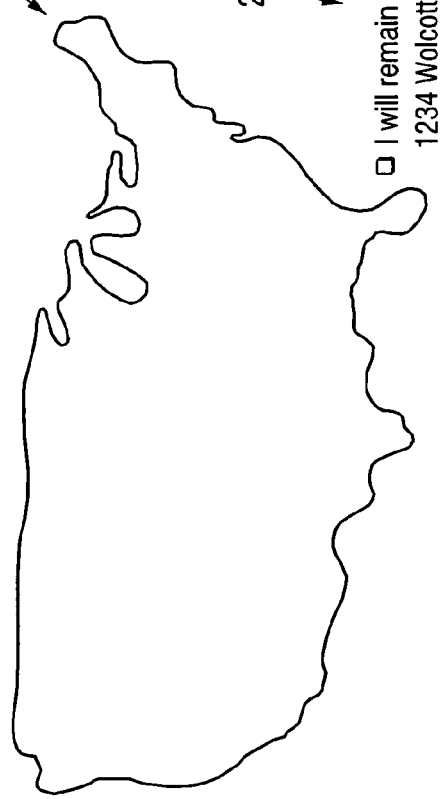
FIG. 2 shows one embodiment of a location screen of the retirement planning tool of FIG. 1 including a location field for receiving information from a user regarding their desired location during retirement.

FIG. 2 shows one embodiment of a Location screen 201 of the retirement planning tool 100 including a basic Location field 202 for receiving information from a user regarding their desired location during retirement. A map 204 may allow the user to indicate an intended retirement location or address. The box 208 may allow a user to indicate that they intend to live outside of the United States. A corresponding drop-down menu 209 may allow the user to indicate the country where they intend to live. According to various embodiments, the map 204 may be updated to show the selected country. Alternatively, the user may select the box 206 to indicate that they will remain at their current address. According to various embodiments, the Location screen 201 may comprise a high detail Location field (not shown) instead of or in addition to the basic Location field 202 shown. The high detail Location field (not shown) may allow the user to enter more detailed information about where they intend to live. For example, the high detail Location field may allow the user to identify a specific city, suburb, township or other locality.

Figure 3:
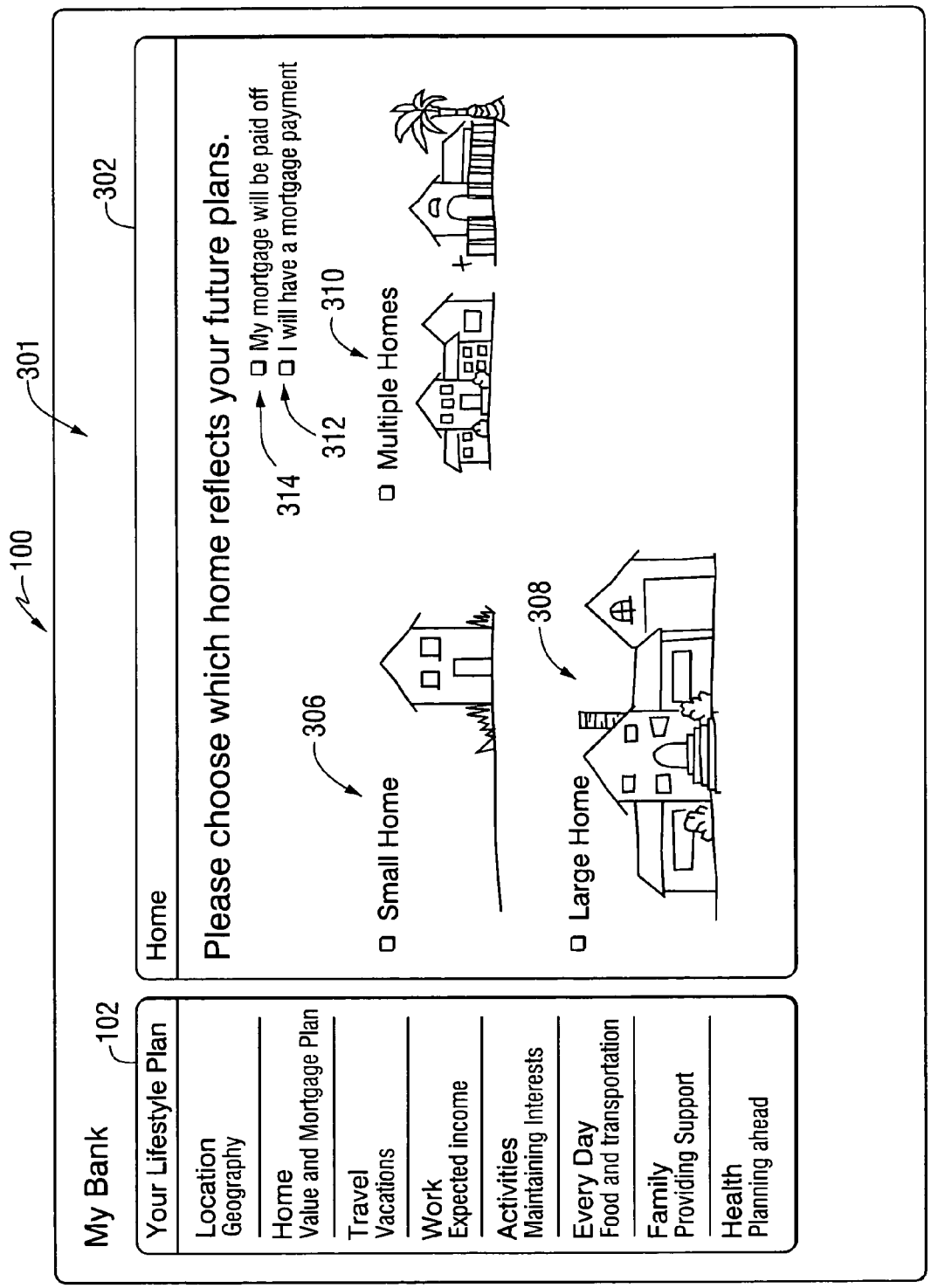
FIGS. 3 and 4 illustrate one embodiment of a screen of the retirement planning tool of FIG. 1 for receiving information about the user's desired home for retirement.
Figure 4:
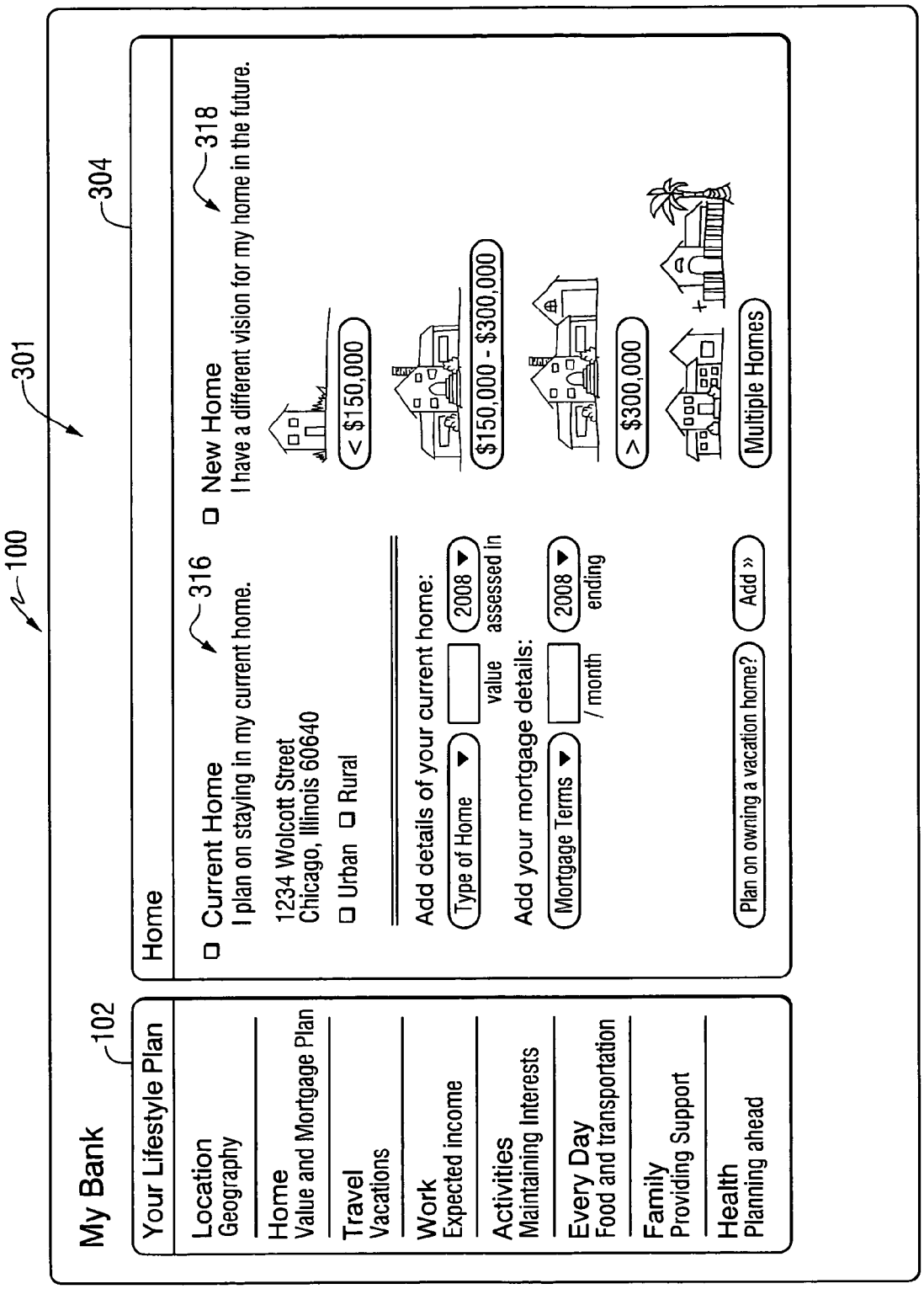

FIGS. 3 and 4 illustrate one embodiment of a screen 301 of the retirement planning tool 100 for receiving information about the user's desired home for retirement. As illustrated in FIG. 3, the screen 301 comprises a basic Home field 302 for receiving basic details about the user's home plans for retirement. The basic Home field 302 may allow the user to indicate what type of residence they intend to inhabit during retirement. The user may select one of the Small Home field 306, the Large Home field 308 or the Multiple Homes field 310 to indicate their preference. Mortgage boxes 312, 314 may allow the user to indicate whether they intend to have an active mortgage during retirement. As illustrated in FIG. 4, the screen 301 may comprise a high detail Home field 304 instead of or in addition to the basic Home field 302. The high detail Home field 304 may be for receiving information about the user's home plans at a higher level of detail. The high detail Home field 304 may comprise a Current Home selection area 316 and a New Home selection area 318. The user may fill out the Current Home selection area 316 if they intend to stay in their current home during retirement. The Current Home selection area 316 may comprise fields for receiving the location of the user's current home (e.g., urban or rural), the type of home, the assessed value of the home, the year of the last assessment, the details of the user's mortgage, etc. A New Home field 318 may allow the user to enter details of a new home for retirement including, for example, the cost.

Figure 5:
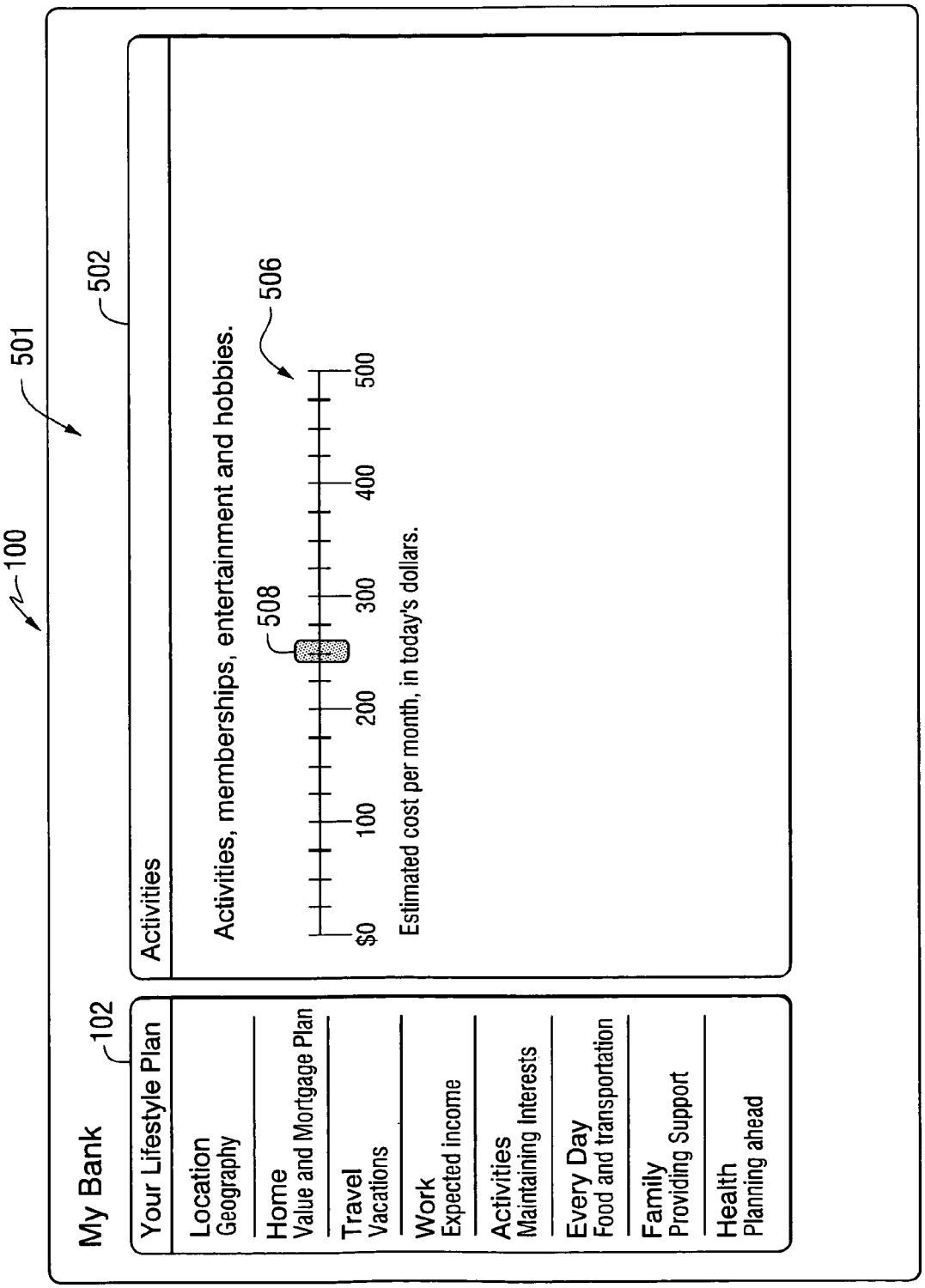
FIGS. 5 and 6 illustrate one embodiment of a screen, of the retirement planning tool of FIG. 1 for receiving information about the user's planned activities for retirement.
Figure 6:
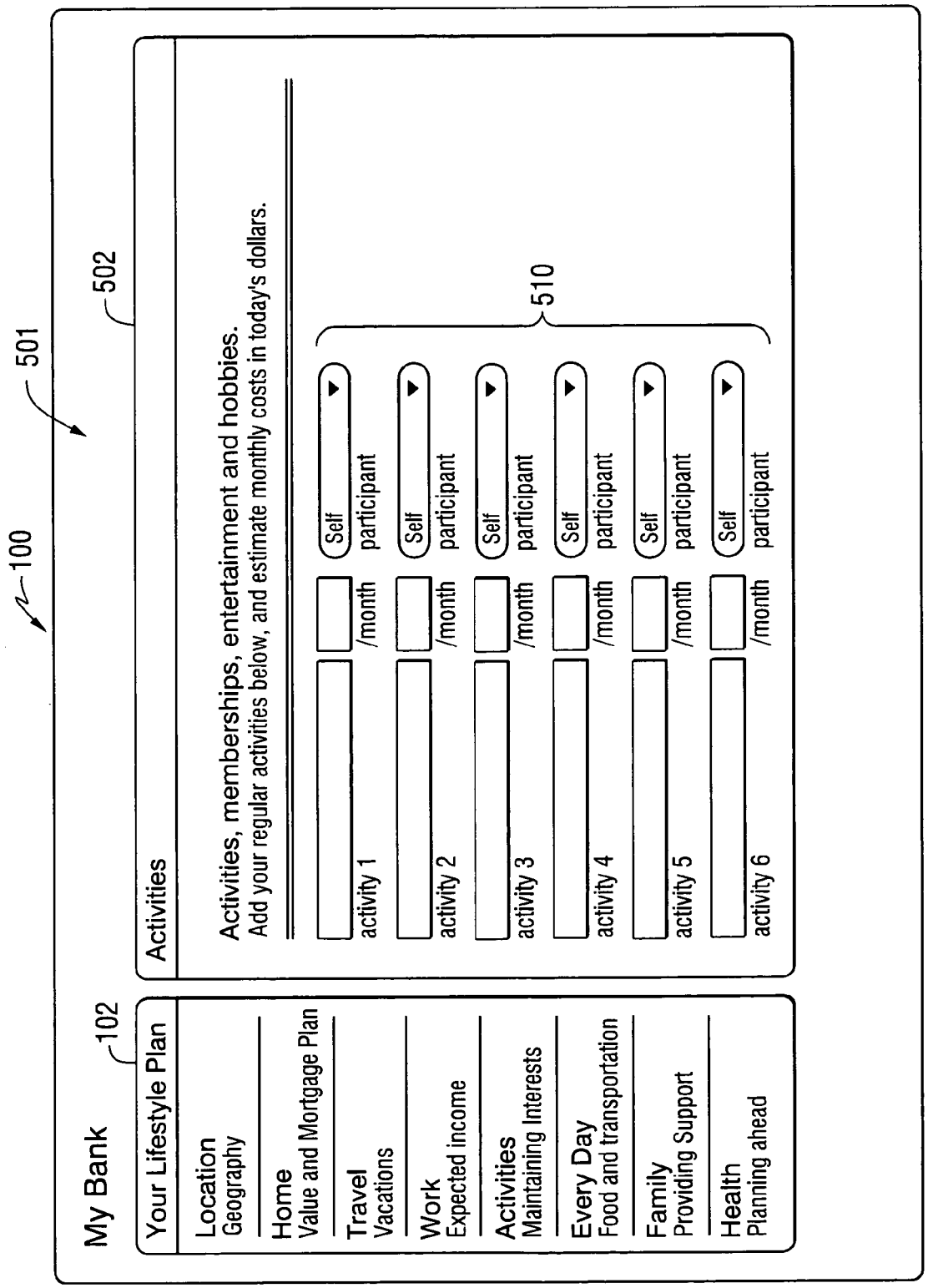

FIGS. 5 and 6 illustrate one embodiment of a screen 501 of the retirement planning tool 100 for receiving information about the user's planned activities for retirement. As illustrated in FIG. 5, the screen 501 comprises a basic Activities field 502 for receiving basic information about the user's estimated retirement activities costs. For example, the basic Activities field 502 comprises a slider bar 506. The user may select and move a cursor 508 to a position on the slider bar 506 corresponding to the estimated monthly cost of the user's activities. As illustrated in FIG. 6, the screen 501 may comprise a high detail Activities field 504 in addition to or instead of the basic Activities field 502. For example, the high detail Activities field 504 may comprise a series of fields 510 for receiving an activity name, cost, frequency, and participant.

FIG. 7 illustrates one embodiment of a screen 701 of the retirement planning tool 100 for receiving information about the user's planned health expenses during retirement. A basic Health field 702 may comprise a Current Benefits window 704 and an Alternate Health Care Plan window 706. The user may select the Current Benefits window 704 if the user's current health benefits will also cover them in retirement. The Current Benefits window 704 may also comprise a field 708 for receiving an indication of a supplemental monthly payment that the user may be required to pay during retirement. The user may select the Alternate Health Care Plan window 706 if the user will require different health benefits during retirement. The Alternate Health Care Plan window 706 may comprise fields for receiving a monthly cost of health benefits 710 and assisted living benefits 712. According to various embodiments, the screen 701 may comprise a high detail Health field (not shown) in addition to or instead of the basic Health field 702. The high detail Health field may receive additional information about the user's retirement health arrangements.

It will be appreciated that the tool 100 may include screens for additional expense categories including, for example, Travel, Work, Every Day and Family, as shown in the field 102. Some or all of the screens for these categories may include basic input screens as well as high detail input screens. Also, it will be appreciated that additional expense categories may be added and some of the disclosed categories may be omitted. The result of the retirement lifestyle planning tool 100 may be an indication of the amount of money that the user will spend in retirement. This number may be presented to the user in any suitable form. For example, the user may be presented with an indication of periodic (e.g., monthly) retirement expenses. In addition, or instead, the user may be presented with an indication of how much money is required at the outset of retirement to live the lifestyle indicated in the various expense categories.

As described above, the retirement lifestyle planning tool 100 may comprise multiple levels of detail. For example, basic fields 202, 302, 502, 702 may make up a first, basic level of detail. For example, screens including these fields may be made available to users at branch devices and/or at user devices to pique the user's interest in the tool 100. When the user has additional time, they may access the high detail fields 304, 504, for example, from a user device (or from a branch device). According to various embodiments, the user may utilize a transition mechanism such as those described herein to save their work and transition from a branch device or user device to another branch device or user device.

Figure 8:
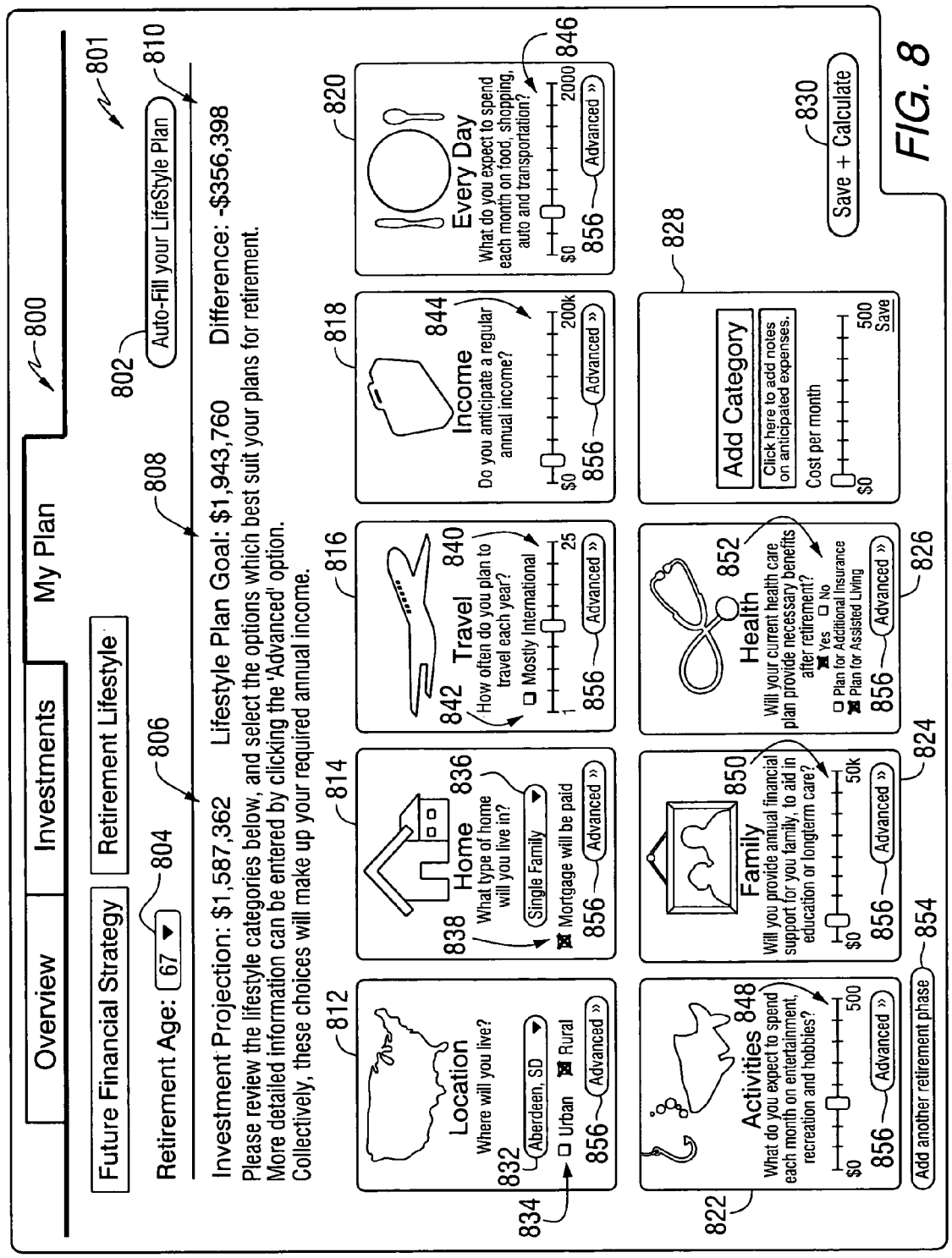

FIGS. 8-13 illustrate another embodiment of a retirement lifestyle planning tool 800 comprising a screen 801. The screen 801 may comprise basic fields for multiple expense categories. For example, as shown in FIG. 8, the screen 801 comprises a basic Location field 812, a basic Home field 814, a basic Travel field 816, a basic Income field 818, a basic Every Day field 820, a basic Activities field 822, a basic Family field 824 and a basic Health field 826. According to various embodiments, the user may manually populate each of the fields 812, 814, 816, 818, 820, 822, 824, 826. In certain embodiments, the user may, instead, select the Auto-Fill Your LifeStyle Plan button 802. This may launch one of the auto-fill/pre-population methods described herein which may allow the user to select a method for auto-filling values for the various expense categories. Also, in certain embodiments, the screen 801 may comprise a retirement age field 804 for receiving from the user their desired retirement age.

The basic Location field 812 may comprise a menu for selecting a location 832 and a field for indicating whether the location is rural or urban. The basic Home field 814 may comprise a menu 836 for indicating at type of home will be used and a field 838 for indicating whether the mortgage will be paid off during retirement. The basic Travel field 816 may comprise a slider bar for indicating the desired frequency of travel as well as an indicator field 842 for indicating whether the desired travel will be mostly international. The basic Income field 818 may comprise a slider bar 844 for indicating an amount of post-retirement income. The basic Every Day field 820 may comprise a slider bar 846 for indicating a periodic cost of every day expenses such as food, shopping and transportation. The basic Activities field 822 may comprise a slider bar 848 for indicating a periodic cost of activities. The basic Family field 824 may comprise a slider bar 850 for indicating a periodic amount provided to family. The basic Health field 826 may comprise fields 852 for receiving an indication of whether the user's current health benefits will apply during retirement, an indication of whether the user wants to plan for additional insurance and an indication of whether the user wants to plan for assisted living. According to various embodiments, the screen 801 may also comprise an Add Category field 828. This may allow a user to add an additional category of retirement spending not covered by the other categories.

Figure 9:
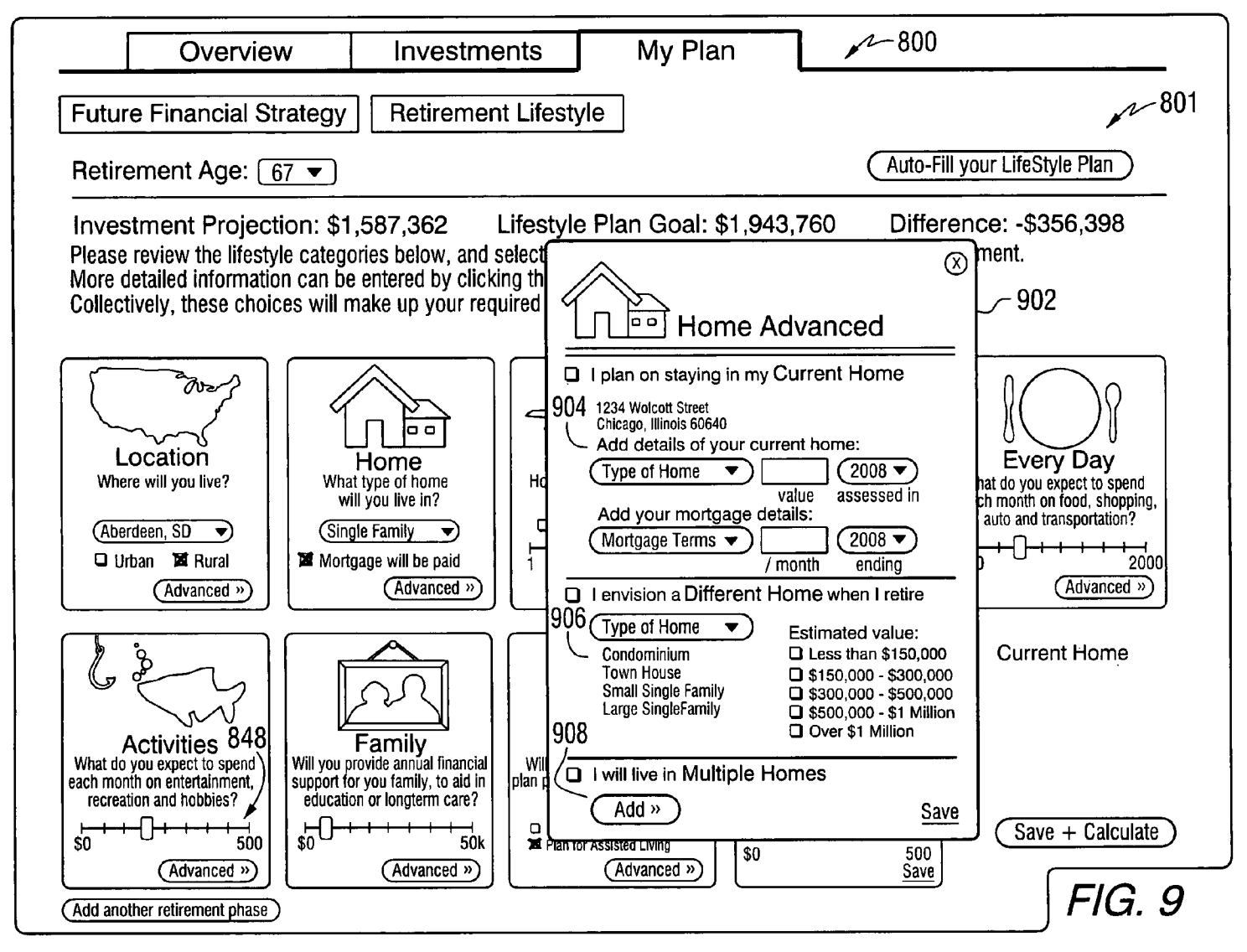

As illustrated in FIG. 8, each of the basic fields 812, 814, 816, 818, 820, 822, 824, 826 may comprise an Advanced button 856. When the user selects the Advanced button 856, a high detail field may be displayed for the relevant category. For example, FIG. 9 illustrates one embodiment of the screen 801 showing a high detail Home field 902. The high detail Home field 902 may comprise a Current Home field 904 that may be utilized by users who desire to remain in their current home during retirement. The Current Home field 904 may comprise areas for receiving the type of the user's home, and details of the user's current mortgage. A Different Home field 906 may comprise fields for receiving information about the kind of house that the user desires to purchase during retirement. A Multiple Homes field 908 may allow the user to describe an additional home or homes that they intend to purchase in retirement. As described herein, higher detail screens, such as the high detail Home field 902 may be accessible to users at user devices and may also be accessible only to users having a predetermined degree of registration.

Referring back to FIG. 8, in various embodiments, the screen 801 may indicate results of the retirement lifestyle, planning tool 800, for example, at fields 806, 808 and 810. Investment Projection field 806 may indicate a projected amount of assets that the user will have at retirement. This may be received, for example, from other tools implemented through the user interface. Lifestyle Plan Goal field 808 may indicate an amount of money necessary for the user to meet the expenses indicated at the various fields 812, 814, 816, 818, 820, 822, 824, 826. In FIG. 8, this number is indicated as an amount of money necessary at retirement, though, it will be appreciated that any suitable form may be used (e.g., monthly expenses, lump sum necessary for retirement, etc.). Difference field 810 may indicate a difference between the investment projection and the lifestyle plan goal. The difference may indicate either a surplus, or an additional amount that the user will need to save prior to retirement in order to meet the indicated expenses. According to various embodiments, the screen 801 may comprise an Add Another Retirement Phase button 854. The user may select this button in order to set expense parameters for a second or additional phase of retirement. For example, the user may intend to be very active during the early years of retirement, but reduce their activity, and expenses, in later years.

FIGS. 10-28 illustrate yet another embodiment of a retirement lifestyle planning tool 1000 that may be implemented, for example, by the host system via the user interface. The tool 1000 may comprise various screens for receiving information from a user regarding the user's anticipated retirement expenses. Each screen may correspond to at least one expense category. In various embodiments, some or all of the screens may have a basic form for receiving basic expense information and a high detail form for receiving more detailed expense information.

Figure 10:
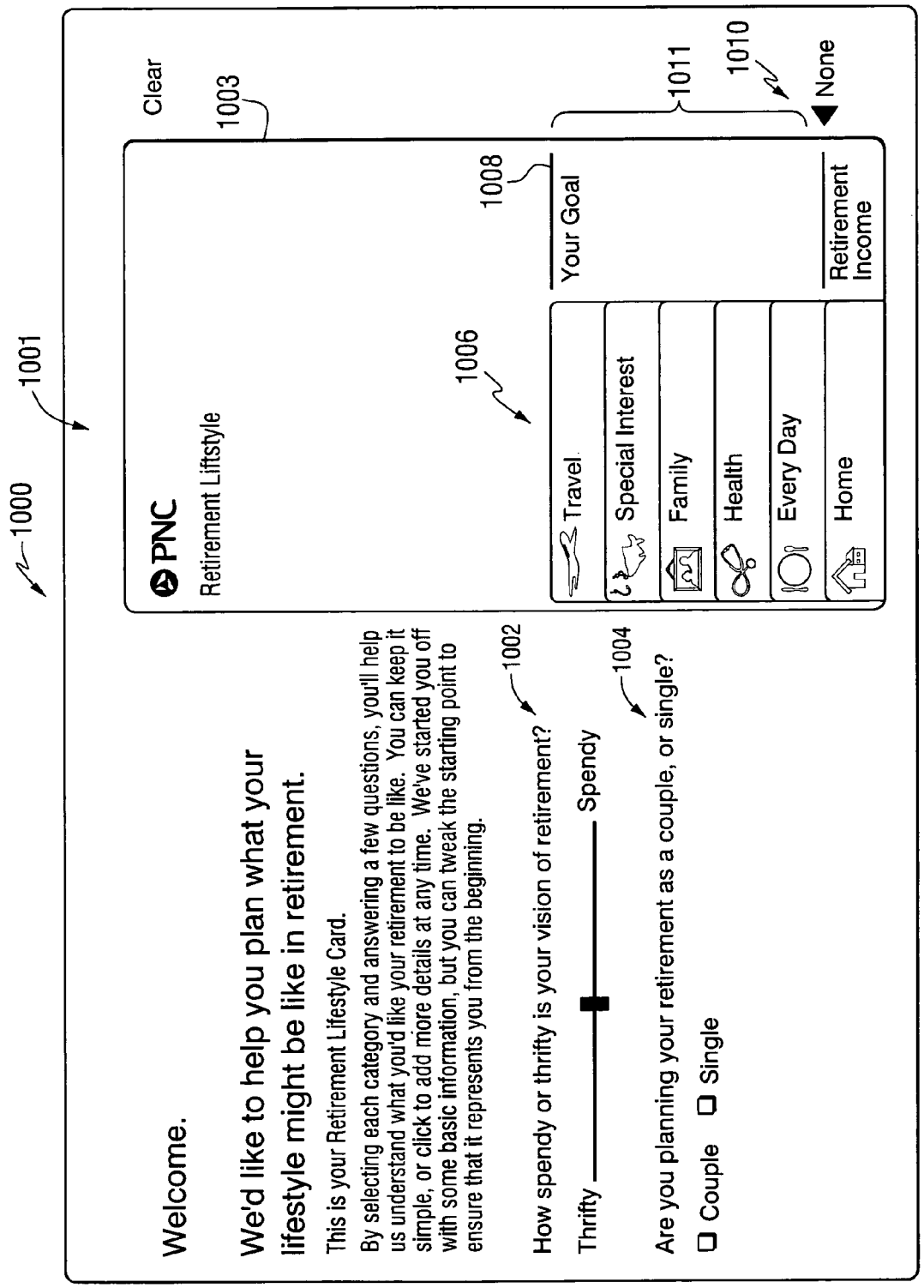
FIG. 10 illustrates one embodiment of an introductory screen of a retirement lifestyle planning tool according to various embodiments.

FIG. 10 illustrates one embodiment of an introductory screen 1001 of the retirement lifestyle planning tool 1000. The screen 1001 may comprise a field 1004 for allowing a user to indicate whether they are planning as an individual or a couple. A total spend slider bar 1002 may allow a user to indicate, at a high level, whether they intend a spendy or a thrifty retirement. According to various embodiments, when the users changes the position of the slider bar 1002, the tool 1000 may increase or reduce each expense category by a corresponding amount. Similarly, as the user changes the spend in different expense categories, (as described herein) the position of the slider bar 1002 may be automatically modified accordingly.

The screen 1001 may also comprise a summary field 1003. The summary field 1003 may comprise a stacked bar chart 1006. The bar chart 1006 may comprise a plurality of elements, with each element corresponding to an expense category. The height of an element may correspond to an amount of retirement spend indicated by the user in the corresponding expense category. The total height of the bar chart 1006 may correspond to the user's total estimated retirement spend, also indicated in FIG. 10 by a Your Goal line 1008. A Retirement Income line 1010 may likewise indicate the user's income (if any) in retirement. The distance 1011 between the Income line 1010 and the Your Goal line 1008 may be filled with retirement assets/savings.

The user may select a screen corresponding to a particular expense category in any suitable manner. For example, selecting an element from the bar chart 1006 corresponding to an expense category may cause a screen for editing information about the selected expense category to appear. Results of the retirement lifestyle planner tool 1000 may be provided via the bar chart 1006 or, in various embodiments, may be provided in the context of the user's investment projections, as shown in FIG. 8. According to various embodiments, the summary field 1003 may be reproduced on a paper, card or other medium and provided to the user. For example, the summary field 1003, or a similar field showing similar information, may be reproduced on a card also including transition or re-access information such as, for example, the card 3500 described herein.

Figure 11:
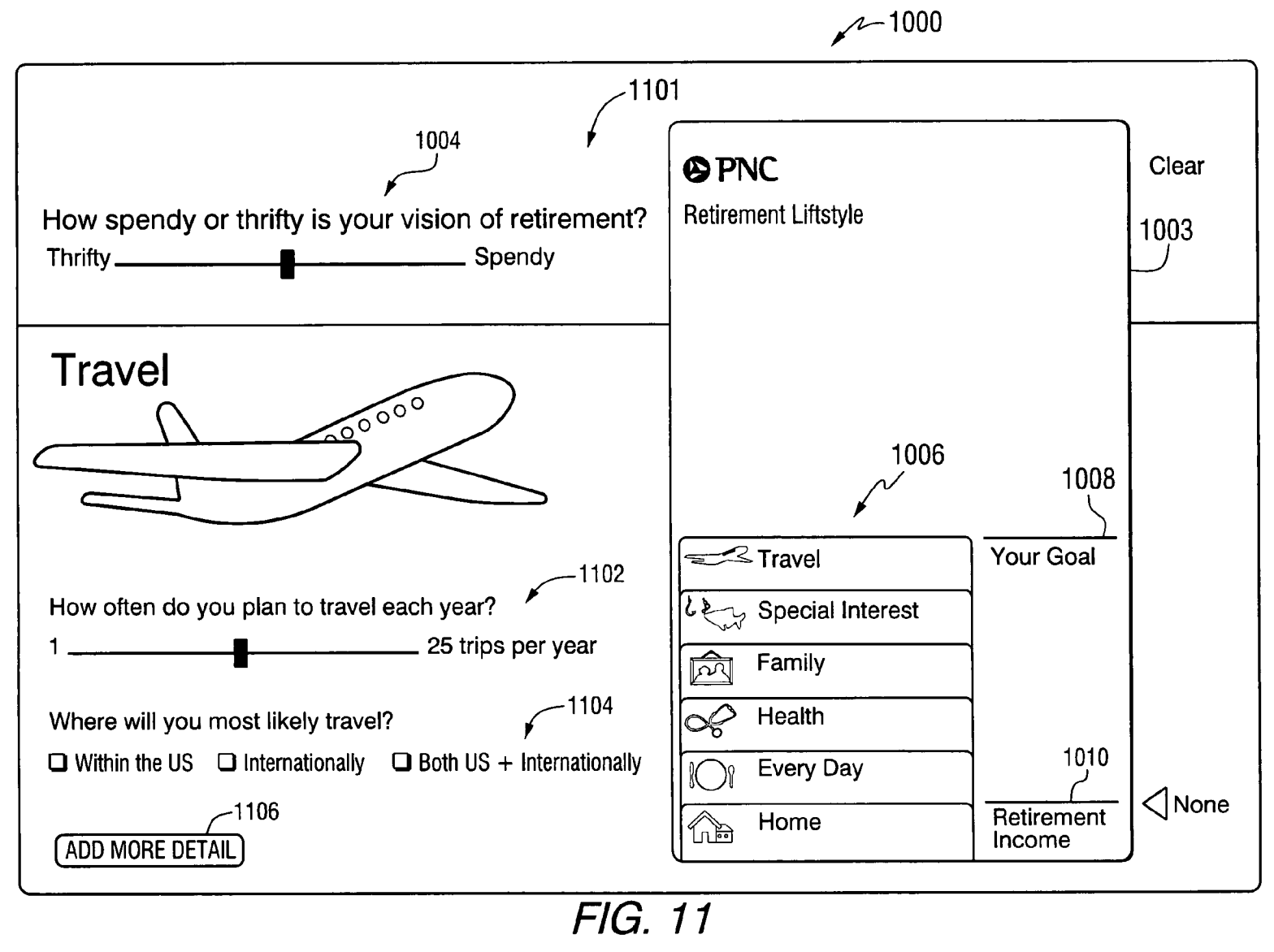

FIG. 11 illustrates one embodiment of a basic Travel screen 1101 of the retirement lifestyle planning tool 1000 for receiving basic information about the user's plans for retirement travel. The basic Travel screen 1101 may include a representation of the summary field 1003 and the total spend slider bar 1004 described above. In addition, the basic Travel screen 1101 may comprise a slider bar or other field 1102 for receiving an indication of how many trips the user intends to take during retirement each year and a field 1104 for receiving an indication of whether the desired trips will be foreign, domestic or both. In addition, the screen 1101 may comprise an Add More Detail button 1106. When the user selects the Add More Detail button, the tool 1000 may display a high detail Travel screen 1103.

FIG. 11 illustrates one embodiment of the high detail Travel screen 1103. The screen 1103 comprises a domestic travel field 1110 allowing the user to enter information about intended yearly domestic trips during retirement. For each destination, the user may be able to enter a number of trips per year, an indication of where the user will stay while traveling and any other relevant information. An international travel field 1112 may allow the user to provide similar information for international travel.

Figure 13:
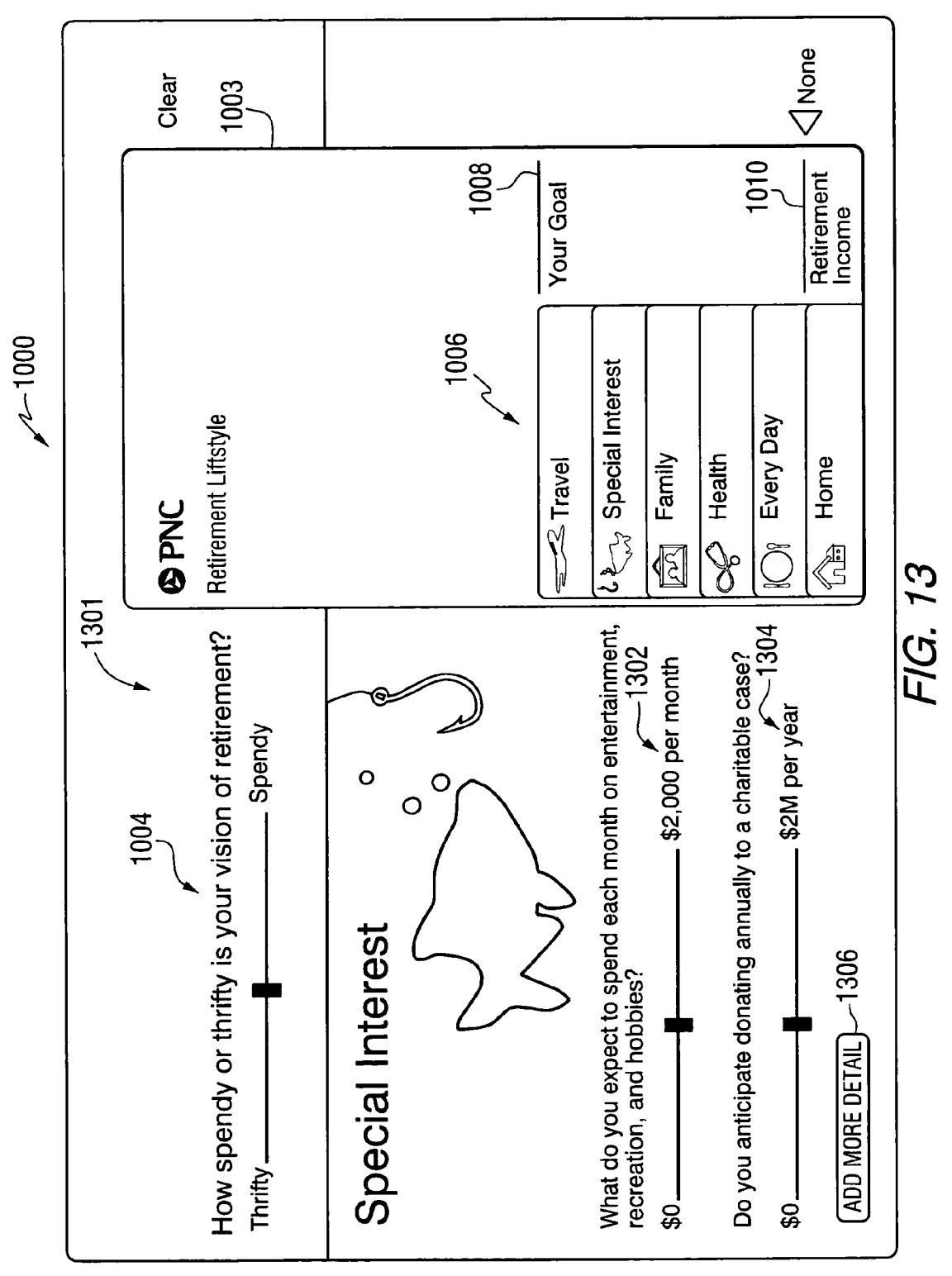
Figure 14:
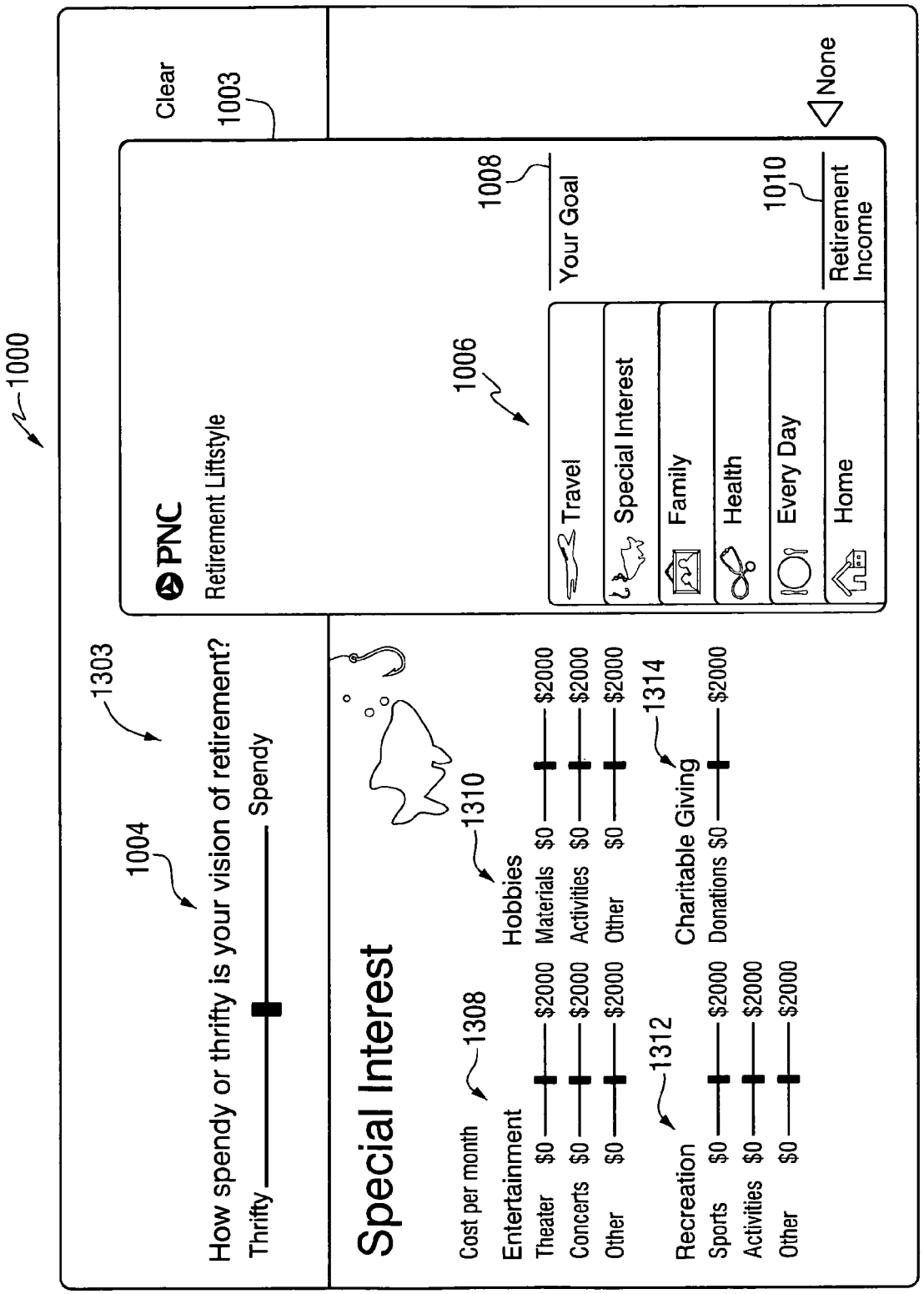
FIG. 14 illustrates one embodiment of a high detail Special Interest screen of the retirement lifestyle planning tool of FIG. 10.

FIG. 13 illustrates one embodiment of a basic Special Interest screen 1301 of the retirement lifestyle planning tool 1000 for receiving basic information about the user's plans for retirement special interests. A slider bar or other field 1302 may allow the user to enter an indication of how much the user intends to spend on entertainment, recreation and hobbies. An additional slider bar or other field 1304 may allow the user to enter an amount that the user intends to periodically donate to charity. An Add More Detail button 1306 may allow the user to view a high detail Special Interest screen 1303. FIG. 14 illustrates one embodiment of the high detail Special Interest screen 1303. The screen 1303 may comprise an Entertainment field 1308 for receiving from the user an intended periodic (e.g., monthly) retirement spend on entertainment. According to various embodiments, the Entertainment field 1308 may comprise separate inputs for different categories of entertainment spend including, for example, Theater, Concerts, Other, etc. The screen 1303 may also comprise a Recreation field for receiving intended period retirement spend on recreation. Example recreation spend inputs may include, for example, Sports, Activities, Other, etc. A Hobbies field 1310 may allow the user to enter their projected periodic spend on hobbies. Example hobby spend inputs may include, for example, Materials, Activities, Other, etc. A Charitable Giving field 1314 may allow a user to enter a periodic amount of retirement charitable giving.

Figure 15:
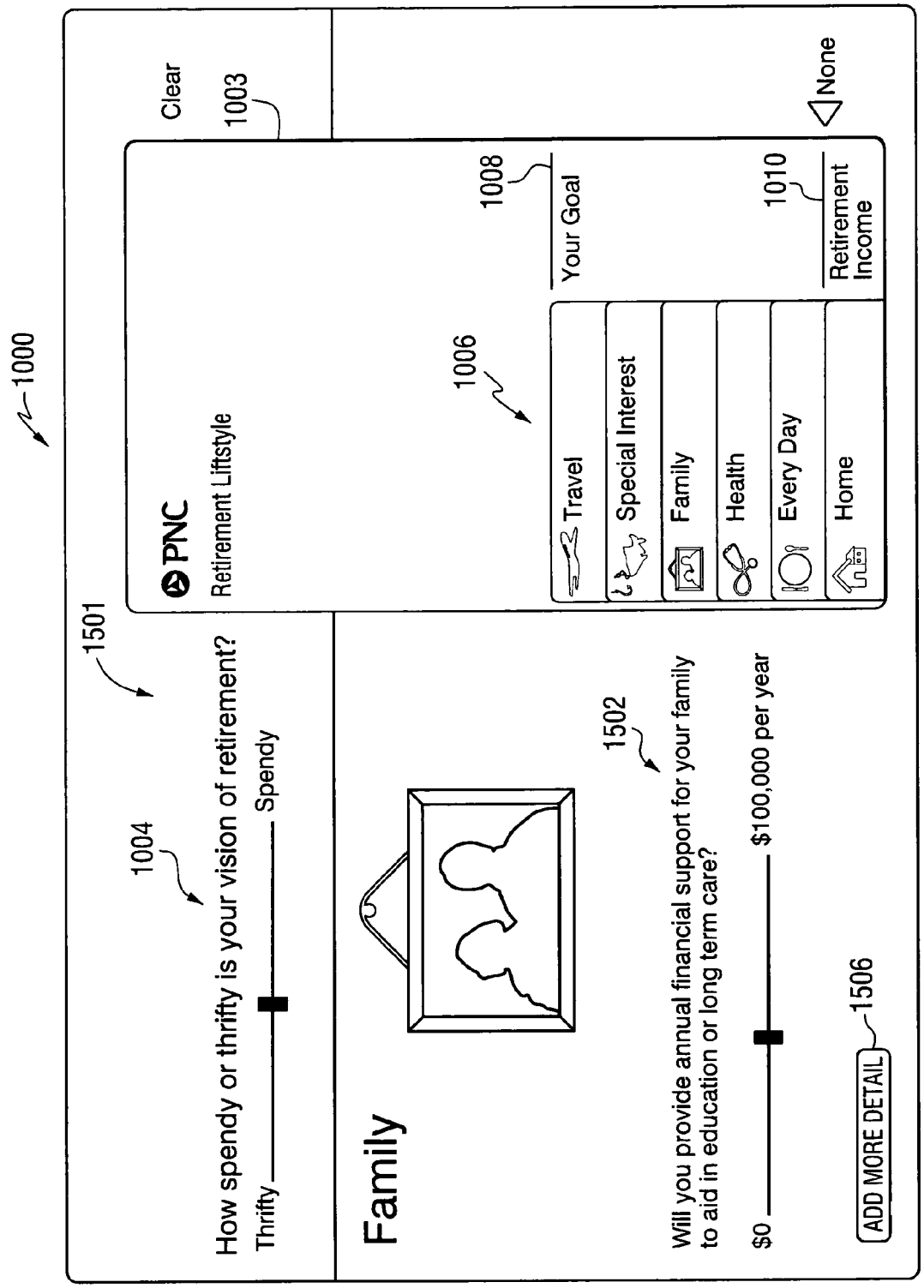
FIG. 15 illustrates one embodiment of a basic Family screen of the retirement lifestyle planning tool of FIG. 10 for receiving basic information about the user's plans for supporting family members such as, for example, aid to education or long term care of loved ones.
Figure 16:
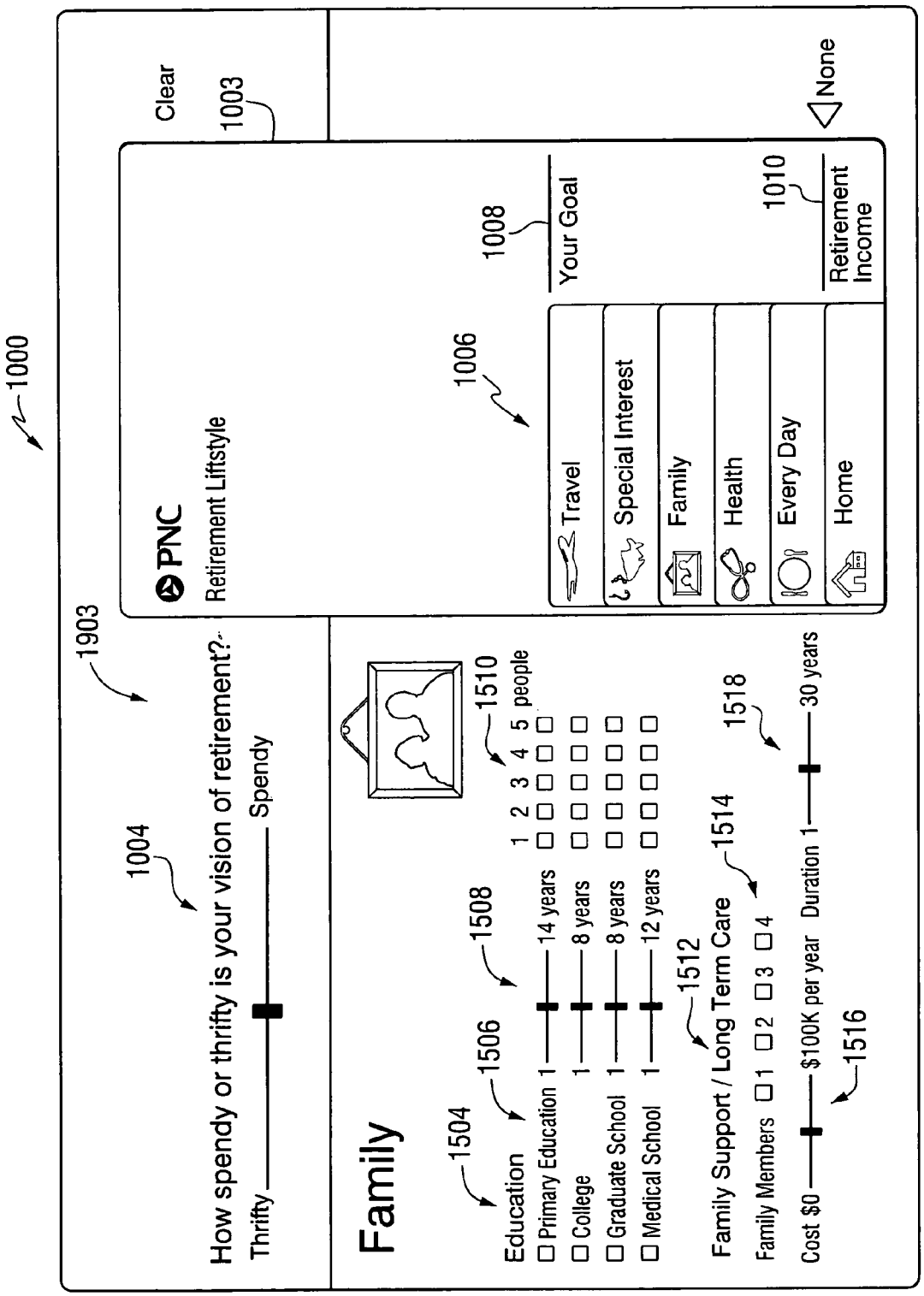
FIG. 16 illustrates one embodiment of a high detail Family screen of the retirement lifestyle planning tool of FIG. 10.

FIG. 15 illustrates one embodiment of a basic Family screen 1501 of the retirement lifestyle planning tool 1000 for receiving basic information about the user's plans for supporting family members such as, for example, aid to education or long term care of loved ones. The screen 1501 may comprise a slider bar 1502 or other input field for receiving from the user an indication of a periodic spend that the user anticipates during retirement to support family. The screen 1501 may also comprise an Add More Detail button 1506 to allow the user to view a high detail Family screen 1503. FIG. 16 illustrates one embodiment of the high detail Family screen 1503. The screen 1503 may comprise an Education field 1504 allowing the user to detail retirement expenses related to the education of family members. For example, a column 1506 may allow the user to indicate the type of education to be financed (e.g., primary, secondary, college, graduate school, etc.). A duration column 1508 may allow the user to enter the duration of the education. A quantity field 1510 may allow the user to enter the number of people whose education will be financed. A Family Support/Long Term Care field may allow the user to enter information about family members whose care will be financed. A Family Members field 1514 may allow the user to enter the number of family members who will be supported. A Cost field 1516 may allow the user to estimate the periodic costs of supporting the family members and the Duration field 1518 may allow the user to select the duration of the support.

Figure 17:
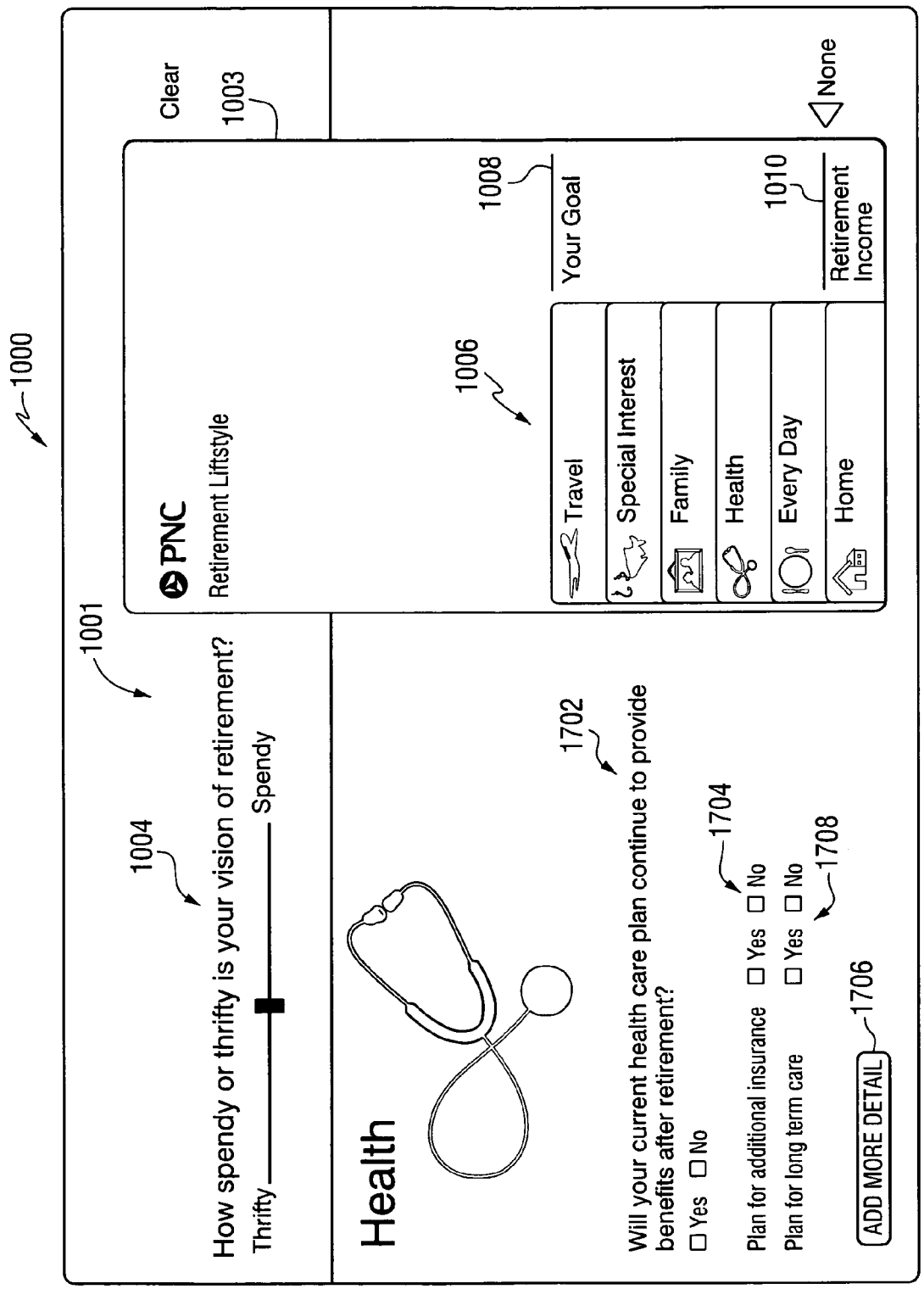
FIG. 17 illustrates one embodiment of a basic Health screen of the retirement lifestyle planning tool of FIG. 10 for receiving information about a user's retirement health funding.
Figure 18:
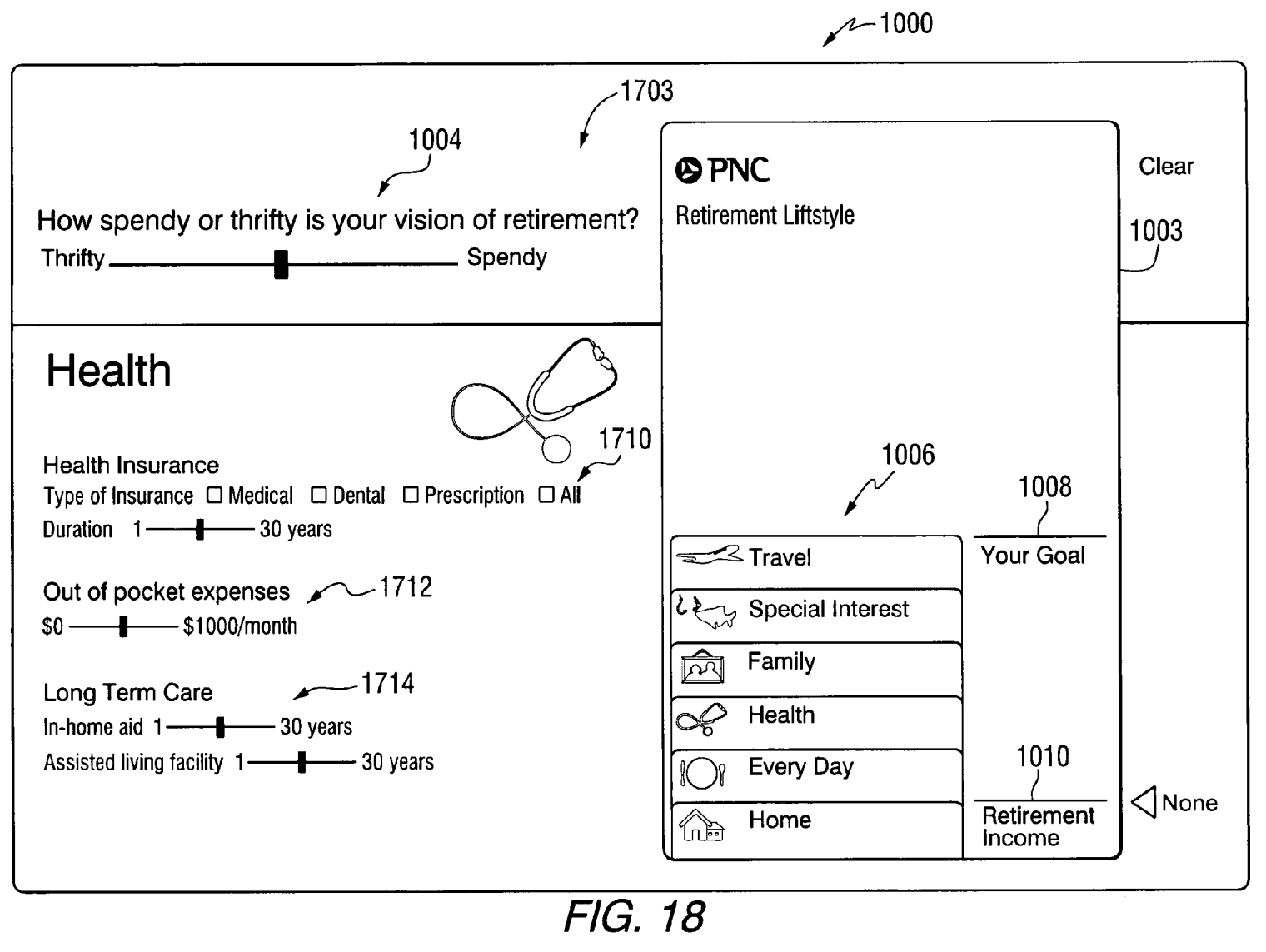

FIG. 17 illustrates one embodiment of a basic Health screen 1701 of the retirement lifestyle planning tool 1000 for receiving information about a user's retirement health funding. The user may indicate whether his or her current health plan will continue to provide benefits after retirement at field 1702. The user may indicate whether they intend to plan for additional insurance and long term care at fields 1704 and 1708, respectively. The Add More Detail button 1706 may allow the user to view a high detail Health screen 1703. FIG. 18 illustrates one embodiment of the high detail Health screen 1703. The high detail Health screen 1703 may comprise a field 1710 allowing the user to enter information about their retirement health insurance including, for example, the type of insurance carried and its duration. A field 1712 may allow the user to enter their anticipated out-of-pocket expenses. A field 1714 may allow a user to enter information about anticipated long-term care needs.

Figure 19:
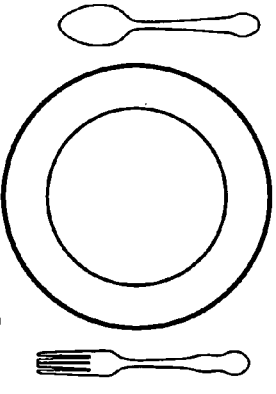
FIG. 19 illustrates one embodiment of a basic Every Day screen of the retirement lifestyle planning tool of FIG. 10 for receiving information about a user's anticipated every day expenses during retirement.
Figure 20:
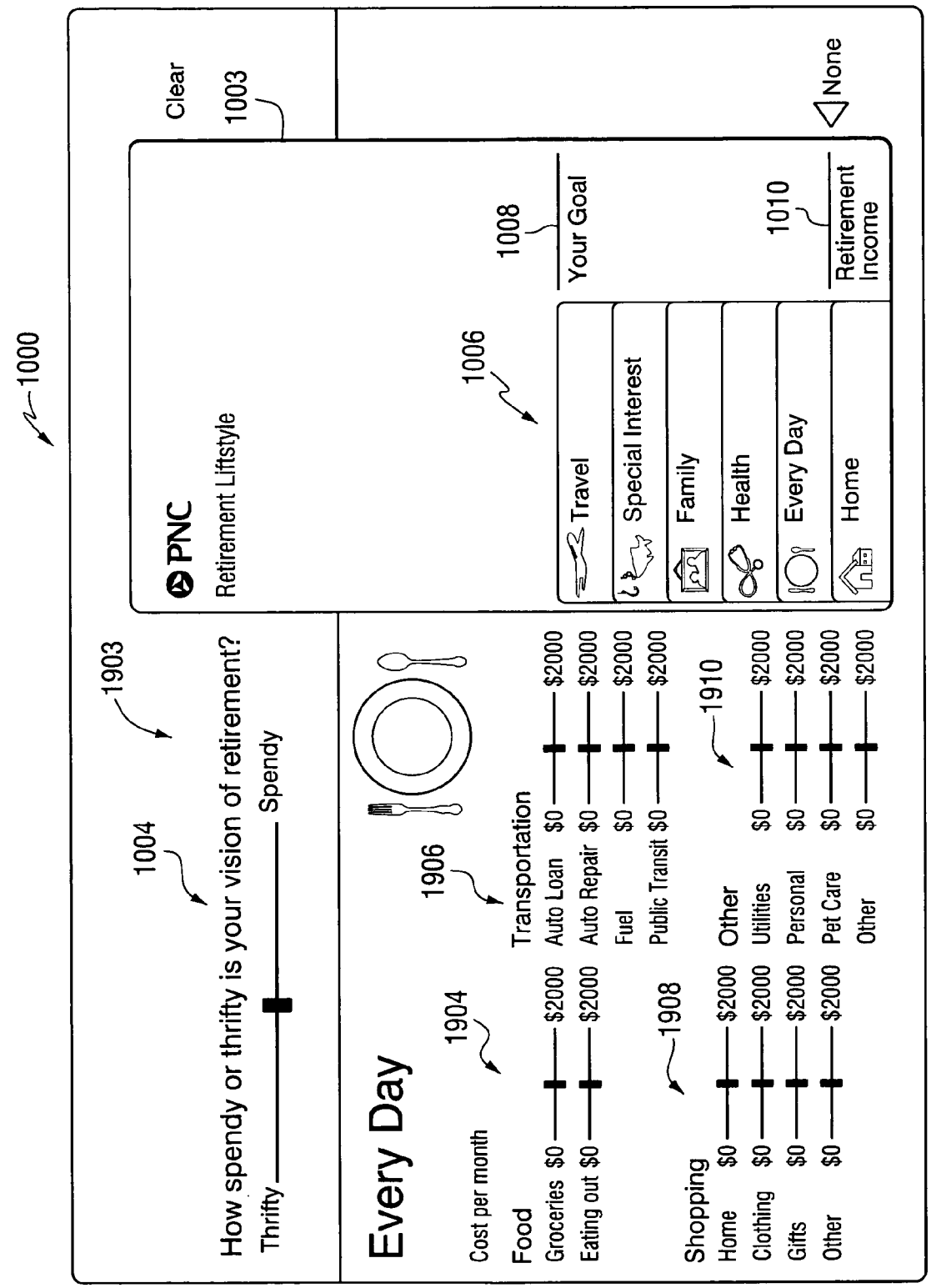
FIG. 20 illustrates one embodiment of a high detail Every Day screen of the retirement lifestyle planning tool of FIG. 10.

FIG. 19 illustrates one embodiment of a basic Every Day screen 1901 of the retirement lifestyle planning tool 1000 for receiving information about a user's anticipated every day expenses during retirement. The screen 1901 may comprise a slider bar or other field 1902 for receiving an estimate of the user's anticipated periodic costs in retirement for food, transportation and shopping. An Add More Detail button 1906 may allow the user to access a high detail Every Day screen 1903. FIG. 20 illustrates one embodiment of the high detail Every Day screen 1903. A Food field 1904 may allow the user to enter detailed information about anticipated periodic costs for food items including, for example, groceries and eating out. A Transportation field 1906 may receive detailed information about periodic Transportation expenses including expenses, for example, for an auto loan, auto repair, fuel, public transit, etc. A Shopping field 1908 may include mechanisms for receiving detailed information about anticipated periodic shopping activities. An Other field 1910 may receive information about anticipated other retirement expenses including, for example, utilities, personal, pet care, etc.

Figure 21:
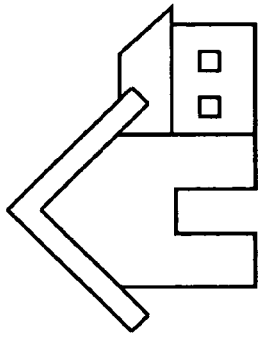
FIG. 21 illustrates one embodiment of a basic Home screen of the retirement lifestyle planning tool of FIG. 10 for receiving information about a user's anticipated shelter-related retirement costs.
Figure 22:
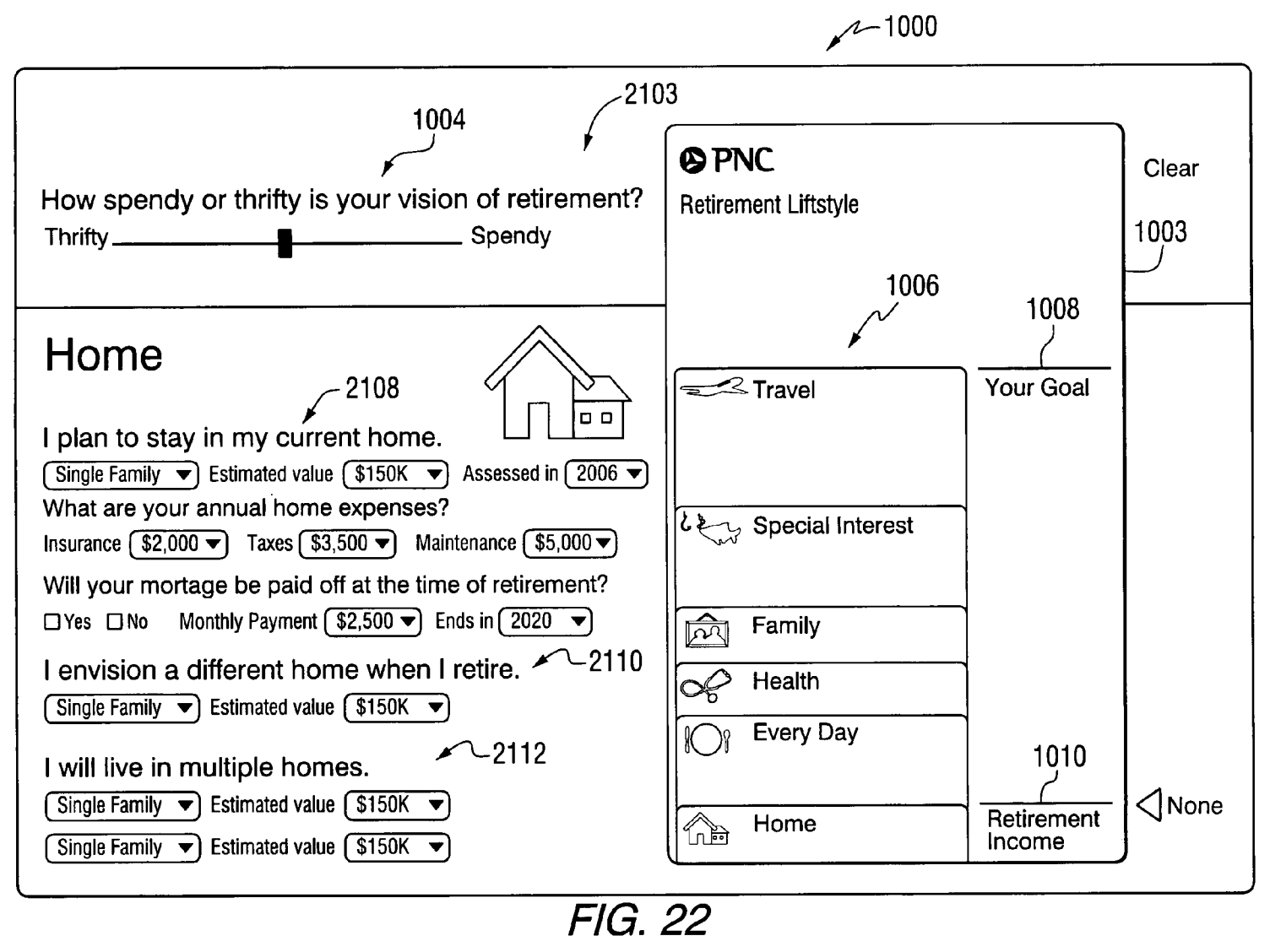

FIG. 21 illustrates one embodiment of a basic Home screen 2101 of the retirement lifestyle planning tool 1000 for receiving information about a user's anticipated shelter-related retirement costs. The screen 2101 may comprise a field 2102 for receiving an indication of whether the user will own or rent their home during retirement. A field 2104 may receive information about where the user intends to live on retirement. For example, the user may indicate an intention to live in their current home and enter the estimated value of their current home. Alternatively, the user may indicate an intention to scale up or scale down, including a property type, location and location type (e.g., urban, suburban or rural). The screen 2101 may also comprise an Add More Detail button, which may allow the user to access a high detail Home screen 2103. FIG. 22 illustrates one embodiment of the high detail Home screen 2103. The screen 2103 may comprise a current home field 2108, where users who intend to remain in their current home during retirement may enter information about their current home. Such information may include, for example, property type, estimated value, last assessment date, insurance expenses, tax expenses, maintenance costs, and mortgage information. A different home field 2110 may allow users who intend to retire to a different home to enter information about their intended retirement home including, for example, property type and value. A multiple home field 2112 may allow users who intend to have multiple homes in retirement to indicate so and provide information about each home including, for example, property type and value.

Figure 23:
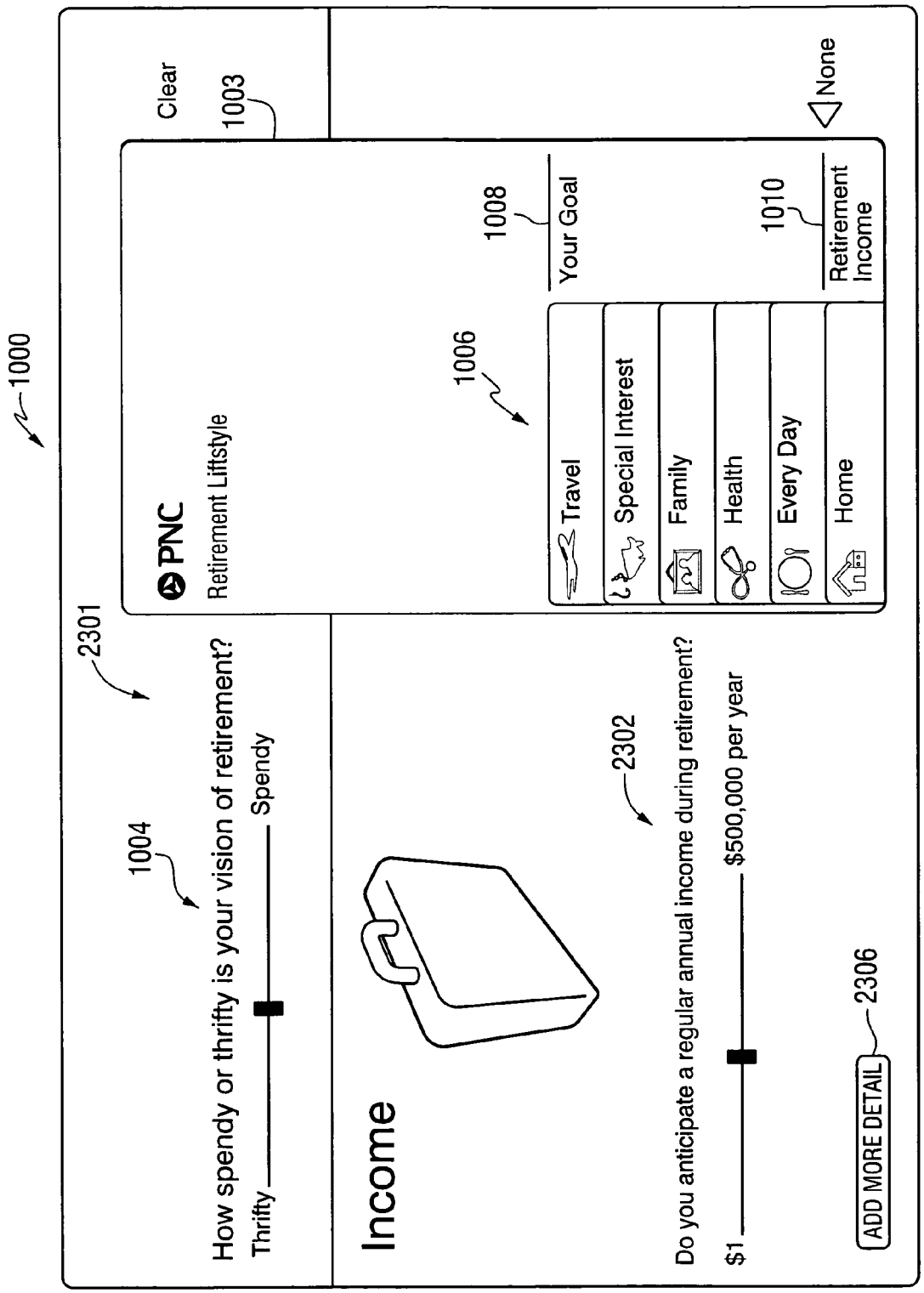
FIG. 23 illustrates one embodiment of a basic Income screen of the retirement lifestyle planning tool of FIG. 10 for receiving information about user's retirement income.
Figure 24:
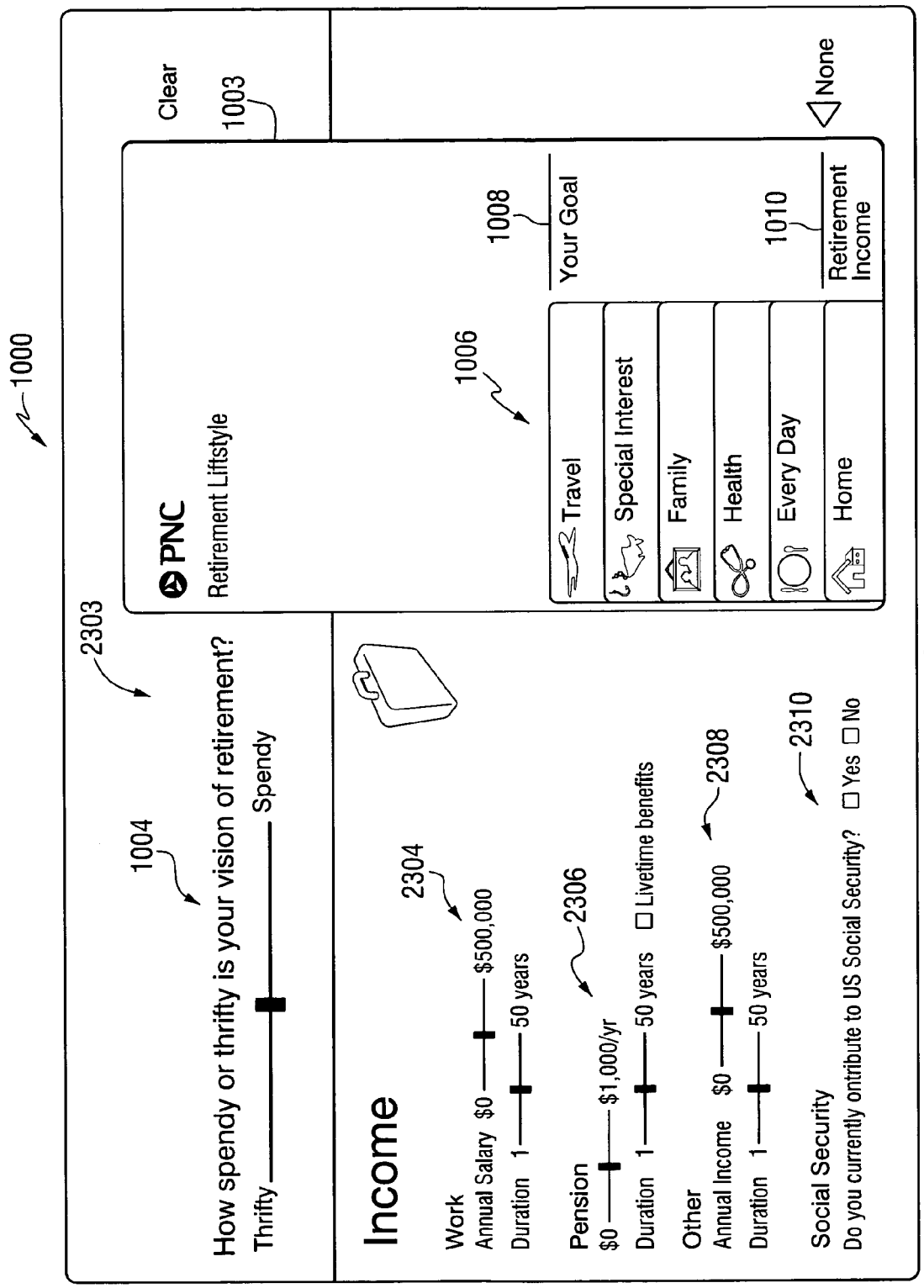
FIG. 24 illustrates one embodiment of a high detail Income screen of the retirement lifestyle planning tool of FIG. 10.

FIG. 23 illustrates one embodiment of a basic Income screen 2301 of the retirement lifestyle planning tool 1000 for receiving information about user's retirement income. The screen 2301 may comprise a slider bar or other field 2302 for receiving a user's anticipated periodic retirement income. An Add More Detail button 2306 may allow the user to access a high detail Income screen 2303. FIG. 24 illustrates one embodiment of the high detail Income screen 2303. A Work field 2304 may be configured to receive indications of the user's anticipated annual retirement salary as well as the duration of that salary during retirement. A Pension field 2306 may be configured to receive indications of the user's anticipated annual pension income, as well as the duration of the pension. An Other field 2308 may be configured to receive indications of any other income that a user expects to receive during retirement, as well as the duration of the income. Finally, a Social Security field 2310 may be configured to receive an indication of whether the user pays into the Social Security system and, therefore, may be eligible to receive Social Security benefits.

According to various embodiments, users of the tools 100, 800, 1000 described herein may enter information for each expense category by hand. In certain embodiments, however, one or more of the tools 100, 800, 1000 may comprise a mechanism allowing the user to pre-populate values for some or all of the expense categories. The host system implementing the user interface and tool 100, 800, 1000 may pre-populate expense categories in any suitable manner. For example, when the user is a pre-existing customer of the financial institution implementing the host system, the host system may utilize information about the user that is already known to the financial institution, as described above with respect to the tool 100. In addition, as described above with respect to the tool 100, the host system may retrieve information about the user from publicly available sources.

Figure 25:
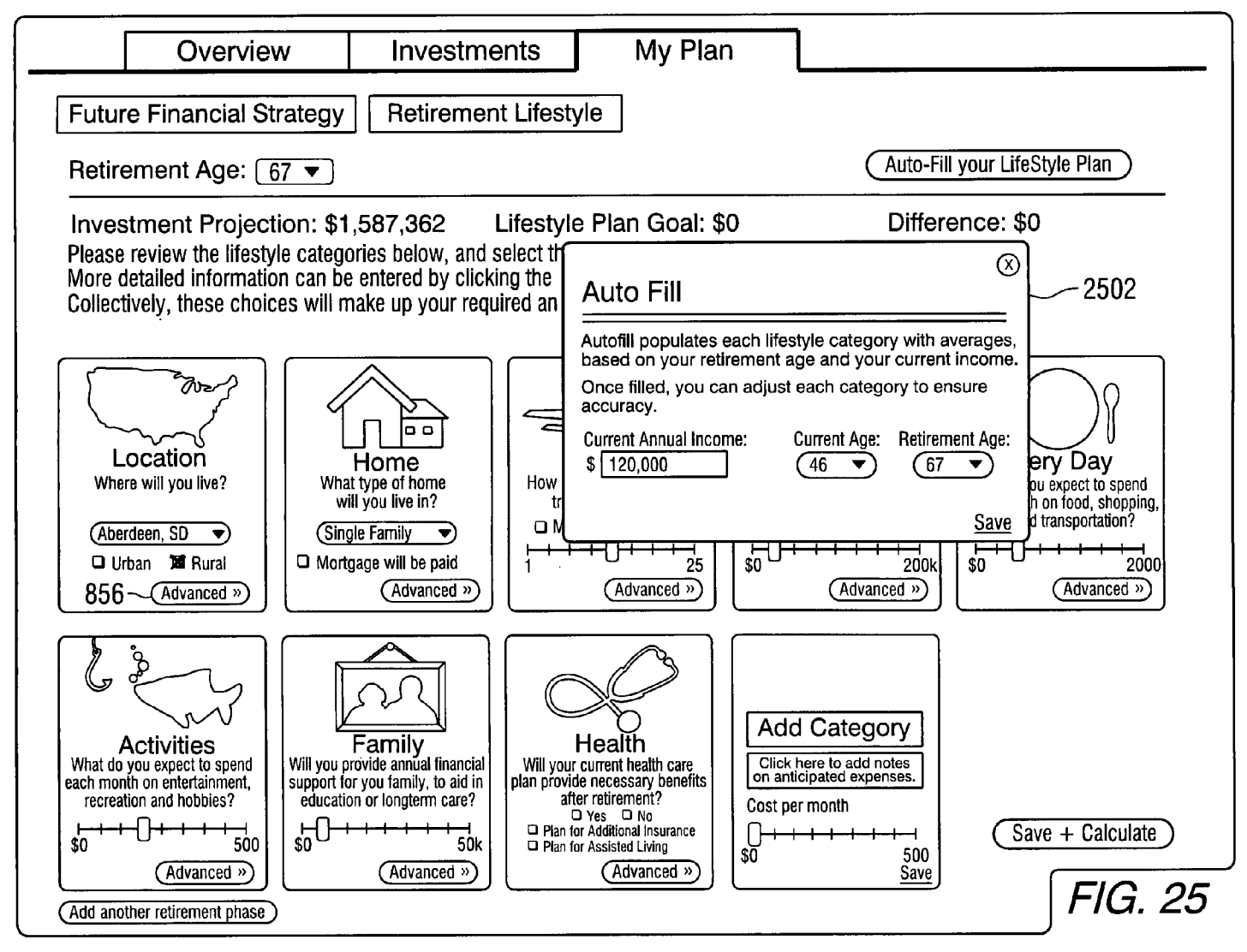

According to various embodiments, the host system may request basic classification information from the user and then pre-populate the expense categories by extrapolating from that basic data. Basic classification information may include information that indicates how much a user may desire and/or be able to spend in retirement. For example, basic classification information may include a current annual income, a current age and a desired retirement age. FIG. 25 illustrates one embodiment of an Auto Fill window 2502 for receiving basic classification information. The window 2502, or a similar form, may be displayed as a part of any of the retirement lifestyle planning tools 100, 800, 1000 described herein. For example, referring to the tool 800, the window 2502 may be displayed when the user selects the Auto-Fill your LifeStyle Plan button 802 shown in FIG. 8.

Figure 26:
FIG. 26 illustrates one embodiment of a screen describing example couples and their retirement plans.
Figure 27:
FIG. 27 illustrates one embodiment of a screen describing example individuals and their retirement plans.

In certain embodiments of the retirement lifestyle planning tools 100, 800, 1000, the host system may be programmed to pre-populate various expense categories based on a user's selection of a example individual or couple having retirement plans and goals similar to their own. For example, FIG. 26 illustrates one embodiment of a screen 2600 describing example couples and their retirement plans. Each example couple may be a real couple or hypothetical/fictional couples. A description of a first example couple 2602 indicates an extravagant retirement. A description of a second example couple 2604 indicates a comfortable retirement. A description of a third example couple 2606 indicates a simple retirement. When presented with the screen 2600, or a similar screen, a user may select the couple whose retirement best matches the user's own expectations for retirement. The host system may then populate the expense categories based on the selection. FIG. 27 illustrates one embodiment of a screen 2700 describing example individuals and their retirement plans. For example, the screen 2700 may be shown to users planning their retirement as an individual instead of as a couple. For example, the screen 2700 shown in FIG. 27 describes three example individuals 2702, 2704, 2706 each planning a different type of retirement. The example individuals may be real individuals or hypothetical/fictional individuals. Upon receiving a selection of one of the example individuals 2702, 2704, 2706, the host system may populate the expense categories for the relevant retirement lifestyle planning tool 100, 800, 1000 based on the described retirement.

Figure 28:
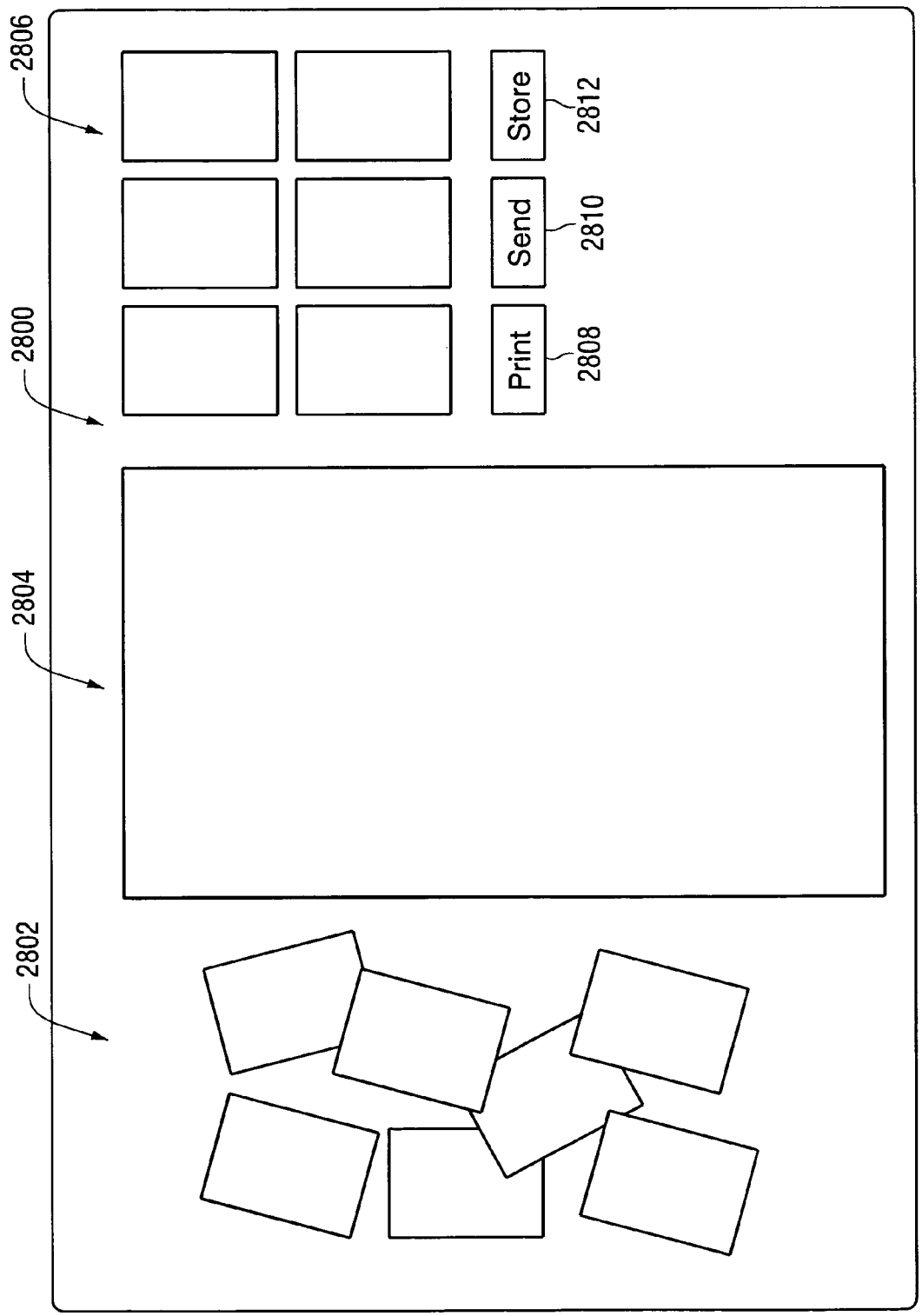
FIG. 28 illustrates one embodiment of a screen showing an alternate arrangement of a retirement lifestyle planning tool.

FIG. 28 illustrates one embodiment of a screen 2800 showing an alternate arrangement of a retirement lifestyle planning tool, such as the tools 100, 800, 1100. In the format illustrated by the screen 2800, each expense category may be represented on the screen 2800 as a card, token or other icon. A card area 2802 may comprise representations of cards, where each card corresponds to an expense category. To access a particular expense category, the user may select and drag the corresponding card to a work area 2804. This may cause the work area 2804 to display an interface for receiving either basic or high detail information regarding the selected expense category. For example, the work area 2804 may display the appropriate screen or field described above with respect to tools 100, 800, 1100 to allow the user to enter appropriate expense category information. When the user has entered information at the work area 2804, the user may drag the card corresponding to the completed expense category to completed category area 2806.

According to various embodiments, the screen 2800 may also comprise Print, Send and Store buttons 2808, 2810, 2812. These buttons may trigger various functionality for presenting results to the user and/or transitioning to a different branch device or user device 3306. For example, selecting the Print button 2808 may cause the user device or branch device showing the screen 2800 to print results of the retirement lifestyle planning tool. In certain embodiments, the printed results may also comprise a human and/or computer readable code, such as the code representations 3502, 3506 described herein, to allow the user to re-access the information entered through the screen 2800. A Send button 2810 may cause information entered through the screen 2800 to be sent to the user's e-mail address. A store button 2812 may cause information entered via the screen 2800 to be saved by the host system (e.g., to one or more of the databases 3414).

Figure 29:
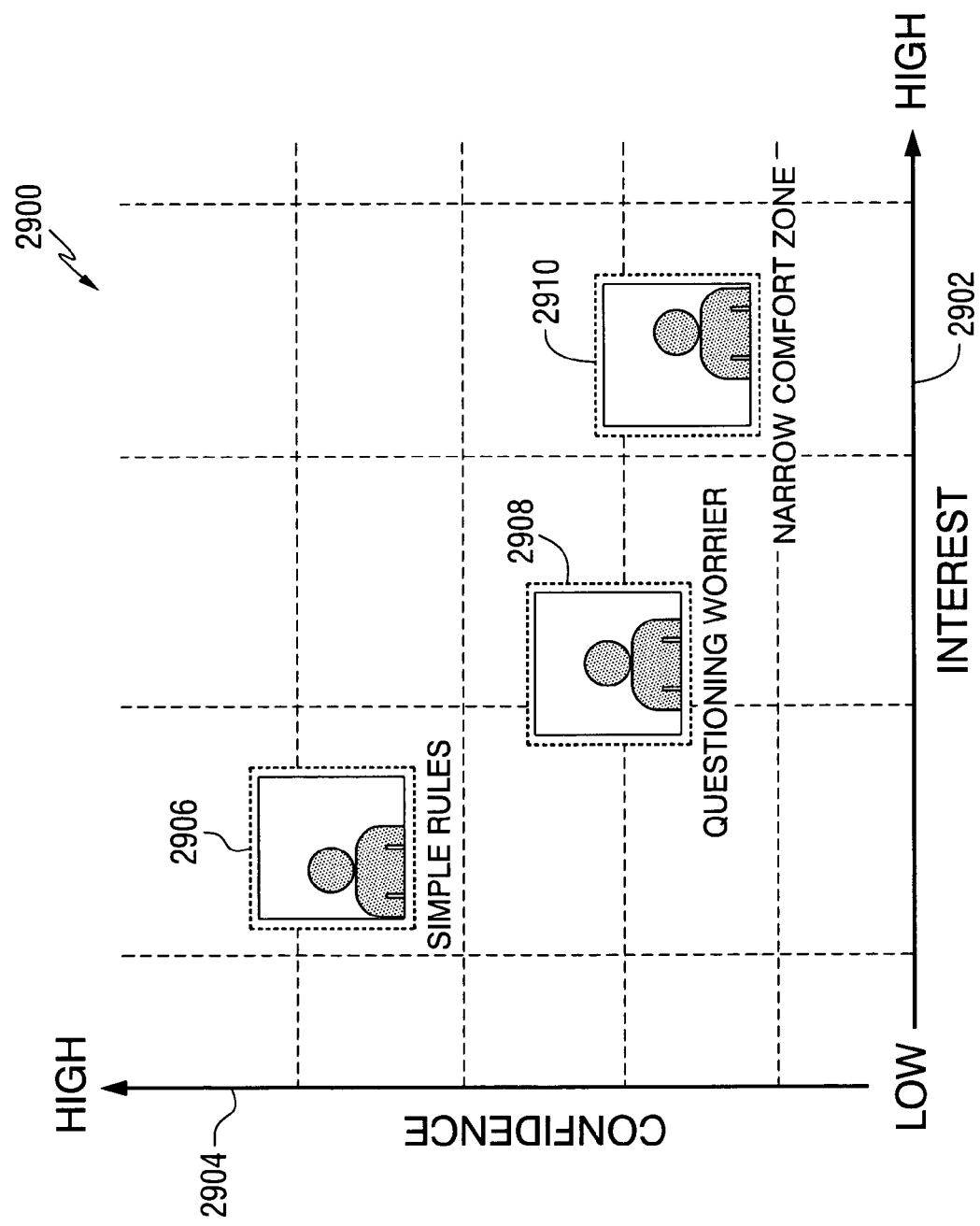
FIG. 29 illustrates one embodiment of a coordinate plane for plotting investor personality.

According to various embodiments, the host system via the user interface may provide an investor personality tool in addition to or instead of the retirement lifestyle planning tools described above. The investor personality tool may be utilized to classify a user and determine the types of investments that may be of interest to the user. In various embodiments, the investor personality tool may define an investor's personality type based on the user's position on an interest axis and a confidence axis. FIG. 29 illustrates one embodiment of a coordinate plane 2900 for plotting investor personality. The interest axis 2902 may represent a user's degree of interest in the management of their investments (e.g., the user's desired level of involvement). High interest may be represented on the right of the axis 2902, while low interest may be represented on the left of the axis 2902. The confidence axis 2904 may represent a user's confidence in their understanding and management of investments. Lower portions of the confidence axis 2904 may represent lower levels of confidence. Likewise, higher portions of the confidence axis 2904 may represent higher levels of confidence. In various embodiments, the confidence axis 2904 may be replaced with a risk-tolerance axis indicating the user's tolerance for financial risk.

The coordinate plane 2900 also illustrates three example investor types 2906, 2908, 2910 and their relative positions on the axes 2902, 2904. For example, a simple rules-type investor 2906 may an investor who quickly and effectively evaluates new propositions based on a short list of internalized metrics. Such an investor may be uncomfortable with the time and effort necessary to learn new things, manage complexity and decide between conflicting options. A questioning worrier-type investor 2908 may have some knowledge of financial basics, but may not be confident about how to move forward. Such an investor may be uncomfortable determining which questions to ask, may easily experience information overload, and may not know which sources of information to trust. A narrow comfort zone-type investor 2910 may prefer proven product categories. Such an investor may be uncomfortable seeing the big picture, with comparing options against each other, and with overcoming investing inertia.

According to various embodiments, the host system, via the user interface, may implement the investor personality tool at multiple levels. For example, the investor personality tool may have a basic level where the user is classified according to simple input such as the user's self-analysis of their interest and confidence and/or a short series of basic questions. At a high detail level, the user may be asked a series of detailed questions and/or the user's current investment history may be analyzed to more accurately place the user on the axes 2902, 2904. According to various embodiments, the basic level tool may be designed for provision at a branch device. For example, it may be relatively simple, allowing the user to provide the necessary information with a minimum of spent time and effort. Information entered and results generated by the basic level tool may then be re-accessed, for example, at a user device, utilizing a transition device such as those described herein.

Figure 30:
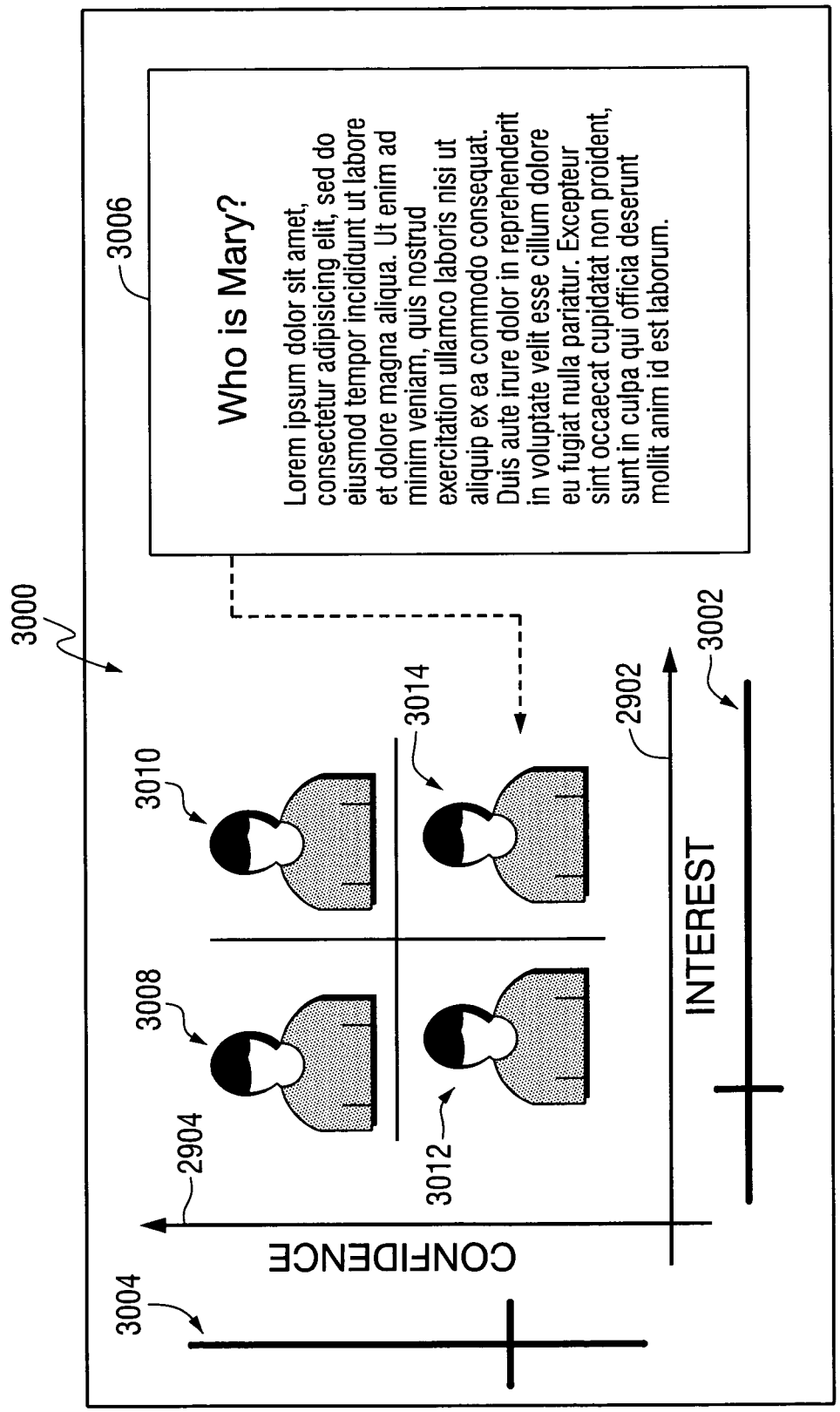
FIG. 30 illustrates one embodiment of a screen that may be provided by the user interface as a basic investor personality tool.

FIG. 30 illustrates one embodiment of a screen 3000 that may be provided by the user interface as a basic investor personality tool. The screen 3000 may comprise a representation of the interest 2902 and confidence 2904 axes described above with respect to FIG. 29. Slider bars 3002, 3002, or other suitable input fields or selection mechanisms, may appear next to each axis 2902, 2904 to allow a user to rank him or herself in each axis. According to various embodiments, the screen 3000 may also comprise representations of example investors 3008, 3010, 3012, 3014 placed at different positions on the axes 2902, 2904. When the user selects an example investor 3008, 3010, 3012, 3014, a description of the selected investor may appear at description window 3006. In this way, the user may study the descriptions of each example investor at 3006 in order to place themselves on the axes 2902, 2904 using slider bars 3002, 3004. The user's investor personality, as determined by the host system utilizing information received through the screen 3000, may be used to provide suggested investments via the user interface 45. Also, the user's investor personality may be used as a tool to encourage the user to access the interface again, for example, from a user device in order to provide more detailed information and receive a more detailed investor personality.

Figure 31:
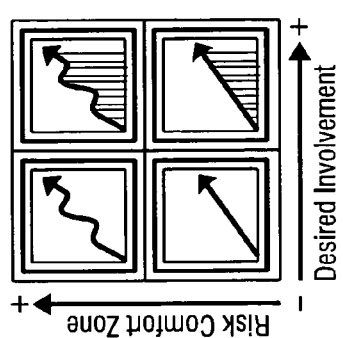
FIG. 31 illustrates one embodiment of a screen for implementing a high detail level of the investor personality device.

FIG. 31 illustrates one embodiment of a screen 3100 for implementing a high detail level of the investor personality device. The screen 3100 may be displayed, for example, at any location within the interface 45. As illustrated, the screen 3100 comprises a Start Now button 3102. Upon selecting the Start Now button 3102, the user may be prompted to answer a series of questions. The questions may be developed to place the user on the axes 2902, 2904 described above. The number and type of questions may be selected in order to generate a statistically significant placement. Based on the answers to the questions, the host system (e.g., the application server 3404) may generate an investor personality description for the user based on the user's positions on the axes 2902, 2904. FIG. 32 illustrates one embodiment of a screen 3200 providing an investor personality description to a user who is classified as a "Slow and Steady+Active Management" investor personality type. Other non-indicated personality types are also described.

Figure 33:
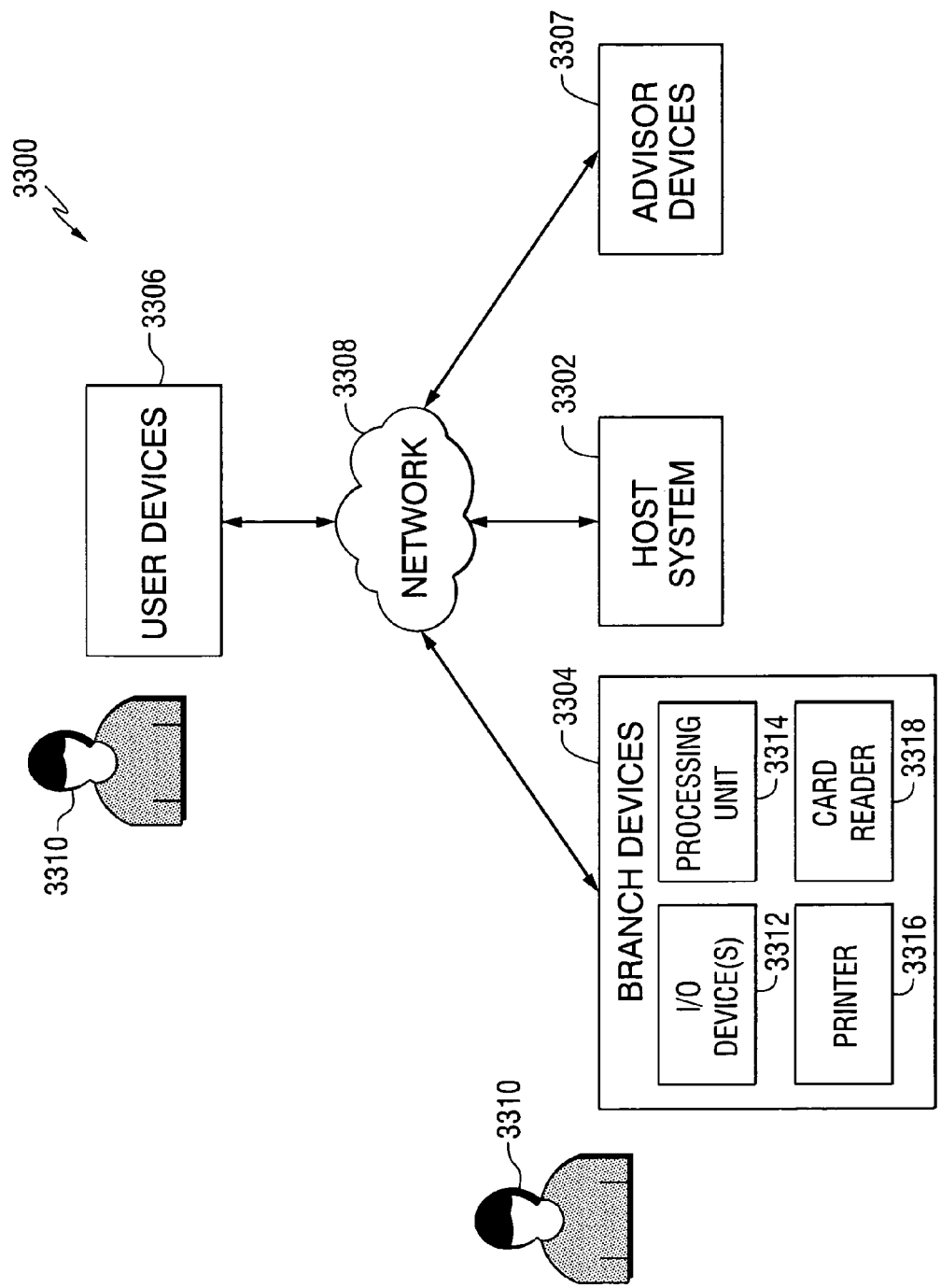
FIG. 33 illustrates one embodiment of a system for providing clients and potential clients a user interface for facilitating investment services.

FIG. 33 illustrates one embodiment of a system 3300 for providing the user interface described above to clients and potential clients. The system 3300 may be implemented, for example, by a financial institution that markets and administers investment services. According to various embodiments, the system may comprise a host system 3302, one or more branch devices 3304, one or more advisor devices 3307 and may be in communication with one or more user devices 3306. The various components of the system 3300 may communicate via a communications network 3308. The communications network 3308 may be any suitable wired, wireless or mixed network. For example, the communications network 3308 may be partially or completely comprised of one or more of the Internet, a Public Switched Telephone Network (PSTN), a cellular or mobile telephone network, etc. The host system 3302 may be configured to administer the user interface and may be located at any suitable location. The host system 3302 may comprise any suitable type of computing hardware including, for example, one or more servers, one or more databases, suitable input/output (I/O) devices, etc.

The one or more branch devices 3304 may be provided at public locations including, for example, branch offices of the financial institution, shopping centers and may allow clients or potential clients (e.g., users 3310) to access the interface. The branch devices 3304 may comprise various computer hardware including, for example, a processing unit 3314, various input/output (I/O) devices 3312. The processing unit 3314 may comprise any suitable type of computer device including, for example, a personal computer, a server, a central processing unit (CPU), etc. The I/O devices 3312 may comprise any suitable type of I/O devices allowing the user 3310 to access the interface via the branch device 3304. Example I/O devices may include monitors, touch-screens, keyboards, track-balls or other pointing devices, etc. In various embodiments, branch devices 3304 may also comprise a printer 3316, and/or a card reader 3318. The printer 3316 and/or card reader 3318 may be utilized by one or more transition mechanisms, described below, which allow the user 3310 to re-access data entered into and analysis received through the interface at the branch devices 3304. It will be appreciated that, depending on the transition mechanism or mechanisms utilized, the printer 3316, the card reader 3318 or both may be omitted and/or replaced with alternative hardware. It will also be appreciated that, in certain embodiments, branch devices 3304 may be, or may comprise, an automated teller machine (ATM).

The user device 3306 may be any suitable type of computer device owned by or accessible to users 3310 that allows the users 3310 to access the user interface 45. Example user devices 3306 may include any suitable network-enabled devices such as, for example, personal computers (PC's), automated teller machines (ATM's), palmtop computers, mobile phones, etc. Each user device 3306 may be associated with one or more users 3310 and may allow the users 3310 to access the user interface, denoted as 45. According to various embodiments, user devices 3306 may be configured to transmit and receive information via the communication network 3308 using a wired or wireless connection, and may include a suitable browser software application including, for example, MICROSOFT INTERNET EXPLORER, MICROSOFT INTERNET EXPLORER MOBILE, MOZILLA FIREFOX, PALM BLAZER, etc.) for enabling the customer to display, enter and interact with information exchanged via the communication network 3410. The user devices 3306 may thus access and navigate static and/or dynamic HTML documents of the user interface 45. According to various embodiments, some or all of the user devices 3306 may comprise a camera (not shown) or other code-reading or image capturing devices.

Advisor devices 3307 may be similar to user devices 3306 and may also communicate via the communications network 3308. Advisor devices 3307 may be utilized by financial advisors in various capacities relative to the user interface 45. For example, advisor devices 3307 may be used by financial advisors to upload research and other written material to be accessed by users 3310 via the interface. Also, for example, advisors may utilize advisor devices 3307 to conduct live-chats with users 3310 regarding investments.

Figure 34:
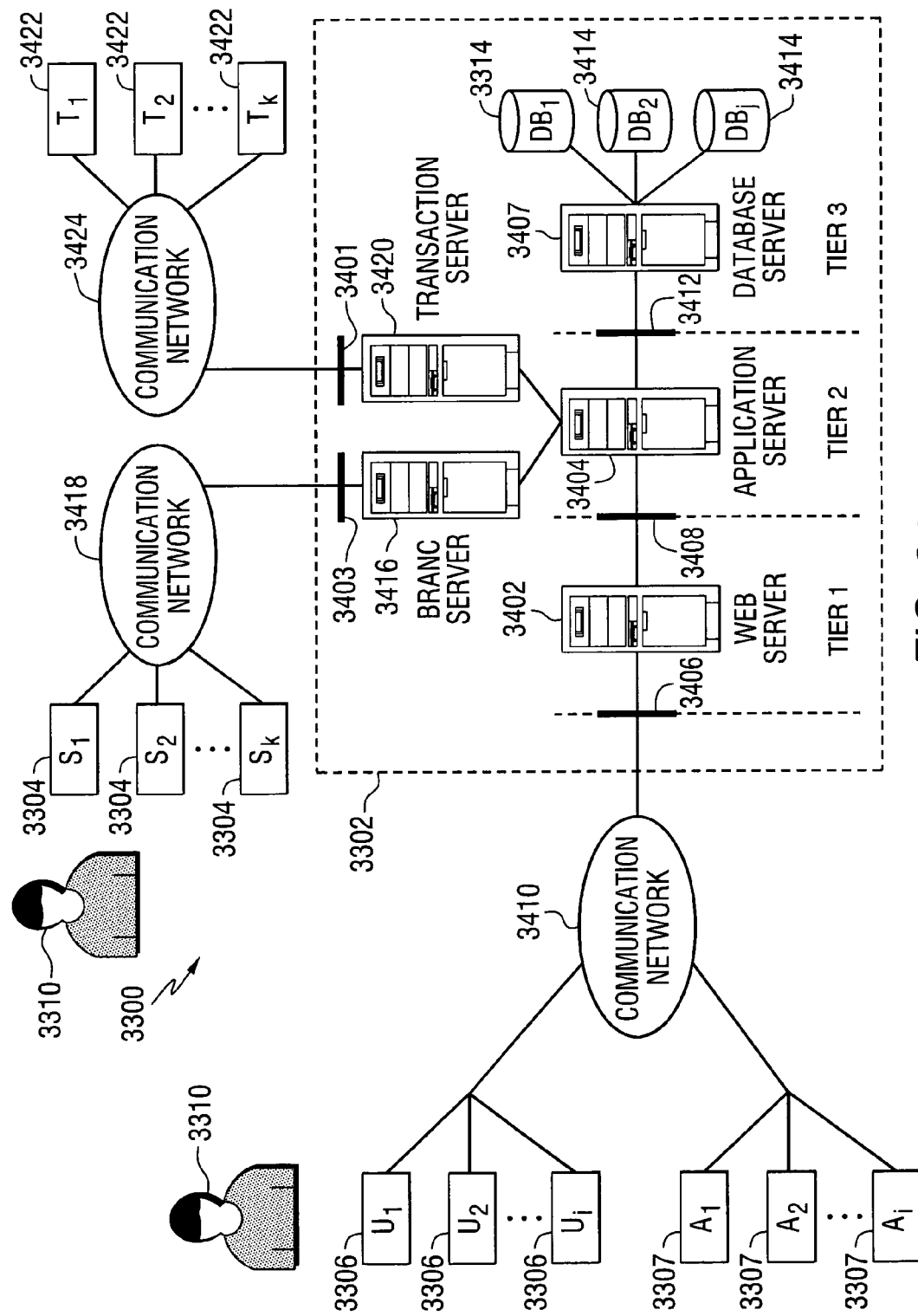
FIG. 34 illustrates one embodiment of the system of FIG. 33 showing various components in additional detail.

FIG. 34 illustrates one embodiment of the system 3300, showing various components in additional detail. As shown in FIG. 34, the host system 3302 may be arranged in a tiered network architecture and may include a Web server 3402, an application server 3404, and a database server 3407. The Web server 3402 may correspond to a first tier of the host system 3302 and may communicate with the user devices 3306 via a border firewall 3406 and a communication network 3410, which may be a component of the communications network 3308 described above. The host system 3302 may also communicate with the application server 3404 via an application firewall 3408. The Web server 3402 may be configured to accept requests from one or more of the user devices 3306 and/or advisor devices 3307 via the communication network 3410 and provide responses. The requests and responses may be formatted according to Hypertext Transfer Protocol (HTTP) or any other suitable format. The responses may include, for example, static and/or dynamic documents for providing the investment services user interface to users 3310 via the user devices 3306 and advisors on the advisor devices 3307. The documents may be formatted according to the Hypertext Markup Language (HTML) or any other suitable format. For interactions with the user interface requiring authentication, the Web server 3402 may further be configured to authenticate credentials of each user before allowing access to the relevant portions of the user interface. Such authentication may be performed, for example, using a user name and a password. Additional security measures may be utilized in the authentication process if desired.

A second tier of the host system 3302 may comprise an application server 3404. The application server 3404 may communicate with the Web server 3402 and the data base server 3407 (e.g., Tier 3) via the application firewall 3408 and an internal firewall 3412, respectively. The application server 3404 may host one or more Internet banking applications for executing the business logic associated with the user interface including, for example, the investment-related tools described herein. The application server 3404 may receive user-entered information from the user interface of each user device 3306 and/or branch device 3304 via the Web server 3402. Such information may include, for example, a user name and password, customer requests to access particular investment features, information for use with the investment-related tools, etc. Based on this and other information received from the user devices 3306 via the Web server 3402, the application server 3404 may perform transactions (e.g., execute investment products purchases and sales, transfer funds between investment accounts, retrieve investment account balances, etc.) and generate corresponding informational content (e.g., transfer confirmations, account balance information, etc.). Information regarding such transactions may be communicated to the Web server 3402 and subsequently presented to the customers using, for example, a dynamic Web page of the user interface 45. The application server 3404 may also implement the investment-related tools described herein and provide investment advice including, for example, prepared written advice or live advice from an investment advisor via an advisor device 3307.

The third tier of the host system 3302 may comprise a database server 3407, which may communicate with the application server 3404 via the internal firewall 3412. The database server 3407 may manage one or more databases 3414 containing data necessary for supporting one or more investment services features. Such databases may include, for example, an account information database, a customer information database, a customer preferences/settings database, as well as other databases for storing additional settings and/or configurations. Such information may be retrieved, processed and updated as needed by the application server 3404 based on the particular Internet banking features(s) being used. According to various embodiments, for example, when the financial institution also provides general banking services, the databases 3414 may also comprise information regarding a user's general banking activities. Also, according to various embodiments, the databases 3414 may comprise data used to pre-populate all or a portion of the retirement lifestyle planning tool and/or investor personality tool, as described herein.

The host system 3302 may further comprise a branch server 3416 in communication with the application server 3404 for enabling access to the user interface via the branch devices 3304. The branch devices 3304 may be in communication with the host system 3302 (e.g., the branch server 3416) via a communications network 3418 and firewall 3403. Although the communication network 3418 is depicted separately from the communication network 3410, it will be appreciated that the communication networks 3410, 3418 may be components of the network 3308 described above.

According to various embodiments, the host system 3302 may also comprise a transaction server 3420 in communication with the application server 3404. The transaction server 3420 may enable investment transactions between users 3310 and investment product managers 3422 (e.g., via network 3424). For example, the transaction server 3420 may implement functionality allowing users 3310 to purchase investment products, sell investment products, receive estimates for the purchase of investment products, etc. The investment product managers 3422 may include, for example, mutual fund transfer agents, etc. Transactions with the investment product managers 3422 may be communicated to and from the investment product managers 3422 to the transaction server 3420 via communication network 3418, which may be a component of the network 3308. In various embodiments, however, the network 3418 may be implemented as a secure proprietary network. A transaction firewall 3426 may be present between the transaction server 3420 and the communication network 3418.

It will be appreciated that, according to various embodiments, the host system 3302 may also have additional functionality. For example, when the financial institution implementing the host system 3302 also provides general banking services, the host system 3302 may comprise additional functionality and/or additional components to facilitate general banking services including, for example, deposit transactions, withdrawal transactions, electronic bill payment transactions, balance inquiries, fund transfers, etc.

According to various embodiments, the branch devices 3304 and/or user devices 3306 may comprise one or more transition mechanisms. The transition mechanisms may allow a user to access the user interface at a branch device 3304 and then later re-access the interface 45, either via another branch device 3304 or via a user device 3306, without losing information originally entered at the first branch device 3304. This functionality may allow the interface 45, as described below, to serve as a marketing tool. For example, users 3310 (investment clients or potential investment clients) may be drawn to the branch devices 3304 at public locations. The users 3310 may enter, for example, basic, high-level information about themselves into one or more investment-related tools provided through the user interface 45. The interface 45, via the branch devices 3304, may be configured to provide the user with basic financial services sufficient to entice the user to re-access the interface later, for example, via another branch device 3304 or a user device 3306 (e.g., in a more private setting). When re-accessing the interface 45, the user may build on the basic information previously entered by entering more detailed information. This may enable the interface to provide additional information and results through the investment-related tools. The interface 45, for example, as provided through the user devices 3306, may provide functionality allowing users to receive more detailed financial advice, speak directly to a financial advisor, execute investment transactions, etc.

Various types of transition mechanisms may be used. For example, all or a portion of the branch devices 3304 may comprise a card reader 3318 similar to the card reader at an automated teller machine (ATM). Of course, in embodiments where a branch device 3304 is or includes an ATM, it may not be necessary to include an additional card reader. Users who are existing customers of the financial institution may access the user interface at a branch device 3304 by providing their ATM card to the reader (e.g., by depositing the card, swiping the card, etc.). The branch device 3304 may be in communication with the host system 3302. Accordingly, the host system 3302 may store some or all of the information entered by the user through the user interface (e.g., at one or more of databases 3414). When the user logs-in and authenticates him or herself to the user interface via a user device 3306, or using their ATM card at another branch device 3304, the host system 3302 may recall information stored by the user via the first branch device 3304.

While the ATM card mechanism described above may be most useful for users who are already customers of the financial institution in some capacity, it will be appreciated that other transition mechanisms may be used in addition to or instead of the ATM card mechanism in order to facilitate users who are not pre-existing customers of the financial institution. For example, according to one mechanism, the branch device 3304 may comprise a card reader 3318 with the capability to scan a non-ATM identification card such as, for example, a drivers license or a credit card. The host system 3302 may then store information entered by the user via the branch device 3304 in a manner associated with the scanned drivers license or credit card. When the user later re-accesses the user interface (e.g., via a user device 3306) the user may re-scan and/or enter information about the drivers license or credit card used. This may allow the host system 3302 to retrieve the user's previously entered information.

In addition to or instead of the card reader 3318 mechanisms described above, certain embodiments of the user interface may be configured to prompt the user for an e-mail address or other identifying information (e.g., a name, an address, user name, etc.). Information entered by the user may be stored at the host system 3302 in association with the identifying information. When the user re-accesses the user interface (e.g., via a user device 3306) the host system 3302 may prompt the user for the identifying information entered at the branch device 3304 and may retrieve the associated stored information.

According to yet another embodiment, in addition to or instead of any of the transition mechanisms described above, the branch devices 3304 may provide users with a card, paper or other generated medium comprising a human or computer readable code that may be used to retrieve the information entered by the user at the branch device 3304. When the user accesses the user interface via the branch device 3304, the host system 3302 may be configured to store received information in association with the code. For example, information received and/or generated from a user session with a branch device 3304 may be stored at one of the databases 3414 and indexed in a searchable manner by the code. At the conclusion of the user session with the user interface 45, the branch device 3304 may generate (e.g., via printer 3316) a medium comprising the code in human and/or computer readable form.

Figure 35:
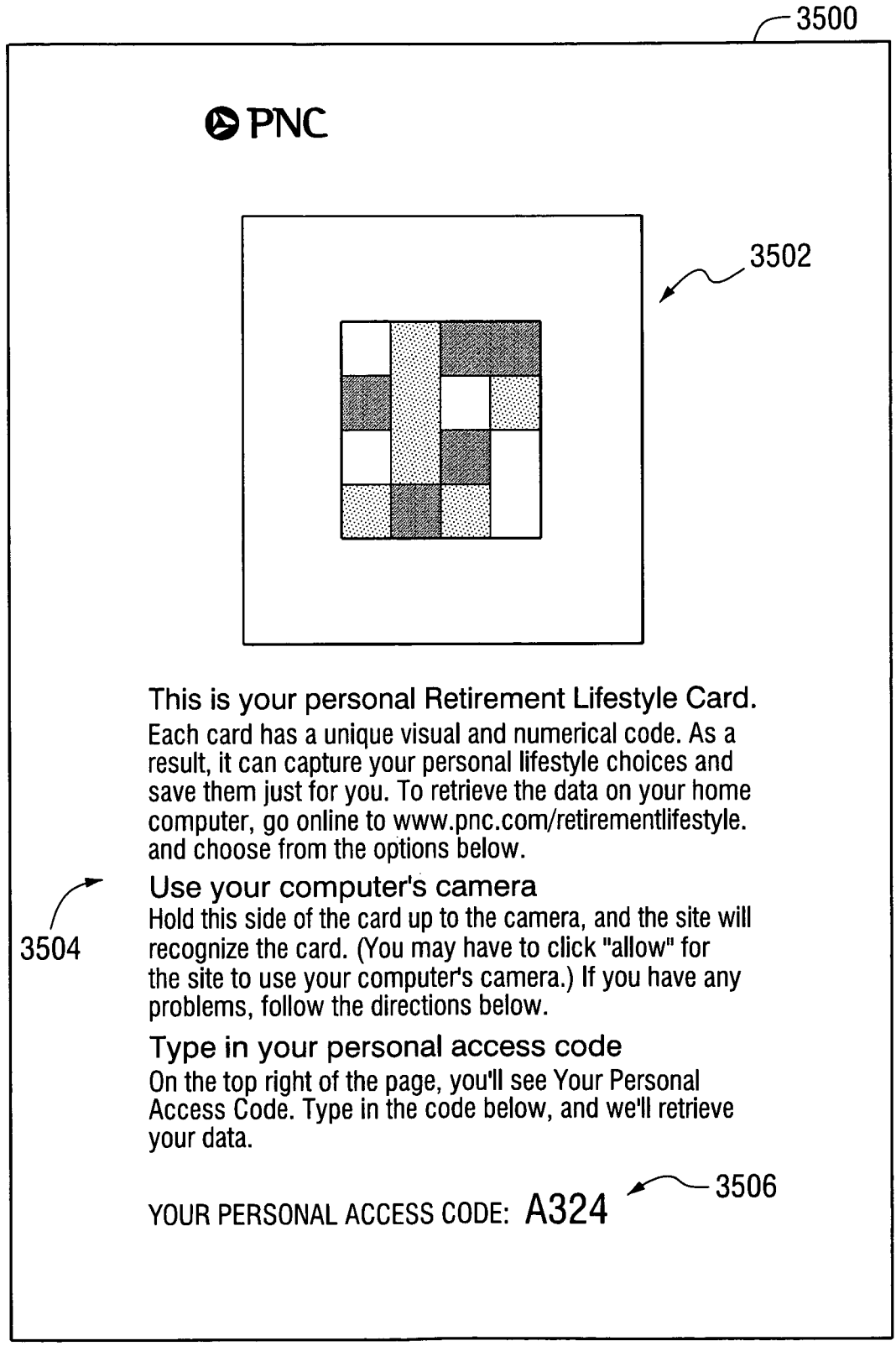
FIG. 35 illustrates one embodiment of a transition mechanism comprising a printed card showing an example code in human and computer readable form.

FIG. 35 illustrates one embodiment of a medium 3500 (e.g., a printed card) comprising an example code in human and computer readable form. The card 3500 may comprise a computer readable representation 3502 of the code, as well as a human readable representation 3506 of the code. In addition, the card 3500 may comprise written directions 3504 instructing a user how to access the user interface via a user device 3306 using one or both of the representations 3502, 3506. The human readable representation 3506 may be any suitable combination of numbers, letters and/or symbols that the user may provide to the host system 3302 via the user device 3306 or a branch device 3304. For example, the human readable representation 3506 shown in FIG. 35 is "A324." To access stored information, the user may enter the code (e.g., either via another branch device 3304 or via a user device 3306). It will be appreciated that not all media will contain a code in both human and computer readable form.

Figure 36:
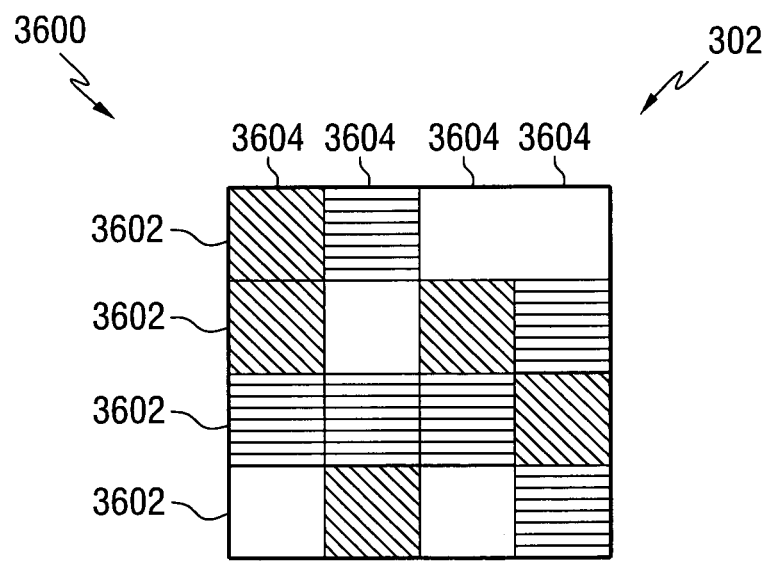
FIG. 36 illustrates one embodiment of a grid corresponding to the computer readable code representation of FIG. 35.

The computer readable representation 3502 of the code may be any representation readable by a computer. For example, the computer readable representation 3502 may comprise a bar code, or some other type of visual code. The example representation 3502 shown in FIG. 35 comprises a grid where each location on the grid may have one of multiple visual states. FIG. 36 illustrates one embodiment of a grid 3600 corresponding to the computer readable code representation 3502. The grid 3600 may comprise a plurality of elements. Each element may be identified by one of a plurality of rows 3602 and one of a plurality of columns 3604. Each element may take one of a discrete number of visual states (e.g., colors) with each discrete state corresponding to a value. According to various embodiments, the number of potential values of the code representable by the representation 3502 may be equal to the total number of discrete visual states raised to the power of the number of elements. For example, if there are sixteen elements and three possible element colors, the total number of possible combinations may be $3^{16}$, or $4.3 \times 10^7$. According to various embodiments, a user device 3306 may comprise a camera or other image capturing device, for capturing an image of the computer readable representation 3502. The user device 3306 may decode the resulting image and derive the code. The code may then be provided to the host system 3302, which may return data previously entered by the user 3310, for example, at a branch device 3304.

Figure 37:
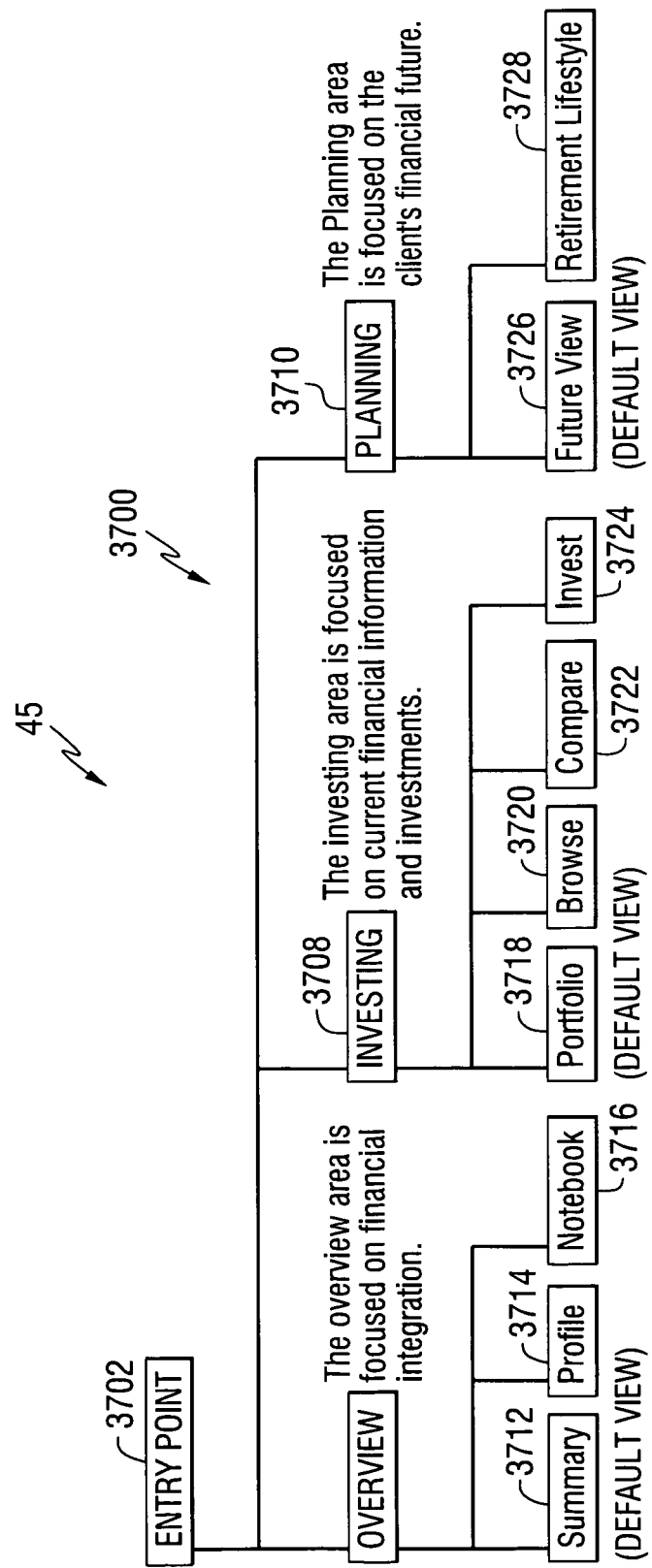
FIG. 37 illustrates a block diagram of one embodiment of a user interface which may include functionality implementing the retirement lifestyle planning tools and the investor personality tools described above as well as additional investment services.

FIG. 37 illustrates a block diagram 3700 of one embodiment of the user interface 45, which may include functionality implementing the retirement lifestyle planning tools 100, 800, 1000 and the investor personality tools described above as well as additional investment services. According to various embodiments, not all of the features and/or pages of the interface shown in the diagram 3700 may be available to all users at all locations. For example, some of the pages and/or functionality of the interface may be available only to users who are investment customers of the financial institution implementing the host system 3302 and interface 45. Also, for example, some pages and/or functionality of the interface may be available only via a user device 3306. For example, pages providing or requiring detailed, personal information may not be available via a branch device 3304. Also, for example, functionality to execute investment transactions may not be available via a branch device 3304.

A user may access the interface via the entry point 3702. For example, at the entry point 3702, the host system 3302 or other component may authenticate the user. In certain embodiments, the host system 3302 may also determine which features and/or pages of the interface are available to the user based on authentication performed at the entry point 3702. From the entry point 3702, the example interface shown in FIG. 37 comprises three sections, an Overview section 3704, an Investing section 3708 and a Planning section 3710.

FIG. 38 illustrates one embodiment of the Overview section 3704 of the user interface with a Summary screen 3712 selected. As illustrated, the Overview section 3704 may take the form of a screen that may be displayed, for example, at a user device 3306 and/or a branch device 3304. The Overview section 3704 may provide the user with high-level information describing the user's banking and/or investment activities and may, for example, provide access to some investment-related tools. The Overview section 3704 may comprise a tab bar 3730 allowing the user to navigate between the Overview section 3704, as shown in FIG. 38, and the other sections (e.g., the Investing section 3734 and the Planning section 3736). For example, an Overview tab 3732 may be selected to display the Overview section 3704; an Investing tab 3734 may be selected to display the Investing section 3708 and a Planning tab 3736 may be selected to display the Planning section 3710. The example Overview section 3704 shown in FIG. 37 comprises three screens: a Summary screen 3712, a Profile screen 3714 and a Notebook screen 3716. Referring back to FIG. 38, these screens 3712, 3714, 3716 may be accessed, for example, utilizing tab bar 3731. For example, the tab bar 3731 may comprise a Summary tab 3802 corresponding to the Summary screen 3712, a Profile tab 3804 corresponding to the Profile screen 3714 and a Notebook tab 3716 corresponding to the Notebook screen 3716.

In FIG. 38, the Summary tab 3802 is selected, causing the Summary screen 3712 to be displayed. As illustrated, the Summary screen 3712 may comprise an account summary field 3808. The account summary field 3808 may be applicable to users who also utilize the financial institution implementing the host system 3302 for general banking services. For example, the account summary field 3808 may list the user's balances in various general banking accounts such as, for example, checking accounts, savings accounts, certificates of deposit, etc. An Investing field 3810 may provide a summary of the user's current investments with the financial institution. For example, the Investing field 3810 may provide information relating to investment transactions entered and/or managed via the Investing section 3708 described herein. A Planning field 3812 may provide a summary of an investment-related tool provided by the user interface 3710 for retirement planning that may include, for example, one or a combination of the various retirement lifestyle planning tools described herein. A Notebook field 3814 may provide a summary of a notebook investment-related tool provided to the user via the interface and described in more detail below in conjunction with the Notebook screen 3712. The embodiment of the summary screen 3712 shown in FIG. 38 may also comprise a Key Questions field 3816. The host system 3302 may populate the Key Questions field 3816 with investment-related questions. The user may select questions from the Key Questions field 3816 to view answers that may be helpful for investing. Also, for example, an Ask an Investment Guide field 3818 may be provided to allow the user to engage in live chats with investment advisors of the financial institution. The advisors, for example, may access the host system 3302, and thus the interface 45, via one or more advisor devices 3307. It will be appreciated that the Notebook field 3814, the Key Questions field 3816, and/or the Notebook field 3814 may appear in various screens throughout the interface 45, as illustrated.

FIG. 39 illustrates one embodiment of the Overview section 3704 of the user interface with the Profile screen 3714 selected (e.g., by the selection of tab 3804). The Profile screen 3714 may generally comprise information stored by the host system 3302 and describing the user. For example, a Personal Information field 3902 may comprise personal information about the user including, for example, address, phone number, etc. The user may select an Edit button 3912 to update information shown at the field 3902. A Financial Information field 3904 may indicate financial information about the user known to the financial institution including, for example, income, mortgage, loan types, etc. The user may edit the financial information shown at field 3904, for example, by selecting the Edit button 3914. An Investor Personality field 3906 may provide the results of the investor personality tool described herein. An edit button 3916 may allow the user to reevaluate their investor personality, for example, utilizing any of the methodologies exemplified by FIGS. 30-36 above and the descriptions thereof. A Privacy Preferences field 3908 may display privacy settings for the user, which may be modified by selecting the Edit button 3918. An Advisor Information field 3910 may display information about a financial advisor assigned to the user. If the user has not yet worked with a financial advisor at the financial institution, an advisor may be selected and displayed at field 3910, for example, in a random fashion, or considering financial information describing the user. In various embodiments, the user may change their financial advisor, for example, by selecting the Edit button 3920.

Figure 40:
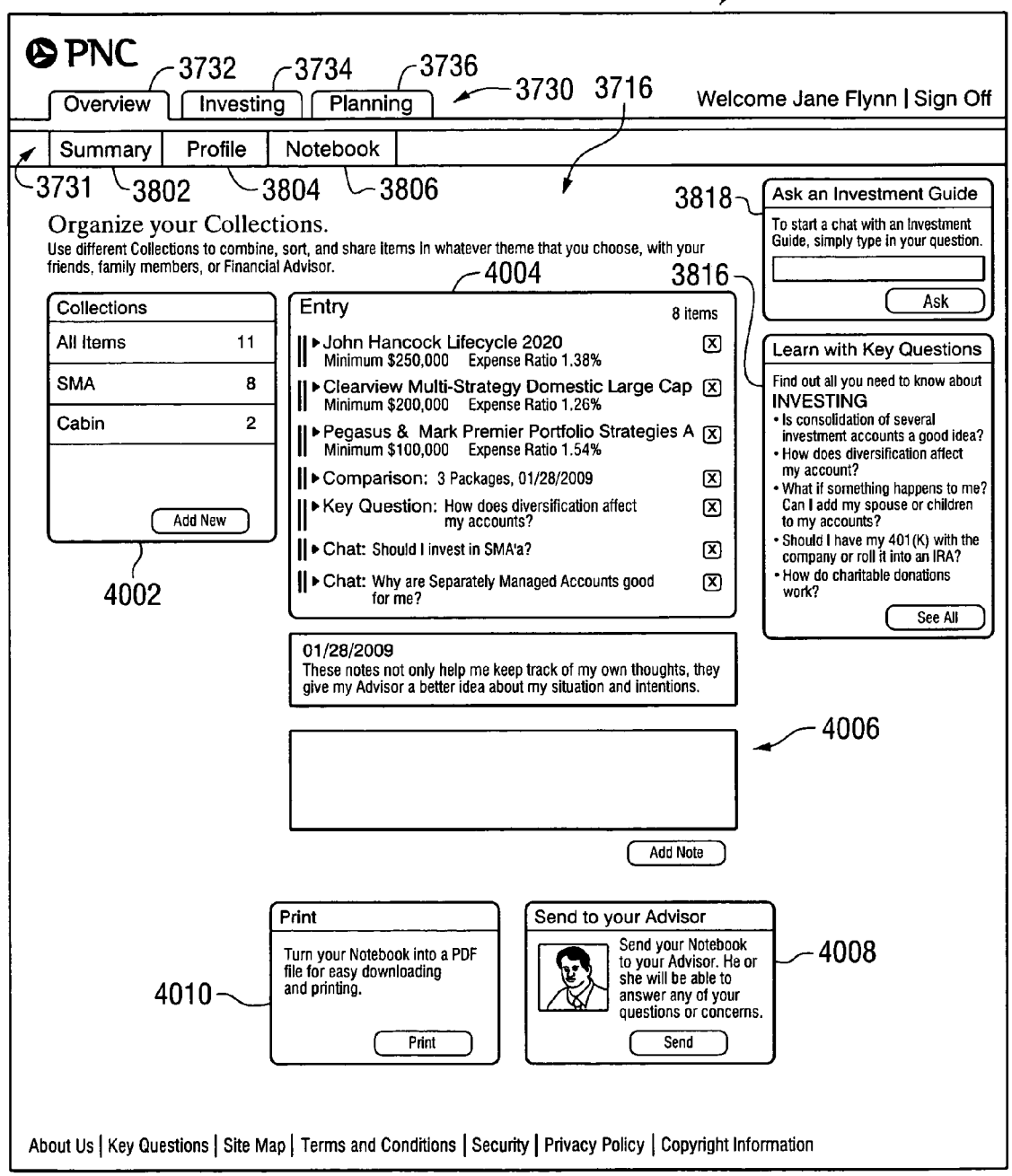
FIG. 40 illustrates one embodiment of the Overview section of the interface of FIG. 37 with a Notebook screen selected.

FIG. 40 illustrates one embodiment of the Overview section 3704 of the interface with the Notebook screen 3716 selected (e.g., via tab 3806). The Notebook screen 3716 may provide the user with an investment-related notebook tool allowing the user to capture their thoughts about various investments or investment strategies. Entries in the notebook tool may be forwarded to the user's investment advisor or advisors. The advisor may respond to questions posed by the user and may also utilize the information provided through the notebook tool to learn about the user in order to provided better investment advice. The Notebook screen 3716 may comprise an Entry field 4004. The Entry field 4004 may comprise entries made by the user. Each entry may describe an investment-related thought including, for example, an investment question, an investment objective, a particular investment product, etc. A field 4006 may provide the user with functionality for creating entries in the Entry field 4004. According to various embodiments, entries in the Entry field 4004 may be assigned different categories. A Collections field 4002 may indicate the number of entries in each category. A Print field 4010 may allow the user to print one or more notebook entries. A Send to your Advisor field 4008 may allow the user to send some or all of the entries from the Entry field 4004 to an advisor of the financial institution.

Figure 42:
FIG. 42 illustrates one embodiment of the Portfolio screen with a Contribution window displayed.
Figure 45:
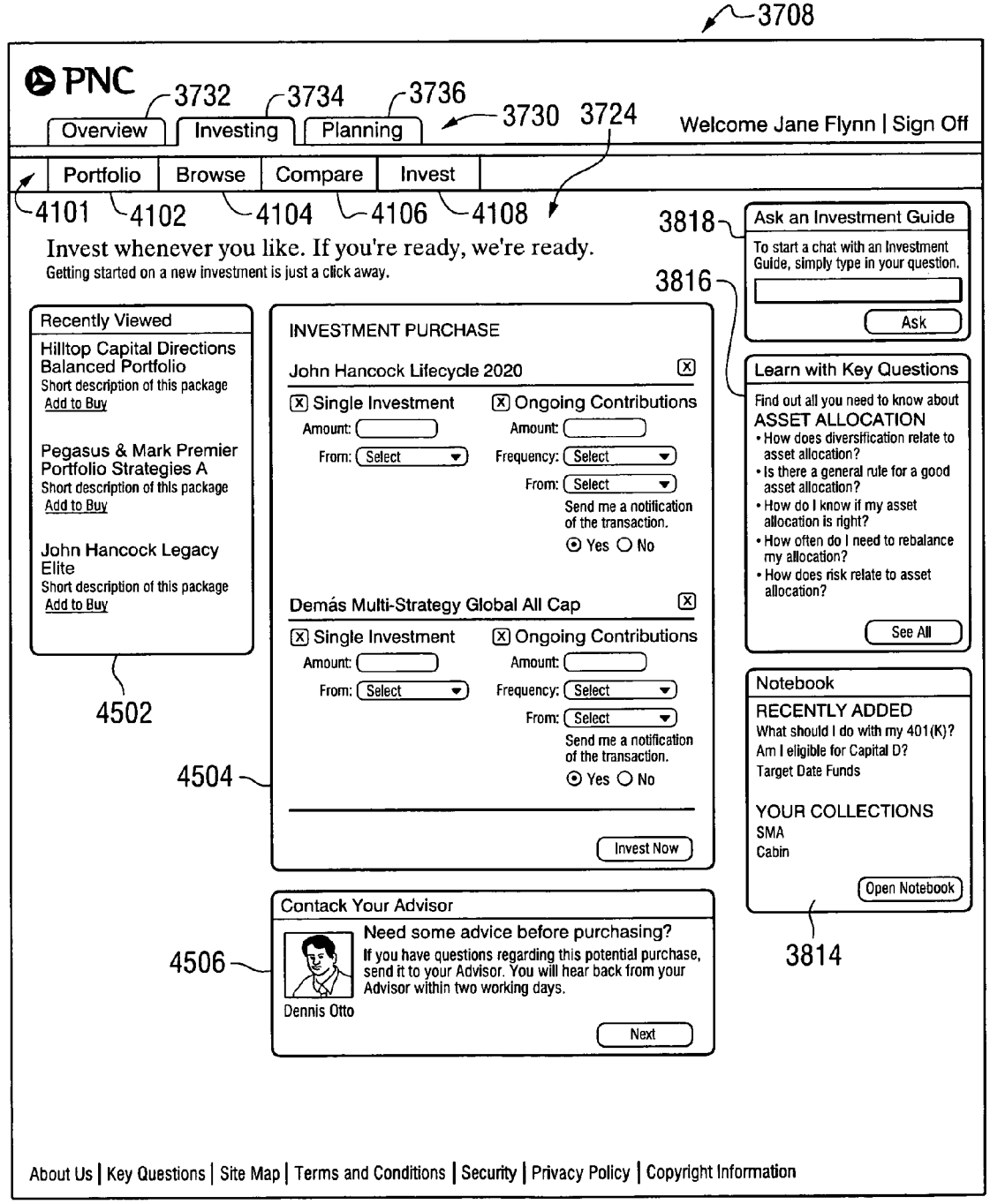
FIG. 45 illustrates one embodiment of the Investing section of the interface of FIG. 37 with an Invest screen displayed.

FIG. 41 illustrates one embodiment of the Investing section 3708 of the interface with a Portfolio screen 3718 selected (e.g., via tab 4102 of tab bar 4101). The portfolio screen 3718 may provide information describing the user's current investments. For example, a Performance field 4102 may graphically illustrate the performance of various investment products owned by the user. The Performance screen 4102 may also, in various embodiments, provide functionality for viewing the allocation of the user's assets between investments and the value of each investment product owned by the user. A Current Investment Groups field 4103 may list various investment products owned by the user and categorized (for example, by the user) into groups. According to various embodiments, each group may be dedicated to a specific expense (e.g., education, retirement, etc.). For example, the Current Investment Groups field 4103 comprises a Retirement group 4104, and Education group 4106 and an Uncategorized group 4108. The user may create a new group, for example by selecting a Create a new group button 4114. Also, according to various embodiments, the interface may comprise functionality allowing the user to view information about investments held with financial institutions other than the institution implementing the host system 3302 and interface 45. For example, the user may add such an investment to the investments tracked though the interface by selecting the Add link to outside holding button 4112. FIG. 42 illustrates one embodiment of the screen 3718 with a Contribution window 4200 displayed. The Contribution window 4200 may be displayed, for example, when the user selects one of the investments listed at the Current Investment Groups field 4103. In the Contribution window 4200, the user may make a direct contribution to an existing investment product from any suitable credit, savings or checking account (e.g., an electronically accessible account). Also, for example, the user may create or modify a recurring contribution to the selected account.

FIG. 43 illustrates one embodiment of the Investing section 3708 of the interface with a Browse screen 3720 displayed (e.g., via tab 4104). The Browse screen 3720 may generally comprise functionality for allowing users to browse and investigate different investment products available through the financial institution. An Investment Types field 4302 may provide the user with different categories of investment products. Selecting one of the displayed categories may cause recommended investment products from the selected category to be displayed at a What's Good For You field 4304. Investment products displayed at the field 4304 may be selected, for example, based on investor information describing the user including, for example, the results of the investor personality tool described herein. In the field 4304, the user may take various actions regarding the displayed securities 4306, 4308. For example, a Learn More button 4310 may cause the interface to display additional information describing the identified investment product. A Save to Notebook button 4312 may allow the user to save the described investment product to their notebook investment-related tool described above. This may serve as a reminder to the user to follow up on the selected investment product at a later time and may also indicate the user's interest in the product to the user's financial advisor. The user may also directly invest in the identified investment product by selecting button 4314.

FIG. 44 illustrates one embodiment of the Investing section 3708 of the interface with a Compare screen 3722 displayed (e.g., via tab 4106). The Compare screen 3722 may generally comprise tools allowing a user to compare various qualities of different investment products. A search field 4402 may receive from the user criteria describing investment products to be compared. Investment products meeting the entered criteria may be displayed at a Products field 4408. The user may select products listed in the Products field 4408 to have information about the selected products displayed in a Future Projection field 4404, which may display the predicted future performance of each selected investment product. Alternatively, the user may elect to have the Past Performance 4406 of each selected security displayed.

Figure illustrates one embodiment of the Investing section 3708 of the interface with an Invest screen 3724 displayed (e.g., via tab 4108). The Invest screen 3724 may provide functionality allowing the user to purchase one or more investment products. For example, the Invest screen 3724 may be configured to receive purchase orders or sale orders for particular investment products. The host system 3302 may execute such orders, for example, utilizing the transaction server 3420. A Recently Viewed field 4502 may display investment products that were recently viewed by the user, for example, via the Compare screen 3722 and/or the Browse screen 3720. Selecting an investment product from the Recently Viewed field 4502 may cause the investment product to be displayed at an Investment Purchase field 4504. At the Investment Purchase field 4504, the user may elect to make a single investment purchase of the selected investment product and/or an ongoing periodic purchase. A Contact Your Advisor field 4506 may allow a user to contact their advisor prior to making a purchase. For example, the field 4506, when selected, may allow the user to schedule an appointment with the advisor, initiate a telephone call with the advisor and/or conduct a live chat with the advisor (e.g., via an advisor device 3307).

FIG. 46 illustrates one embodiment of the Planning section 3710 of the interface with a Future Financial View screen 3726 displayed (e.g. via tab 4602 of tab bar 4601). The Future Financial View screen 3726 may provide an investment-related planning tool for determining whether the user's current and planned investments will be sufficient to meet the user's retirement lifestyle (e.g., as determined via the retirement lifestyle planning tool) and their goals or life events. A Retirement Phases field 4608 may show one or more retirement phases. For example, the user 4609 may plan for different phases of retirement with different levels of spending in each phase. In various embodiments, as described above, the user may utilize the retirement lifestyle planning tool to determine a level of spend for each retirement phase. The user may edit existing retirement phases and/or add new retirement phases, for example, by selecting the Edit button 4609.

Figure 47:
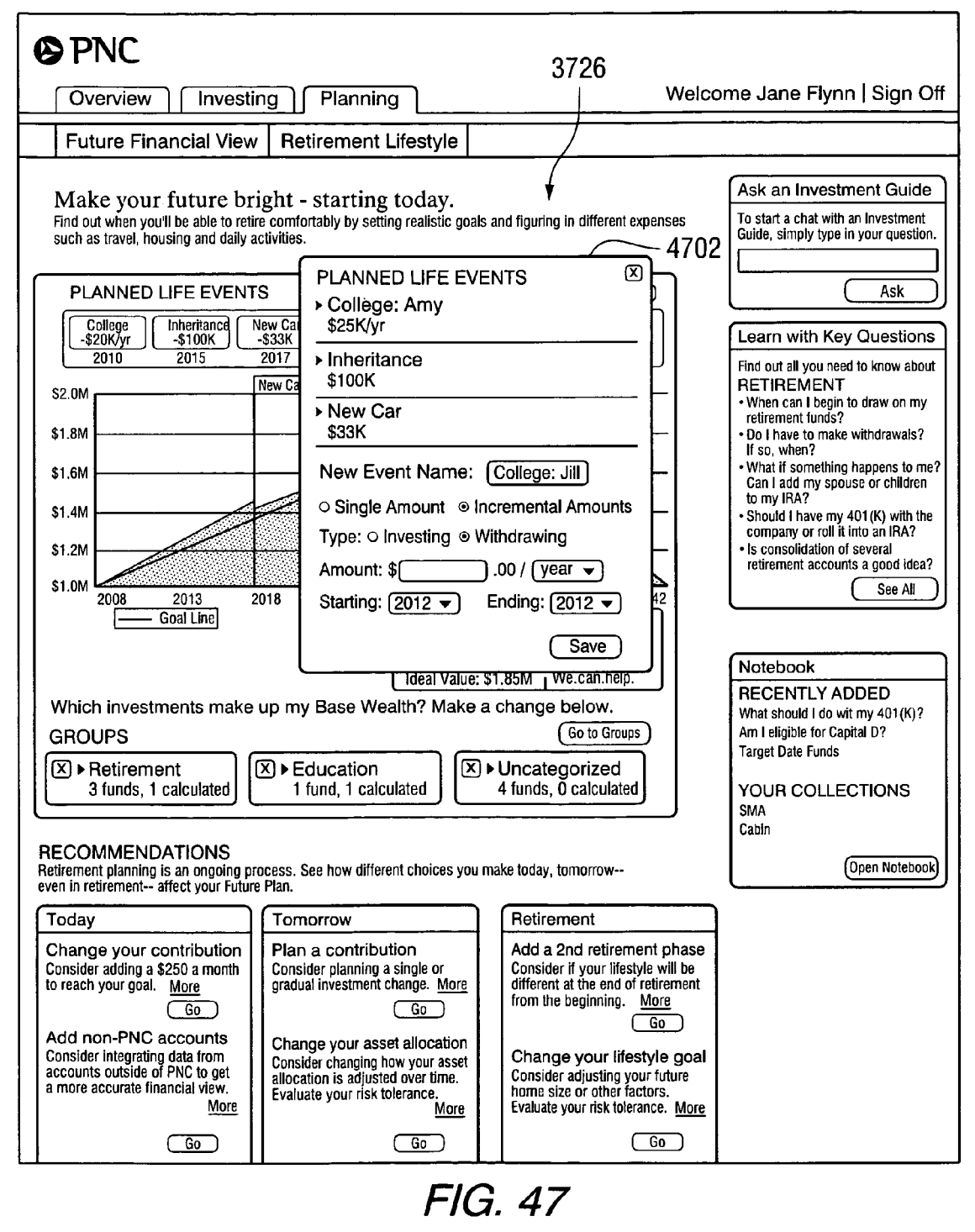

A Planned Life Events field 4606 may list life events provided by the user. Each life event may represent a planned expense or income such as, for example, the purchase of a car, a child's education, an expected inheritance, etc. Selecting the Edit button 4607 may allow the user to change and/or enter additional life events. For example, FIG. 47 illustrates one embodiment of the Future Financial View screen 3726 showing a Planned Life Events window 4702. Via the Planned Life Events window, the user may add new life events and/or modify existing life events. Information received regarding life events may include, for example, the frequency of the expense and/or income, the amount of the expense and/or income and the timing of the expense and/or income.

Referring back to FIG. 46, a graphical display field 4603 may show the output of the future financial view including the life events. For example, the field 4603 may comprise a chart of assets over time. A Goal Line 4618 may indicate the required level of assets necessary in order to meet the user's retirement lifestyle and planned life events. An area graph 4616 may indicate the user's actual and projected level of assets. An example life event is indicated by line 4612, while an example retirement phase divider is indicated by line 4614. The relationship between the Goal Line 4618 and the area graph 4616 may indicate whether the users assets match their retirement and life event goals. The screen 3726 may also comprise an investments field 4620 which may illustrate representations of investment products owned by the user that may, for example, be arranged according to the groups illustrated in FIG. 41. A Recommendations field 4622 may list recommendations to the user for improving their financial position. For example, the Recommendations field 4622 may comprise recommendations generated by the host system 3302 automatically based on the user's currently entered investment information such as, for example, income, investments, retirement lifestyle, etc. Also, for example, the Recommendations field 4622 may comprise recommendations entered manually by an advisor, for example, via an advisor device 3307.

FIG. 48 illustrates one embodiment of the Planning section 3710 of the interface with a Retirement Lifestyle screen 3728 displayed (e.g., via tab 4604). A Retirement Lifestyle screen 4802 may provide the retirement lifestyle planner tool described herein. For example, the screen 4802 may provide any of the retirement lifestyle planner tools 100, 800, 1000 described herein. Results of the retirement lifestyle planning tool may be used, for example, to populate the Future View screen 3726 described above.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. For example, no particular aspect or aspects of the examples of system architectures, methods or processing structures described herein are necessarily intended to limit the scope of the invention.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these sorts of focused descriptions would not facilitate a better understanding of the present invention, and therefore, a more detailed description of such elements is not provided herein.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention.

Moreover, the processes associated with the present embodiments may be executed by programmable equipment, such as computers. Software or other sets of instructions that may be employed to cause programmable equipment to execute the processes. The processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "host," "engine," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described herein may be implemented in computer software using any suitable computer programming language such as .NET, SQL, MySQL, or HTML using, for example, conventional or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. The network may use routers and/or public communication links. One type of data communication network may cover a relatively broad geographic area (e.g., city-to-city or country-to-country) which uses transmission facilities provided by common carriers, such as telephone service providers. In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods and systems described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g: a Web URL identifier). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including WebSphere Application Server. Other examples include WebSphere Application Server Community/Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java). Also, application servers may be provided in accordance with the NET framework, including the Windows Communication Foundation, .NET Remoting, ADO.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

In various embodiments, computers and computer systems described herein may have the following main components: arithmetic and logic unit (ALU), control unit, memory, and input and output devices (I/O devices). These components can be interconnected by busses, often comprising groups of wires or cables. The control unit, ALU, registers, and basic I/O (and often other hardware closely linked with these sections) can be collectively considered a central processing unit (CPU) for the computer system. The CPU may be constructed on a single integrated circuit or microprocessor.

The control unit (control system or central controller) directs the various components of a computer system. The control system decodes each instruction in a computer program and turns it into a series of control signals that operate other components of the computer system. To enhance performance or efficiency of operation, the control system may alter the order of instructions. One component of the control unit is the program counter, a memory register that tracks the location in memory from which the next instruction is to be read.

The ALU is capable of performing arithmetic and logic operations. The set of arithmetic operations that a particular ALU supports may be limited to adding and subtracting or might include multiplying or dividing, trigonometry functions (sine, cosine, etc.) and square roots. Some may be programmed to operate on whole numbers (integers), while others use floating point to represent real numbers, for example. An ALU may also compare numbers and return Boolean truth values (e.g., true or false). Superscalar computers may contain multiple ALUs to facilitate processing multiple instructions at the same time. For example, graphics processors and computers with SIMD and MIMD features often possess ALUs that can perform arithmetic operations on vectors and matrices. Certain computer systems may include one or more RAM cache memories configured to move more frequently needed data into the cache automatically.

Examples of peripherals that may be used in connection with certain embodiments of the invention include input/output devices such as keyboards, mice, screen displays, monitors, printers, hard disk drives, floppy disk drives, joysticks, and image scanners.

Embodiments of the methods and systems described herein may divide functions between separate CPUs, creating a multiprocessing configuration. For example, multiprocessor and multi-core (multiple CPUs on a single integrated circuit) computer systems with co-processing capabilities may be employed. Also, multitasking may be employed as a computer processing technique to, handle simultaneous execution of multiple computer programs.

In various embodiments, the computer devices described herein (e.g., the host system 3302, the branch devices 3304, the user devices 3306, the advisor devices 3307, etc.) may be configured and/or programmed to include one or more of the above-described electronic, computer-based elements and components. In addition, these elements and components may be particularly configured to execute the various rules, algorithms, programs, processes, and method steps described herein.

While various embodiments of the invention have been described herein, it should be apparent, however, that various modifications, alterations and adaptations to those embodiments may occur to persons skilled in the art with the attainment of some or all of the advantages of the present invention. The disclosed embodiments are therefore intended to include all such modifications, alterations and adaptations without departing from the scope and spirit of the present invention as set forth in the appended claims.

What is claimed is:

1. A computer system comprising at least one computer device, the at least one computer device comprising at least one processor and operatively associated electronic storage, wherein the storage comprises instructions that, when executed by the at least one processor, cause the at least one computer device to:

provide a user interface to a user via the at least one computer device, wherein the user interface comprises:
a first axis describing a desired level of involvement of the user in investment decisions, such that a first end of the first axis corresponds to a high interest regarding the desired level of involvement and a second end of the first axis corresponds to a low interest regarding the desired level of involvement;
a second axis describing a risk tolerance of the user, such that a first end of the second axis corresponds to a high tolerance for financial risk regarding the risk tolerance of the user and a second end of the second axis corresponds to a low tolerance for financial risk regarding the risk tolerance of the user;
a first icon representing a first position on the first and second axes that, when activated by the user, causes the interface to display a description of a first example investor having investment characteristics corresponding to the first position on the first and second axes, and wherein the description of the first example investor comprises information regarding a desired level of involvement in investment decisions for the first example investor and risk tolerance for the first example investor;

a second icon representing a second position on the first and second axes, that, when activated by the user, causes the interface to display a description of a second example investor having investment characteristics corresponding to the second position on the first and second axes, and wherein the description of the second example investor comprises information regarding a desired level of involvement in investment decisions for the second example investor and risk tolerance for the second example investor;

a first input field corresponding to the first axis, wherein the first input field comprises an element that is movable in response to a first signal from an input device in communication with the at least one computer device;

a second input field corresponding to the second axis, wherein the second input field comprises an element that is movable in response to a second signal from the input device in communication with the at least one computer device;

receive from the user, via the user interface, an indication of a user position on the first and second axes, wherein the indication of the user position is first data;

provide the first data to a host institution via a communication network;

store the first data describing the user position on the first and second axis in association with an identifier of the user in a non-transitory computer readable medium associated with the host institution; and wherein the user interface is provided in a level of detail according to a type of device of the at least one computer device or an account type held by the user at the host institution that provides the user interface.

2. The system of claim 1, wherein the at least one computer device comprises a first user device that comprises a portable computing device and a second computer device, and wherein the storage further comprises instructions that, when executed by the at least one processor, cause the second computer device to:

provide the user interface to the user via the second computer device;

receive, from the user through the user interface and via the second computer device, identifier data indicating the identifier of the user;

retrieve the first data provided by the first user device to the host institution utilizing the identifier data;

receive, from the user through the user interface and via the second computer device, additional data describing at least one of the user's desired level of involvement of the user in investment decisions, the user's risk tolerance, and the user's investment-related confidence; and store the additional data received by the second computer device in the non-transitory computer readable medium associated with the host institution.

3. The system of claim 2, wherein the user interface is provided in a first level of detail to the first user device and the user interface is provided in a second level of detail to the second computer device and wherein the first level of detail and the second level of detail are different.

4. The system of claim 2, wherein receiving the identifier of the user comprises reading an automated teller machine (ATM) card of the user.

5. The system of claim 2, wherein receiving the identifier of the user comprises reading at least one object selected from the group consisting of a credit card and a driver's license.

6. The system of claim 2, wherein receiving the identifier of the user comprises the second computer device prompting the user to provide the identifier.

7. The system of claim 1, wherein the storage further comprises instructions that, when executed by the at least one processor, cause the computer device to generate the identifier of the user.

8. The system of claim 2, wherein the storage further comprises instructions that, when executed by the at least one processor, cause the second computer device to generate a medium comprising the identifier data.

9. The system of claim 1, wherein the identifier is computer-readable.

10. The system of claim 9, wherein the computer readable identifier comprises a bar code.

11. The system of claim 9, wherein the computer readable identifier comprises a grid having a plurality of locations, wherein each location on the grid is assigned at least one of a plurality of visual states and wherein the combination of the visual states of each location on the grid corresponds to the computer readable code.

12. The system of claim 11, wherein the plurality of visual states comprises a plurality of colors.

13. The system of claim 1, wherein the identifier data is human readable.

14. The system of claim 2, wherein receiving from the user through the user interface and via the second computer device, the additional data describing the at least one of the user's desired level of involvement of the user in investment decisions, the user's risk tolerance, and the user's investment-related confidence comprises:

providing to the user through the user interface via the second computer at least one question eliciting investment-related information;

receiving from the user through the user interface via the second computer an answer to the at least one question.

15. The system of claim 1, wherein the user interface comprises an account summary field listing information describing at least one investment account held by the user, and wherein the at least one investment account is provided by a host financial institution, the host financial institution providing the user interface to the user via the at least one computer device.

16. The system of claim 15, wherein the account summary field further comprises information describing at least one general banking account held by the user, and wherein the at least one general banking account is provided by the host financial institution.

17. The system of claim 1, wherein the user interface comprises a notebook field, and wherein the notebook field comprises a first input for receiving from the user at least one item selected from the group consisting of an investment related question and an investment related comment, and wherein the notebook field is also accessible by an investment advisor associated with the user.

18. The system of claim 1, wherein the user interface comprises a live chat field to facilitate a live chat between the user and an investment advisor.

19. The system of claim 1, wherein the user interface comprises an investment field to receive at least one instruction from the user selected from the group consisting of an investment purchase order and an investment sale order.

20. The system of claim 1, wherein the user interface further comprises a planning field to:
provide recommendations to the user for future financial decisions generated automatically by the host institution based on account information of the user associated with the host institution;
receive financial goals of the user; and
project the user's assets over time considering the financial goals and the user's expected level of retirement spend in a plurality of spending categories.

21. A computer system comprising at least one computer device, the at least one computer device comprising at least one processor and operatively associated electronic storage, wherein the storage comprises instructions that, when executed by the at least one processor, cause the at least one computer device to:
provide a user interface to a user via the at least one computer device, wherein the user interface comprises:
 a first axis describing a desired level of involvement of the user in investment decisions, such that a first end of the first axis corresponds to a high interest regarding the desired level of involvement and a second end of the first axis corresponds to a low interest regarding the desired level of involvement;
 a second axis describing an investment-related confidence of the user, such that a first end of the second axis corresponds to a high tolerance for financial risk regarding the risk tolerance of the user and a second end of the second axis corresponds to a low tolerance for financial risk regarding the risk tolerance of the user;
 a first icon representing a first position on the first and second axes that, when activated by the user, causes the interface to display a description of a first example investor having investment characteristics corresponding to the first position on the first and second axes, and wherein the description of the first example investor comprises information regarding a desired level of involvement in investment decisions for the first example investor and risk tolerance for the first example investor;
 a second icon representing a second position on the first and second axes, that, when activated by the user, causes the interface to display a description of a second example investor having investment characteristics corresponding to the second position on the first and second axes, and wherein the description of the second example investor comprises information regarding a desired level of involvement in investment decisions for the second example investor and risk tolerance for the second example investor;
 a first slider bar corresponding to the first axis, wherein the first slider bar is movable in response to a first signal from an input device in communication with the at least one computer device;
 a second slider bar corresponding to the second axis, wherein the second slider bar is movable in response to a second signal from the input device in communication with the at least one computer device;
receive from the user, via the user interface, an indication of a user position on the first and second axes, wherein the indication of the user position is first data;
provide the first data to a host institution via a communication network;
store first data describing the user position on the first and second axis in association with an identifier of the user in a non-transitory computer readable medium associated with the host institution; and
wherein the user interface is provided in a level of detail according to a type of device of the at least one computer device or an account type held by the user at a host institution that provides the user interface.

22. The system of claim 21, wherein the at least one computer device a comprises a first user device that comprises a portable computing device and a second computer device, and wherein the storage further comprises instructions that, when executed by the at least one processor, cause the second computer device to:
provide the user interface to the user via the second computer device;
receive, from the user through the user interface and via the second computer device, identifier data indicating the identifier of the user;
retrieve the first data provided by the first user device to the host institution utilizing the identifier data;
receive, from the user through the user interface and via the second computer device, additional data describing at least one of the user's desired level of involvement of the user in investment decisions, the user's investment-related confidence, and the user's investment-related confidence; and
store the additional data received by the second computer device in the non-transitory computer readable medium associated with the host institution.

* * * * *